US009870388B2

(12) United States Patent
Erol et al.

(10) Patent No.: US 9,870,388 B2
(45) Date of Patent: Jan. 16, 2018

(54) ANALYZING USAGE OF VISUAL CONTENT TO DETERMINE RELATIONSHIPS INDICATING UNSUCCESSFUL ATTEMPTS TO RETRIEVE THE VISUAL CONTENT

(71) Applicants: Berna Erol, San Jose, CA (US);
Jonathan J. Hull, San Carlos, CA (US)

(72) Inventors: Berna Erol, San Jose, CA (US);
Jonathan J. Hull, San Carlos, CA (US)

(73) Assignee: Ricoh, Co., Ltd., Tokyo (JP)

( * ) Notice: Subject to any disclaimer, the term of this patent is extended or adjusted under 35 U.S.C. 154(b) by 385 days.

(21) Appl. No.: 13/914,417

(22) Filed: Jun. 10, 2013

(65) Prior Publication Data

US 2013/0346431 A1 Dec. 26, 2013

Related U.S. Application Data

(63) Continuation of application No. 12/265,502, filed on Nov. 5, 2008, now Pat. No. 8,489,987, and a
(Continued)

(51) Int. Cl.
*G06F 17/00* (2006.01)
*G06F 17/30* (2006.01)
(Continued)

(52) U.S. Cl.
CPC .. *G06F 17/30386* (2013.01); *G06F 17/30247* (2013.01); *G06F 17/30876* (2013.01);
(Continued)

(58) Field of Classification Search
CPC ......... G06F 17/30247; G06F 17/30876; G06F 17/30386; G06F 17/30864; G06K 9/00979; G06K 9/036; G06K 9/228; G06K 9/6293
See application file for complete search history.

(56) References Cited

U.S. PATENT DOCUMENTS 5,010,581 A 4/1991 Kanno
5,598,557 A 1/1997 Doner et al.
(Continued)

FOREIGN PATENT DOCUMENTS

JP 2001-265811 9/2001
JP 2002521752 7/2002
(Continued)

OTHER PUBLICATIONS

Non-Final Office Action for U.S. Appl. No. 12/060,198, dated Nov. 7, 2013, 55 pages.
(Continued)

*Primary Examiner* — Cesar Paula
*Assistant Examiner* — James H Blackwell
(74) *Attorney, Agent, or Firm* — Patent Law Works LLP

(57) ABSTRACT

An MMR system includes an analytics module for monitoring and analyzing the creation and usage of visual content search. The analytics module is part of an MMR gateway and provides a mechanism for administrators to determine the usage patterns and other information about users of the MMR system. The analytics module comprises a monitoring module, a usage database, an access analysis module and a presentation module. The monitoring module collects information about the retrieval request, image queries, context information and recognition results. The usage database stores the information collected by the monitoring module.

20 Claims, 43 Drawing Sheets

Related U.S. Application Data continuation-in-part of application No. 11/461,017, filed on Jul. 31, 2006, now Pat. No. 7,702,673, and a continuation-in-part of application No. 11/461,279, filed on Jul. 31, 2006, now Pat. No. 8,600,989, and a continuation-in-part of application No. 11/461,286, filed on Jul. 31, 2006, now Pat. No. 8,335,789, and a continuation-in-part of application No. 11/461,294, filed on Jul. 31, 2006, now Pat. No. 8,332,401, and a continuation-in-part of application No. 11/461,300, filed on Jul. 31, 2006, now Pat. No. 8,521,737, and a continuation-in-part of application No. 11/461,126, filed on Jul. 31, 2006, now Pat. No. 8,195,659, and a continuation-in-part of application No. 11/461,143, filed on Jul. 31, 2006, now Pat. No. 8,156,427, and a continuation-in-part of application No. 11/461,268, filed on Jul. 31, 2006, now Pat. No. 7,639,387, and a continuation-in-part of application No. 11/461,272, filed on Jul. 31, 2006, now Pat. No. 8,005,831, and a continuation-in-part of application No. 11/461,064, filed on Jul. 31, 2006, now Pat. No. 7,669,148, and a continuation-in-part of application No. 11/461,075, filed on Jul. 31, 2006, now Pat. No. 7,812,986, and a continuation-in-part of application No. 11/461,090, filed on Jul. 31, 2006, now Pat. No. 7,551,780, and a continuation-in-part of application No. 11/461,037, filed on Jul. 31, 2006, now Pat. No. 8,838,591, and a continuation-in-part of application No. 11/461,085, filed on Jul. 31, 2006, now Pat. No. 8,949,287, and a continuation-in-part of application No. 11/461,091, filed on Jul. 31, 2006, now Pat. No. 7,885,955, and a continuation-in-part of application No. 11/461,095, filed on Jul. 31, 2006, now Pat. No. 7,917,554, and a continuation-in-part of application No. 11/466,414, filed on Aug. 22, 2006, now Pat. No. 7,587,412, and a continuation-in-part of application No. 11/461,147, filed on Jul. 31, 2006, now Pat. No. 9,171,202, and a continuation-in-part of application No. 11/461,164, filed on Jul. 31, 2006, now Pat. No. 9,405,751, and a continuation-in-part of application No. 11/461,024, filed on Jul. 31, 2006, now Pat. No. 7,991,778, and a continuation-in-part of application No. 11/461,032, filed on Jul. 31, 2006, now Pat. No. 7,672,543, and a continuation-in-part of application No. 11/461,049, filed on Jul. 31, 2006, now Pat. No. 7,920,759, and a continuation-in-part of application No. 11/461,109, filed on Jul. 31, 2006, now Pat. No. 9,384,619, and a continuation-in-part of application No. 11/827,530, filed on Jul. 11, 2007, now Pat. No. 8,276,088, and a continuation-in-part of application No. 12/060,194, filed on Mar. 31, 2008, now Pat. No. 8,156,115, and a continuation-in-part of application No. 12/059,583, filed on Mar. 31, 2008, now Pat. No. 9,373,029, and a continuation-in-part of application No. 12/060,198, filed on Mar. 31, 2008, now Pat. No. 9,530,050, and a continuation-in-part of application No. 12/060,200, filed on Mar. 31, 2008, now Pat. No. 8,989,431, and a continuation-in-part of application No. 12/060,206, filed on Mar. 31, 2008, and a continuation-in-part of application No. 12/121,275, filed on May 15, 2008, now Pat. No. 8,385,589, and a continuation-in-part of application No. 11/776,510, filed on Jul. 11, 2007, now Pat. No. 8,086,038, and a continuation-in-part of application No. 11/776,520, filed on Jul. 11, 2007, now Pat. No. 8,144,921, and a continuation-in-part of application No. 11/776,530, filed on Jul. 11, 2007, now Pat. No. 8,184,155, and a continuation-in-part of application No. 11/777,142, filed on Jul. 12, 2007, now Pat. No. 8,176,054, and a continuation-in-part of application No. 11/624,466, filed on Jan. 18, 2007, now Pat. No. 7,970,171, and a continuation-in-part of application No. 12/210,511, filed on Sep. 15, 2008, now Pat. No. 8,825,682, and a continuation-in-part of application No. 12/210,519, filed on Sep. 15, 2008, now Pat. No. 8,510,283, and a continuation-in-part of application No. 12/210,532, filed on Sep. 15, 2008, now Pat. No. 8,868,555, and a continuation-in-part of application No. 12/210,540, filed on Sep. 15, 2008, now Pat. No. 8,856,108.

(51) Int. Cl.
*G06K 9/00* (2006.01)
*G06K 9/03* (2006.01)
*G06K 9/22* (2006.01)
*G06K 9/62* (2006.01)

(52) U.S. Cl.
CPC ..... *G06K 9/00463* (2013.01); *G06K 9/00979* (2013.01); *G06K 9/036* (2013.01); *G06K 9/228* (2013.01); *G06K 9/6293* (2013.01)

(56) References Cited

U.S. PATENT DOCUMENTS

| | | |
|---|---|---|
| 5,754,772 A | 5/1998 | Leaf |
| 5,848,184 A | 12/1998 | Taylor et al. |
| 5,889,886 A | 3/1999 | Mahoney |
| 5,933,823 A | 8/1999 | Cullen |
| 6,006,240 A | 12/1999 | Handley |
| 6,026,411 A | 2/2000 | Delp |
| 6,067,369 A | 5/2000 | Kamei |
| 6,121,969 A | 9/2000 | Jain et al. |
| 6,345,109 B1 | 2/2002 | Souma |
| 6,430,307 B1 | 8/2002 | Souma |
| 6,430,312 B1 | 8/2002 | Huang et al. |
| 6,470,094 B1 | 10/2002 | Lienhart et al. |
| 6,625,311 B1 | 9/2003 | Zhu |
| 6,678,698 B2 | 1/2004 | Fredell |
| 6,693,649 B1 | 2/2004 | Lipscomb et al. |
| 6,781,694 B2 | 8/2004 | Nahum et al. |
| 6,874,131 B2 | 3/2005 | Blumberg |
| 6,874,420 B2 | 4/2005 | Lewis et al. |
| 6,882,741 B2 | 4/2005 | Dobashi |
| 6,958,821 B1 | 10/2005 | McIntyre |
| 6,981,224 B1 * | 12/2005 | Gardner ............ G06F 3/0481 715/760 |
| 7,013,289 B2 | 3/2006 | Horn |
| 7,054,489 B2 | 5/2006 | Yamaoka et al. |
| 7,150,021 B1 | 12/2006 | Vajjhala et al. |
| 7,213,101 B1 | 5/2007 | Srinivasan et al. |
| 7,340,080 B2 | 3/2008 | Liu |
| 7,362,323 B2 | 4/2008 | Doyle |
| 7,463,790 B2 | 12/2008 | Shepherd |
| 7,466,875 B1 | 12/2008 | Siegel et al. |
| 7,593,961 B2 | 9/2009 | Eguchi |
| 7,599,844 B2 * | 10/2009 | King ............ H04N 1/00244 705/1.1 |
| 7,620,254 B2 | 11/2009 | Hahn et al. |
| 7,725,508 B2 | 5/2010 | Lawarence et al. |
| 7,742,953 B2 | 6/2010 | King |
| 7,765,231 B2 | 7/2010 | Rathus et al. |
| 7,787,655 B1 | 8/2010 | Cohen |
| 7,801,845 B1 | 9/2010 | King et al. |
| 7,930,292 B2 | 4/2011 | Nakajima |
| 8,036,441 B2 | 10/2011 | Frank et al. |
| 8,156,116 B2 | 4/2012 | Graham et al. |
| 8,212,832 B2 | 7/2012 | Stefanidis |
| 8,326,037 B1 | 12/2012 | Abitz et al. |
| 8,386,336 B1 | 2/2013 | Fox et al. |

(56) References Cited

U.S. PATENT DOCUMENTS

| | | |
|---|---|---|
| 8,600,989 B2 | 12/2013 | Hull et al. |
| 8,612,475 B2 | 12/2013 | Graham et al. |
| 8,676,810 B2 | 3/2014 | Moraleda |
| 8,825,682 B2 | 9/2014 | Kishi et al. |
| 8,838,591 B2 | 9/2014 | Hull et al. |
| 8,856,108 B2 | 10/2014 | Erol et al. |
| 8,868,555 B2 | 10/2014 | Erol et al. |
| 8,892,595 B2 | 11/2014 | Graham et al. |
| 8,904,270 B2* | 12/2014 | Bouchard ......... G06F 17/30011 |
| | | 715/200 |
| 8,949,287 B2 | 2/2015 | Hull et al. |
| 8,965,145 B2 | 2/2015 | Moraleda et al. |
| 8,989,431 B1 | 3/2015 | Erol et al. |
| 9,020,966 B2 | 4/2015 | Erol et al. |
| 9,058,331 B2 | 6/2015 | Graham et al. |
| 9,063,952 B2 | 6/2015 | Moraleda et al. |
| 9,063,953 B2 | 6/2015 | Hull et al. |
| 9,087,104 B2 | 7/2015 | Graham et al. |
| 9,092,423 B2 | 7/2015 | Moraleda |
| 9,171,202 B2 | 10/2015 | Hull et al. |
| 9,176,984 B2 | 11/2015 | Hull et al. |
| 9,311,336 B2 | 4/2016 | Hull et al. |
| 9,357,098 B2 | 5/2016 | Graham |
| 9,373,029 B2 | 6/2016 | Hull et al. |
| 9,384,619 B2 | 7/2016 | Erol et al. |
| 9,405,751 B2 | 8/2016 | Hull et al. |
| 9,495,385 B2 | 11/2016 | Moraleda et al. |
| 9,530,050 B1 | 12/2016 | Erol et al. |
| 2001/0019636 A1 | 9/2001 | Slatter |
| 2001/0037454 A1 | 11/2001 | Botti et al. |
| 2001/0047373 A1 | 11/2001 | Jones |
| 2002/0008697 A1 | 1/2002 | Deering |
| 2002/0029232 A1 | 3/2002 | Bobrow et al. |
| 2002/0069418 A1 | 6/2002 | Philips |
| 2002/0078043 A1 | 6/2002 | Pass et al. |
| 2002/0126905 A1 | 9/2002 | Suzuki et al. |
| 2002/0129057 A1 | 9/2002 | Spielberg |
| 2002/0129363 A1* | 9/2002 | McGuire ................ H04H 60/33 |
| | | 725/37 |
| 2002/0131641 A1 | 9/2002 | Luo et al. |
| 2002/0145746 A1 | 10/2002 | Mortenson et al. |
| 2002/0161673 A1* | 10/2002 | Lee ........................ G06Q 30/02 |
| | | 709/224 |
| 2002/0198789 A1 | 12/2002 | Waldman |
| 2003/0009495 A1 | 1/2003 | Adjaoute |
| 2003/0012428 A1 | 1/2003 | Syeda-Mahmood |
| 2003/0026457 A1 | 2/2003 | Nahum |
| 2003/0063319 A1 | 4/2003 | Umeda et al. |
| 2003/0063673 A1 | 4/2003 | Riemens et al. |
| 2003/0069932 A1 | 4/2003 | Hall et al. |
| 2003/0073922 A1 | 4/2003 | Miller |
| 2003/0115481 A1 | 6/2003 | Baird et al. |
| 2003/0151679 A1 | 8/2003 | Amerson et al. |
| 2003/0154180 A1 | 8/2003 | Case et al. |
| 2003/0169922 A1 | 9/2003 | Kamon |
| 2004/0015495 A1 | 1/2004 | Kim et al. |
| 2004/0047499 A1 | 3/2004 | Shams |
| 2004/0073708 A1 | 4/2004 | Warnock |
| 2004/0107256 A1 | 6/2004 | Odenwald |
| 2004/0190791 A1 | 9/2004 | Oyabu et al. |
| 2004/0198396 A1* | 10/2004 | Fransioli ........... H04L 29/12311 |
| | | 455/456.3 |
| 2004/0220898 A1 | 11/2004 | Eguchi et al. |
| 2004/0249795 A1 | 12/2004 | Brockway et al. |
| 2004/0264780 A1 | 12/2004 | Zhang |
| 2005/0021478 A1 | 1/2005 | Gautier et al. |
| 2005/0047631 A1 | 3/2005 | Zyzdryn |
| 2005/0069291 A1 | 3/2005 | Voss et al. |
| 2005/0080871 A1 | 4/2005 | Dinh et al. |
| 2005/0088684 A1 | 4/2005 | Naito et al. |
| 2005/0097435 A1 | 5/2005 | Prakash et al. |
| 2005/0108406 A1 | 5/2005 | Fisher |
| 2005/0111738 A1 | 5/2005 | Iizuka |
| 2005/0125390 A1* | 6/2005 | Hurst-Hiller ..... G06F 17/30867 |
| 2005/0169511 A1 | 8/2005 | Jones |
| 2005/0187768 A1 | 8/2005 | Godden |
| 2005/0197869 A1 | 9/2005 | Schaefer |
| 2005/0240381 A1* | 10/2005 | Seiler ................. G06F 17/5009 |
| | | 703/1 |
| 2005/0244059 A1 | 11/2005 | Turski |
| 2005/0256866 A1 | 11/2005 | Lu et al. |
| 2005/0259866 A1 | 11/2005 | Jacobs et al. |
| 2005/0261990 A1* | 11/2005 | Gocht ..................... G06Q 30/02 |
| | | 707/758 |
| 2005/0262240 A1* | 11/2005 | Drees .................. G06F 11/3476 |
| | | 709/224 |
| 2005/0267872 A1 | 12/2005 | Galai et al. |
| 2006/0026140 A1* | 2/2006 | King ................... H04N 1/00244 |
| 2006/0047639 A1 | 3/2006 | King et al. |
| 2006/0053101 A1 | 3/2006 | Stuart et al. |
| 2006/0079214 A1 | 4/2006 | Mertama et al. |
| 2006/0114485 A1 | 6/2006 | Sato |
| 2006/0173560 A1 | 8/2006 | Widrow |
| 2006/0192997 A1 | 8/2006 | Matsumoto et al. |
| 2006/0200347 A1 | 9/2006 | Kim et al. |
| 2006/0253491 A1 | 11/2006 | Gokturk et al. |
| 2006/0264209 A1 | 11/2006 | Atkinson et al. |
| 2006/0282312 A1 | 12/2006 | Carlson et al. |
| 2006/0294094 A1 | 12/2006 | King |
| 2007/0006129 A1 | 1/2007 | Cieslak et al. |
| 2007/0041642 A1 | 2/2007 | Romanoff et al. |
| 2007/0050175 A1 | 3/2007 | Schmetzer et al. |
| 2007/0088687 A1 | 4/2007 | Bromm et al. |
| 2007/0115384 A1 | 5/2007 | Furukawa |
| 2007/0118794 A1 | 5/2007 | Hollander et al. |
| 2007/0260597 A1 | 11/2007 | Cramer |
| 2007/0300142 A1 | 12/2007 | King |
| 2008/0004944 A1 | 1/2008 | Calabria |
| 2008/0009268 A1 | 1/2008 | Ramer et al. |
| 2008/0059419 A1 | 3/2008 | Auerbach et al. |
| 2008/0120321 A1 | 5/2008 | Liu |
| 2008/0141117 A1 | 6/2008 | King |
| 2008/0172422 A1 | 7/2008 | Li et al. |
| 2008/0177541 A1 | 7/2008 | Satomura |
| 2008/0317383 A1 | 12/2008 | Franz et al. |
| 2010/0013615 A1 | 1/2010 | Hebert et al. |
| 2010/0046842 A1 | 2/2010 | Conwell |
| 2010/0085383 A1 | 4/2010 | Cohen et al. |
| 2010/0211567 A1 | 8/2010 | Abir |
| 2010/0239175 A1 | 9/2010 | Bober et al. |
| 2011/0093492 A1 | 4/2011 | Sull et al. |
| 2011/0125727 A1 | 5/2011 | Zou et al. |
| 2011/0314031 A1 | 12/2011 | Chittar et al. |
| 2015/0139540 A1 | 5/2015 | Moraleda et al. |
| 2015/0287228 A1 | 10/2015 | Moraleda et al. |
| 2015/0324848 A1 | 11/2015 | Graham et al. |
| 2015/0350151 A1 | 12/2015 | Graham et al. |

FOREIGN PATENT DOCUMENTS

| | | |
|---|---|---|
| JP | 2004-055658 | 2/2004 |
| JP | 2005100274 | 4/2005 |
| JP | 2005157931 | 6/2005 |
| JP | 2006-229465 | 8/2006 |
| JP | 2007264992 | 10/2007 |
| JP | 2008-158823 | 7/2008 |
| WO | WO00/05663 | 2/2000 |

OTHER PUBLICATIONS

Final Office Action for U.S. Appl. No. 12/060,200, dated Nov. 8, 2013, 58 pages.

Non-Final Office Action for U.S. Appl. No. 13/273,186, dated Dec. 5, 2013, 25 pages.

Final Office Action for U.S. Appl. No. 11/461,085, dated Dec. 10, 2013, 16 pages.

Non-Final Office Action for U.S. Appl. No. 13/729,458, dated Dec. 17, 2013, 8 pages.

Non-Final Office Action for U.S. Appl. No. 12/253,715, dated Dec. 19, 2013, 38 pages.

Notice of Allowance for U.S. Appl. No. 12/240,596, dated Dec. 23, 2013, 10 pages.

(56) References Cited

OTHER PUBLICATIONS

Final Office Action for U.S. Appl. No. 11/461,164, dated Dec. 26, 2013, 17 pages.
Final Office Action for U.S. Appl. No. 13/330,492, dated Jan. 2, 2014, 15 pages.
Final Office Action for U.S. Appl. No. 12/719,437, dated Jan. 16, 2014, 22 pages.
Non-Final Office Action for U.S. Appl. No. 13/789,669, dated Jan. 17, 2014, 6 pages.
Final Office Action for U.S. Appl. No. 13/192,458, dated Jan. 27, 2014, 13 pages.
Non-Final Office Action for U.S. Appl. No. 12/340,124, dated Jan. 29, 2014, 24 pages.
U.S. Notice of Allowance for U.S. Appl. No. 11/461,300 dated May 15, 2013, 13 pages.
U.S. Final Office Action for U.S. Appl. No. 13/273,186, dated Jun. 12, 2013, 24 pages.
U.S. Non-Final Office Action for U.S. Appl. No. 11/461,037, dated Jun. 24, 2013, 25 pages.
U.S. Non-Final Office Action for U.S. Appl. No. 12/719,437, dated Jun. 25, 2013, 22 pages.
U.S. Notice of Allowance for U.S. Appl. No. 11/461,279, dated Jul. 31, 2013, 14 pages.
JP Office Action for JP Application No. 2009212242 dated Jul. 16, 2013, 2 pages.
U.S. Non-Final Office Action for U.S. Appl. No. 11/461,085, dated Jul. 9, 2013, 11 pages.
Non-Final Office Action for U.S. Appl. No. 11/461,109 dated Jun. 26, 2014, 18 pages.
Notice of Allowance for U.S. Appl. No. 13/273,186 dated Jul. 10, 2014, 9 pages.
Non-Final Office Action for U.S. Appl. No. 13/330,492 dated Jul. 17, 2014, 16 pages.
Final Office Action for U.S. Appl. No. 12/253,715, dated Jul. 25, 2014, 40 pages.
Final Office Action for U.S. Appl. No. 12/340,124, dated Aug. 21, 2014, 26 pages.
Final Office Action for U.S. Appl. No. 13/789,669 dated Aug. 29, 2014, 9 pages.
Non-Final Office Action for U.S. Appl. No. 13/494,008 dated Sep. 10, 2014, 18 pages.
Non-Final Office Action for U.S. Appl. No. 11/461,164, dated Sep. 15, 2014, 18 pages.
Notice of Allowance for U.S. Appl. No. 11/461,085, dated Sep. 17, 2014, 5 pages.
Moghaddam et al., Visualization and User-Modeling for Browsing Personal Photo Libraries, Mitsubishi Electric Research Laboratories, dated Feb. 2004, 34 pages.
Japanese Application Office Action for JP Publication No. 2013-192033, dated Jun. 24, 2014, 7 pages.
Japanese Application Office Action for JP Publication No. 2013-222655, dated Aug. 26, 2014, 5 pages.
Jonathan Hull, Mixed Media Reality (MMR) A New Method of eP-Fusion, Ricoh Technical Report, Ricoh Company, Ltd., dated Dec. 1, 2007, No. 33, p. 119-125; online search dated Aug. 22, 2013 <URL: http://www.ricoh.com/ja/technology/techreport/33/pdf/A3314.pdf>.
European Office Action for Application No. 08 252 377.0, dated Aug. 9, 2013, 5 pages.
Non-Final Office Action for U.S. Appl. No. 13/330,492, dated Aug. 27, 2013, 14 pages.
Non-Final Office Action for U.S. Appl. No. 11/461,164, dated Aug. 30, 2013, 19 pages.
Non-Final Office Action for U.S. Appl. No. 12/240,596, dated Sep. 5, 2013, 17 pages.
Non-Final Office Action for U.S. Appl. No. 11/461,109, dated Sep. 9, 2013, 14 pages.
European Search Report for Application No. 12159375.0, dated Sep. 12, 2013, 9 pages.
Notice of Allowance for U.S. Appl. No. 13/273,189, dated Sep. 13, 2013, 15 pages.
Non-Final Office Action for U.S. Appl. No. 11/461,147, dated Sep. 27, 2013, 15 pages.
Non-Final Office Action for U.S. Appl. No. 12/210,532, dated Oct. 7, 2013, 18 pages.
Non-Final Office Action for U.S. Appl. No. 12/247,205, dated Oct. 7, 2013, 19 pages.
Final Office Action for U.S. Appl. No. 11/461,037, dated Oct. 24, 2013, 24 pages.
Chi-Hung Chi et al., Context Query in Information Retrieval, dated 2002, Proceedings of the 14th IEEE International Conference on Tools with Artificial Intelligence (ICTAI'02) 6 pages (http://ieeexplore.ieee.org/stamp/stamp.jsp?tp=&arnumber=1180793).
Notice of Allowance for U.S. Appl. No. 12/247,205, dated Apr. 8, 2015, 15 pages.
Non-Final Office Action for U.S. Appl. No. 13/330,492, dated Apr. 8, 2015, 19 pages.
Notice of Allowance for U.S. Appl. No. 12/719,437, dated Apr. 10, 2015, 16 pages.
Notice of Allowance for U.S. Appl. No. 13/933,078, dated May 16, 2015, 7 pages.
Non-Final Office Action for U.S. Appl. No. 11/461,109, dated Jun. 15, 2015, 18 pages.
Non-Final Office Action for U.S. Appl. No. 11/461,164, dated Jun. 30, 2015, 20 pages.
Non-Final Office Action for U.S. Appl. No. 12/253,715, dated Jan. 7, 2015, 35 pages.
Final Office Action for U.S. Appl. No. 11/461,109, dated Jan. 15, 2015, 20 pages.
Notice of Allowance for U.S. Appl. No. 13/192,458, dated Jan. 28, 2015, 9 pages.
Final Office Action for U.S. Appl. No. 13/494,008, dated Feb. 10, 2015, 20 pages.
Non-Final Office Action for U.S. Appl. No. 13/933,078, dated Feb. 26, 2015, 7 pages.
Final Office Action for U.S. Appl. No. 11/461,164, dated Mar. 12, 2015, 19 pages.
Non-Final Office Action for U.S. Appl. No. 12/060,198, dated Mar. 13, 2015, 22 pages.
Notice of Allowance for U.S. Appl. No. 13/789,669, dated Mar. 16, 2015, 8 pages.
Non-Final Office Action for U.S. Appl. No. 11/461,147, dated Mar. 20, 2015, 11 pages.
Non-Final Office Action for U.S. Appl. No. 13/933,078, dated Mar. 17, 2014, 9 pages.
Notice of Allowance for U.S. Appl. No. 13/273,186, dated Mar. 26, 2014, 9 pages.
Notice of Allowance for U.S. Appl. No. 11/461,037, dated Apr. 3, 2014, 10 pages.
Non-Final Office Action for U.S. Appl. No. 12/060,200, dated Apr. 8, 2014, 65 pages.
Non-Final Office Action for U.S. Appl. No. 11/461,085, dated Apr. 9, 2014, 16 pages.
Final Office Action for U.S. Appl. No. 11/461,147, dated Apr. 24, 2014, 11 pages.
Notice of Allowance for U.S. Appl. No. 12/210,511, dated Apr. 30, 2014, 11 pages.
Final Office Action for U.S. Appl. No. 12/247,205, dated May 13, 2014, 17 pages.
Notice of Allowance for U.S. Appl. No. 12/210,540, dated May 22, 2014, 20 pages.
Final Office Action for U.S. Appl. No. 13/729,458, dated Jun. 2, 2014, 8 pages.
Non-Final Office Action for U.S. Appl. No. 13/192,458, dated Jun. 5, 2014, 12 pages.
Final Office Action for U.S. Appl. No. 12/060,198, dated Jun. 5, 2014, 63 pages.
Josef Sivic, "Video Google: A Text Retrieval Approach to Object Matching in Videos," IEEE, Proceedings of the Ninth IEEE International Conference on Computer Vision (ICCV 2003), 8 pages, vol. 2.

(56) References Cited

OTHER PUBLICATIONS

Japanese Office Action for JP Application No. 2013222652, dated May 20, 2014, 5 pages.
Japanese Office Action for JP Application No. 2013222655, dated May 20, 2014, 4 pages.
Non-Final Office Action for U.S. Appl. No. 12/059,583, dated Jul. 2, 2015, Jonathan J. Hull, 29 pages.
Non-Final Office Action for U.S. Appl. No. 12/060,206, dated Jul. 23, 2015, Berna Erol et al., 23 pages.
Non-Final Office Action for U.S. Appl. No. 13/494,008, dated Aug. 13, 2015, Jonathan J. Hull et al., 21 pages.
Notice of Allowance for U.S. Appl. No. 13/729,458, dated Sep. 29, 2014, 8 pages.
Final Office Action for U.S. Appl. No. 13/933,078, dated Oct. 6, 2014, 14 pages.
Notice of Allowance for U.S. Appl. No. 12/060,200, dated Nov. 5, 2014, 8 pages.
Non-Final Office Action for U.S. Appl. No. 13/789,669, dated Nov. 19, 2014, 13 pages.
Final Office Action for U.S. Appl. No. 13/330,492, dated Nov. 26, 2014, 18 pages.
Notice of Allowance for U.S. Appl. No. 12/340,124, dated Dec. 19, 2014, 12 pages.
Notice of Allowance for U.S. Appl. No. 12/059,583, dated Jan. 15, 2016, Hull et al., 9 pages.
Notice of Allowance for U.S. Appl. No. 13/330,492, dated Jan. 26, 2016, Graham et al., 8 pages.
Final Office Action for U.S. Appl. No. 12/060,206, dated Feb. 1, 2016, Erol et al., 26 pages.
Notice of Allowance for U.S. Appl. No. 13/494,008, dated Feb. 16, 2016, Hull et al., 15 pages.
Notice of Allowance for U.S. Appl. No. 14/604,619, dated Feb. 18, 2016, Moraleda et al., 8 pages.
Notice of Allowance for U.S. Appl. No. 11/461,109, dated Feb. 29, 2016, Erol et al., 9 pages.
Notice of Allowance for U.S. Appl. No. 11/461,164, dated Mar. 29, 2016, Hull et al., 8 pages.
Non-Final Office Action for U.S. Appl. No. 12/060,198, dated Apr. 8, 2016, Erol et al. 35 pages.
Non-Final Office Action for U.S. Appl. No. 14/604,619, dated Oct. 7, 2015, Moraleda et al., 9 pages.
Final Office Action for U.S. Appl. No. 13/330,492, dated Oct. 8, 2015, Graham et al., 20 pages.
Final Office Action for U.S. Appl. No. 12/060,198, dated Oct. 8, 2015, Erol et al., 32 pages.
Final Office Action for U.S. Appl. No. 11/461,109, dated Nov. 10, 2015, Erol et al., 21 pages.
Final Office Action for U.S. Appl. No. 11/461,164, dated Nov. 27, 2015, Hull et al., 20 pages.
Non-Final Office Action for U.S. Appl. No. 14/733,792, dated Aug. 10, 2016, 11 pages.
Non-Final Office Action for U.S. Appl. No. 14/804,241, dated Sep. 19, 2016, 32 pages.
Non-Final Office Action for U.S. Appl. No. 12/060,206, dated Nov. 2, 2016, 20 pages.
Notice of Allowance for U.S. Appl. No. 12/060,198 dated Aug. 11, 2016, 7 pages.
Non-Final Office Action for U.S. Appl. No. 14/746,669 dated Jan. 17, 2017, 9 pages.
Final Office Action for U.S. Appl. No. 14/733,792 dated Jan. 26, 2017, 7 pages.
Non-Final Office Action for U.S. Appl. No. 14/746,663, dated Mar. 27, 2017, 27 pages.
Notice of Allowance for U.S. Appl. No. 14/733,792, dated May 3, 2017, 5 pages.
Final Office Action for U.S. Appl. No. 14/804,241, dated May 3, 2017, 10 pages.
Final Office Action for U.S. Appl. No. 12/060,206, dated May 12, 2017, 21 pages.
Non-Final Office Action for U.S. Appl. No. 14/804,241, dated Aug. 10, 2017, 10 pages.
Final Office Action for U.S. Appl. No. 141/46,669, dated Aug. 28, 2017, 11 pages.

\* cited by examiner

ANALYZING USAGE OF VISUAL CONTENT TO DETERMINE RELATIONSHIPS INDICATING UNSUCCESSFUL ATTEMPTS TO RETRIEVE THE VISUAL CONTENT

CROSS REFERENCE TO RELATED APPLICATIONS

This application is a continuation of U.S. Pat. No. 8,489,987, titled "Monitoring and Analyzing Creation and Usage of Visual Content," filed Nov. 5, 2008; which is a continuation in part of U.S. Pat. No. 7,702,673, titled "System And Methods For Creation And Use Of A Mixed Media Environment," filed Jul. 31, 2006; U.S. Pat. No. 8,600,989, titled "Method And System For Image Matching In A Mixed Media Environment," filed Jul. 31, 2006; U.S. Pat. No. 8,335,789, titled "Method And System For Document Fingerprinting Matching In A Mixed Media Environment," filed Jul. 31, 2006; U.S. Pat. No. 8,332,401, titled "Method And System For Position-Based Image Matching In A Mixed Media Environment," filed Jul. 31, 2006; U.S. Pat. No. 8,521,737, titled "Method And System For Multi-Tier Image Matching In A Mixed Media Environment," filed Jul. 31, 2006; U.S. Pat. No. 8,195,659, titled "Integration And Use Of Mixed Media Documents," filed Jul. 31, 2006; U.S. Pat. No. 8,156,427, titled "User Interface For Mixed Media Reality," filed Jul. 31, 2006; U.S. Pat. No. 7,639,387, titled "Authoring Tools Using A Mixed Media Environment," filed Jul. 31, 2006; U.S. Pat. No. 8,005,831, titled "System And Methods For Creation And Use Of A Mixed Media Environment With Geographic Location Information," filed Jul. 31, 2006; U.S. Pat. No. 7,669,148, titled "System And Methods For Portable Device For Mixed Media System," filed Jul. 31, 2006; U.S. Pat. No. 7,812,986, titled "System And Methods For Use Of Voice Mail And Email In A Mixed Media Environment," filed Jul. 31, 2006; U.S. Pat. No. 7,551,780, titled "System And Method For Using Individualized Mixed Document," filed Jul. 31, 2006; U.S. Pat. No. 8,838,591, titled "Embedding Hot Spots In Electronic Documents," filed Jul. 31, 2006; U.S. Pat. No. 8,949,287, titled "Embedding Hot Spots In Imaged Documents," filed Jul. 31, 2006; U.S. Pat. No. 7,885,955, titled "Shared Document Annotation," filed Jul. 31, 2006; U.S. Pat. No. 7,917,554, titled "Visibly-Perceptible Hot Spots In Documents," filed Jul. 31, 2006; U.S. Pat. No. 7,587,412, titled "Mixed Media Reality Brokerage Network and Methods of Use," filed Aug. 22, 2006; U.S. Pat. No. 9,171,202, titled "Data Organization and Access for Mixed Media Document System," filed Jul. 31, 2006; U.S. patent application Ser. No. 11/461,164, titled "Database for Mixed Media Document System," filed Jul. 31, 2006; U.S. Pat. No. 7,991,778, titled "Triggering Actions With Captured Input In A Mixed Media Environment," filed Jul. 31, 2006; U.S. Pat. No. 7,672,543, titled "Triggering Applications Based On A Captured Text In A Mixed Media Environment," filed Jul. 31, 2006; U.S. Pat. No. 7,920,759, titled "Triggering Applications For Distributed Action Execution And Use Of Mixed Media Recognition As A Control Input," filed Jul. 31, 2006; U.S. patent application Ser. No. 11/461,109, titled "Searching Media Content For Objects Specified Using Identifiers," filed Jul. 31, 2006; U.S. Pat. No. 8,276,088, titled "User Interface For Three-Dimensional Navigation," filed Jul. 11, 2007; U.S. Pat. No. 8,156,115, titled "Document-Based Networking With Mixed Media Reality," filed Mar. 31, 2008; U.S. patent application Ser. No. 12/059,583, titled "Invisible Junction Feature Recognition For Document Security Or Annotation," filed Mar. 31, 2008; U.S. patent application Ser. No. 12/060,198, titled "Document Annotation Sharing," filed Mar. 31, 2008; U.S. Pat. No. 8,989,431, titled "Ad Hoc Paper-Based Networking With Mixed Media Reality," filed Mar. 31, 2008; U.S. patent application Ser. No. 12/060,206, titled "Indexed Document Modification Sharing With Mixed Media Reality," filed Mar. 31, 2008; U.S. Pat. No. 8,385,589, titled "Web-Based Content Detection In Images, Extraction And Recognition," filed May 15, 2008; U.S. Pat. No. 8,086,038, titled "Invisible Junction Features For Patch Recognition," filed Jul. 11, 2007; U.S. Pat. No. 8,144,921, titled "Information Retrieval Using Invisible Junctions and Geometric Constraints," filed Jul. 11, 2007; U.S. Pat. No. 8,184,155, titled "Recognition And Tracking Using Invisible Junctions," filed Jul. 11, 2007; U.S. Pat. No. 8,176,054, titled "Retrieving Documents By Converting Them to Synthetic Text," filed Jul. 12, 2007; U.S. Pat. No. 7,970,171, titled "Synthetic Image and Video Generation From Ground Truth Data," filed Jan. 18, 2007; U.S. Pat. No. 8,825,682, titled "Architecture For Mixed Media Reality Retrieval Of Locations And Registration Of Images," filed Sep. 15, 2008; U.S. Pat. No. 8,510,283, titled "Automatic Adaption Of An Image Recognition System To Image Capture Devices," filed Sep. 15, 2008; U.S. Pat. No. 8,868,555, titled "Computation Of A Recognizability Score (Quality Predictor) For Image Retrieval," filed Sep. 15, 2008; U.S. Pat. No. 8,856,108, titled "Combining Results Of Image Retrieval Processes" filed Sep. 15, 2008; all of which are incorporated by reference herein in their entirety.

BACKGROUND OF THE INVENTION

Field of the Invention

The invention relates to techniques for creating a mixed media document that is formed from at least two media types, and more particularly, to registering an image and other data in a Mixed Media Reality (MMR) system that uses printed media in combination with electronic media to retrieve mixed media documents. Still more particularly, the present invention relates to monitoring and analyzing the creation and usage of mixed media documents in the MMR system.

Background of the Invention

Document printing and copying technology has been used for many years in many contexts. By way of example, printers and copiers are used in commercial office environments, in home environments with personal computers, and in document printing and publishing service environments. However, printing and copying technology has not been thought of previously as a means to bridge the gap between static printed media (i.e., paper documents), and the "virtual world" of interactivity that includes the likes of digital communication, networking, information provision, advertising, entertainment and electronic commerce.

Printed media has been the primary source of communicating information, such as news papers and advertising information, for centuries. The advent and ever-increasing popularity of personal computers and personal electronic devices, such as personal digital assistant (PDA) devices and cellular telephones (e.g., cellular camera phones), over the past few years has expanded the concept of printed media by making it available in an electronically readable and searchable form and by introducing interactive multimedia capabilities, which are unparalleled by traditional printed media.

Unfortunately, a gap exists between the electronic multimedia-based world that is accessible electronically and the physical world of print media. For example, although almost everyone in the developed world has access to printed media and to electronic information on a daily basis, users of printed media and of personal electronic devices do not possess the tools and technology required to form a link between the two (i.e., for facilitating a mixed media document).

Moreover, there are particular advantageous attributes that conventional printed media provides such as tactile feel, no power requirements, and permanency for organization and storage, which are not provided with virtual or digital media. Likewise, there are particular advantageous attributes that conventional digital media provides such as portability (e.g., carried in storage of cell phone or laptop) and ease of transmission (e.g., email).

One particular problem is that a publisher cannot allow access to electronic versions of content using printed versions of the content. For example, for the publisher of a newspaper there is no mechanism that allows its users who receive the printed newspaper on a daily basis to use images of the newspaper to access the same online electronic content as well as augmented content. Moreover, while the publisher typically has the content for the daily newspaper in electronic form prior to printing, there currently does not exist a mechanism to easily migrate that content into an electronic form with augmented content.

A second problem in the prior art is that the image capture devices that are most prevalent and common as part of mobile computing devices (e.g., cell phones) produce low-quality images. In attempting to compare the low-quality images to pristine versions of printed documents, recognition is very difficult if not impossible. Thus there is a need for a method for recognizing low-quality images of printed newspapers.

A third problem in the prior art is that the image recognition process is computationally very expensive and can require seconds if not minutes to accurately recognize the page and location of a pristine document from an input query image. This can especially be a problem with a large data set, for example, millions of pages of documents. Thus, there is a need for mechanisms to improve the speed in which recognition can be performed.

A fourth problem in the prior is that comparing low-quality images to a database of pristine images often produces a number of possible matches. Furthermore, when low-quality images are used as the query image, multiple different recognition algorithms may be required in order to produce any match. Currently the prior art does not have a mechanism to combine the recognition results into a single result that can be presented to the user.

A fifth problem in the prior art is that there are not any existing mechanisms to determine the usage context for mobile devices. For example, existing service providers can track only basic information such as the time a telephone call or message is sent and the destination for the telephone call or message, but there is little more information than that to indicate the context in which the user is operating the mobile device. While the use of mobile devices, such as smart phones to access the Internet provides slightly more information such as available with web analytics, such existing tools do not provide enough information about the context in which the mobile device is being operated. Furthermore, web analytics do not provide information about the specific area of a given webpage being viewed. Existing web analytics tools may be able to identify the webpage that is presented to the user; however, they are not able to identify which area on the webpage that is of interest to the user.

For these reasons, a need exists for techniques, methods and systems that enable the use of mixed media reality systems in the area of mass media printed publishing.

SUMMARY OF THE INVENTION

The present invention overcomes the deficiencies of the prior art with an MMR system that includes an analytics module for monitoring and analyzing the creation and usage of visual content search. In one embodiment, the MMR system comprises a plurality of mobile devices, an MMR gateway, an MMR matching unit and an MMR publisher. The mobile devices are communicatively coupled to the MMR gateway to send retrieval requests including image queries and other contextual information. The MMR gateway processes retrieval requests from mobile devices, performs analytics and other communication, and then generates an image query that is passed on to the MMR matching unit. The MMR matching unit receives an image query from the MMR gateway and sends it to one or more of the recognition units to identify a result including a document, page and location on the page corresponding to the image query. The result is returned to the mobile device via the MMR gateway. The image registration unit of the MMR matching unit is also coupled to the MMR publisher to receive new content and update the index tables of the MMR matching unit accordingly.

In one embodiment, the analytics module is part of the MMR gateway and is particularly advantageous because it provides a mechanism for administrators to determine the usage patterns and other information about users of the MMR system. In one embodiment, this information is fed back to other components of the MMR system to improve its operation. The analytics module comprises a monitoring module, a usage database, an access analysis module, a presentation module and a content detection module. The monitoring module is coupled to other components of the MMR gateway and collects information about retrieval request, image queries, context information and recognition results. The usage database stores the information collected by the monitoring module. The access analysis module performs queries on the usage database and analyzes the results. The output of the access analysis module is provided to the presentation module for presentation or output to other systems and users.

The present invention also includes a variety of methods such as a method for monitoring and analyzing usage of visual content; a method for monitoring and capturing retrieval information; and a method for monitoring capturing creation information.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF PREFERRED EMBODIMENTS

Figure 1:
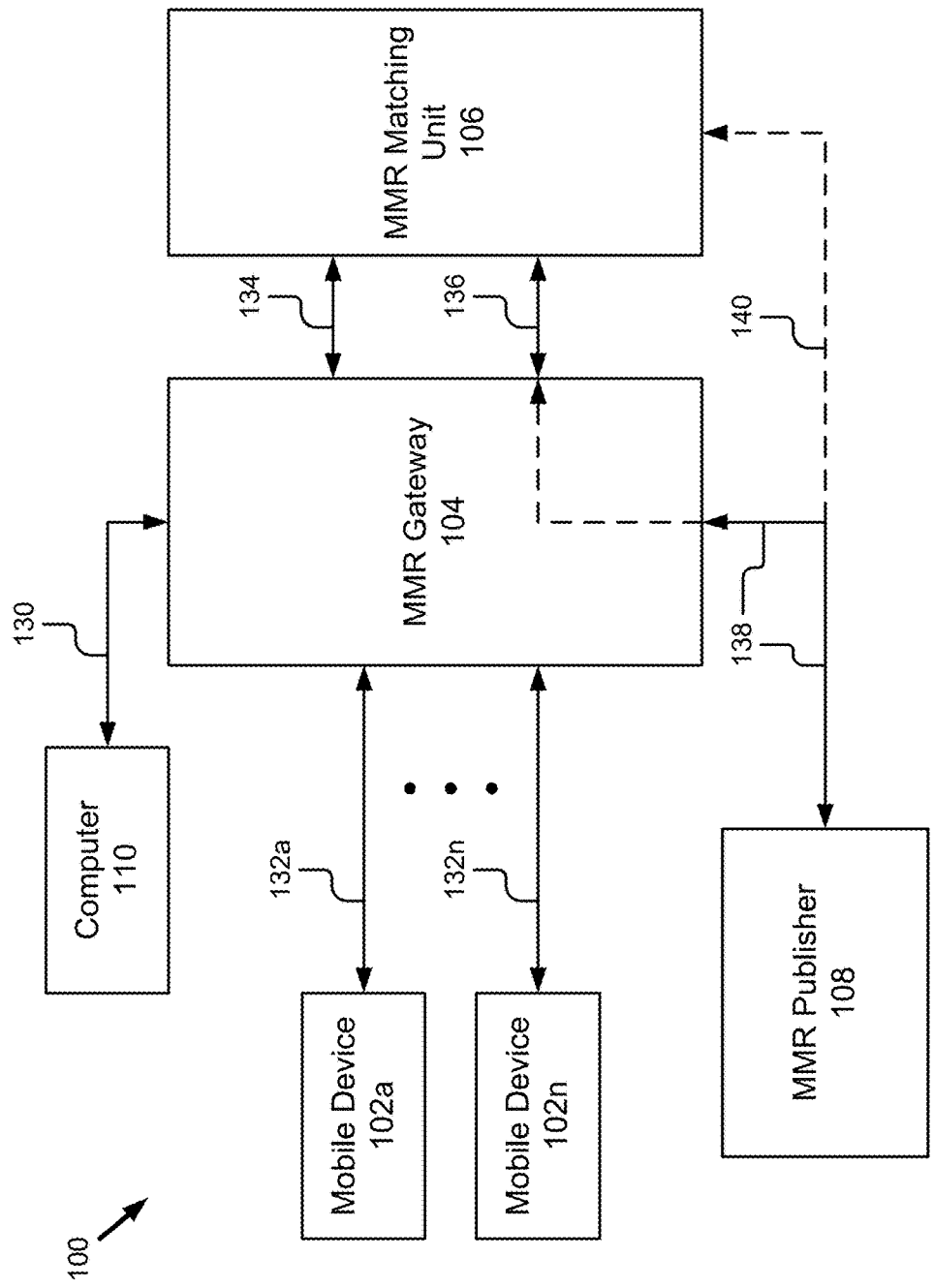
FIG. 1 is a block diagram of a first embodiment of system mixed-media reality retrieval of location and registration of images in accordance with the present invention.

An architecture for a mixed media reality (MMR) system 100 capable of receiving the query images and returning document pages and location as well as receiving images, hot spots and other data and adding such information to the MMR system is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to use with a conventional mass media publisher, in particular a newspaper publisher. However, the present invention applies to any type of computing system and data processing in which multiple types of media including electronic media and print media are used.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. In particular the present invention is described below in the context of two distinct architectures and some of the components are operable in both architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear from the description below. In addition, the present invention is described without reference to any particular programming language. It will be appreciated that a variety of programming languages may be used to implement the teachings of the invention as described herein.

System Overview

FIG. 1 shows an embodiment of a MMR system 100 in accordance with the present invention. The MMR system 100 comprises a plurality of mobile devices 102a-102n, an MMR gateway 104, an MMR matching unit 106, an MMR publisher 108 and a computer 110. The present invention provides an MMR system 100 for use in newspaper publishing. The MMR system 100 for newspaper publishing is particularly advantageous because provides an automatic mechanism for a newspaper publisher to register images and content with the MMR system 100. The MMR system 100 for newspaper publishing is also advantageous because it has a unique architecture adapted to respond to image queries formed of image portions or pages of a printed newspaper.

The mobile devices 102a-102n are communicatively coupled by signal lines 132a-132n, respectively, to the MMR gateway 104 to send a "retrieval request." A retrieval request includes one or more of "image queries," other contextual information and metadata. In one embodiment, an image query is an image in any format, or one or more features of an image. Example of image queries include still images, video frames and sequences of video frames. The mobile devices 102a-102n are mobile phones including a camera to capture images. It should be understood that the MMR system 100 will be utilized by hundreds or even thousands of users that receive a traditional publication such as a daily newspaper. Thus, even though only two mobile devices 102a, 102n are shown, those skilled in the art will appreciate that the MMR gateway 104 may be simultaneously coupled to, receive and respond to retrieval requests from numerous mobile devices 102a-102n. Alternate embodiments for the mobile devices 102a-102n are described in more detail below with reference to FIGS. 2A and 2B.

As noted above, the MMR gateway 104 is able to couple to hundreds if not millions of mobile computing devices 102a-102n and service their retrieval requests. The MMR gateway 104 is also communicatively coupled to the computer 110 by signal line 130 for administration and maintenance of the MMR gateway 104 and running business applications. In one embodiment, the MMR gateway 104 creates and presents a web portal for access by the computer 110 to run business applications as well as access logs of use of the MMR system 100. The computer 110 can be any conventional computing device such as a personal computer. The main function of the MMR gateway 104 is processing retrieval requests from the mobile devices 102a-102n and returning recognition results back to the mobile devices 102a-102n. In one embodiment, the recognition results include one or more of a Boolean value (true/false) and if true, a page ID and a location on the page. In other embodiments, the recognition results also include one or more from the group of actions, a message acknowledging that the recognition was successful (or not) and consequences of that decision, such as the sending of an email message, a document, actions defined within a portable document file, addresses such as URLs, binary data such as video, information capable of being rendered on the mobile device 102, menus with additional actions, raster images, image features, etc. The MMR gateway 104 processes received retrieval requests by performing user authentication, accounting, analytics and other communication. The MMR gateway 104 also generates an image query and recognition parameters from the retrieval request, and passes them on to the MMR matching unit 106 via signal line 134. Embodiments and operation of the MMR gateway 104 are described in greater detail below with reference to FIG. 3.

The MMR matching unit 106 receives the image query from the MMR gateway 104 on signal line 134 and sends it to one or more of recognition units to identify a result including a document, the page and the location on the page corresponding to the image query, referred to generally throughout this application as the "retrieval process." The result is returned from the MMR matching unit 106 to the MMR gateway 104 on signal line 134. In addition to the result, the MMR matching unit 106 may also return other related information such as hotspot data. The MMR matching unit 106 also includes components for receiving new content and updating and reorganizing index tables used in the retrieval process. The process of adding new content to the MMR matching unit 106 is referred to generally throughout this application as the "registration process." In one embodiment, the MMR matching unit 106 is coupled to the output of the MMR publisher 108 via signal lines 138 and 140 to provide new content used to update index tables of the MMR matching unit 106. In alternate embodiment, the MMR publisher 108 is coupled to the MMR gateway 104 by signal line 138 and the MMR gateway 104 is in turn coupled by signal line 136 to the MMR matching unit 106. In this alternate environment, MMR gateway 104 extracts augmented data such as hotspot information, stores it and passes the images, page references and other information to the MMR matching unit 106 for updating of the index tables. Various embodiments of the MMR matching unit 106 and its components are described in more detail below with reference to FIG. 4A-7.

The MMR publisher 108 includes a conventional publishing system used to generate newspapers or other types of periodicals. In one embodiment, the MMR publisher 108 also includes components for generating additional information needed to register images of printed documents with the MMR system 100. The information provided by the MMR publisher 108 to the MMR matching unit 106 includes an image file, bounding box data, hotspot data, and a unique page identification number. In the symbols of embodiment, this is a document in portable document format by Adobe Corp. of San Jose Calif. and bounding box information. An embodiment for the MMR publisher 108 is described in more detail below with reference to FIG. 8.

Mobile Device 102

Figure 2A:
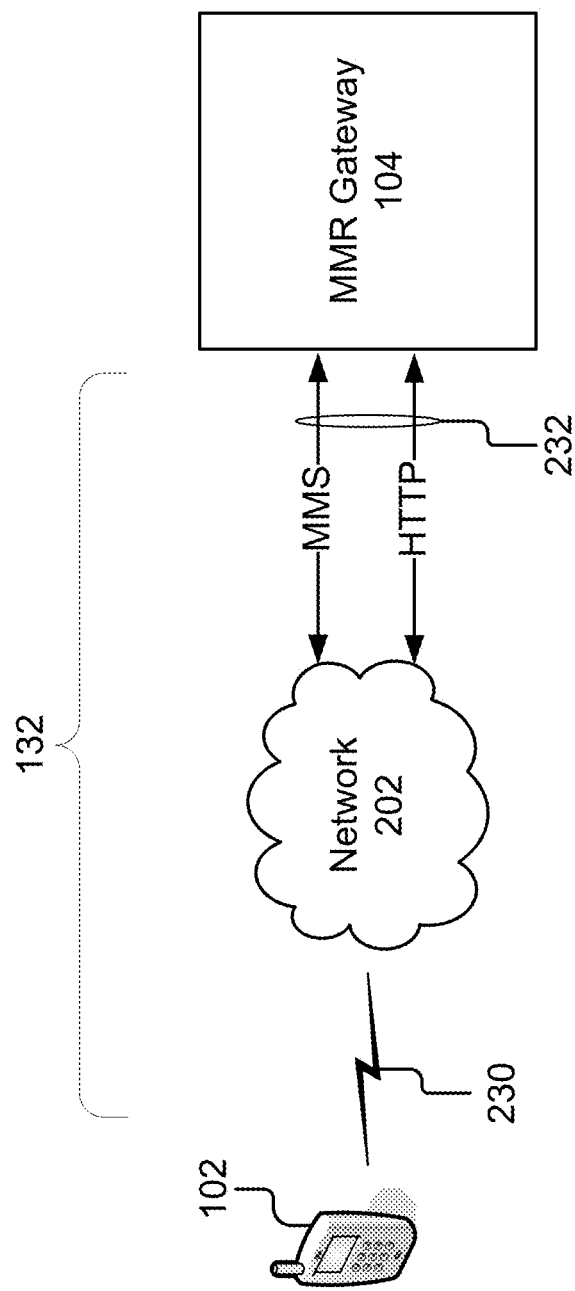
FIG. 2A is a block diagram of a first embodiment of a mobile device, network and MMR gateway configured in accordance with the present invention.
Figure 2B:
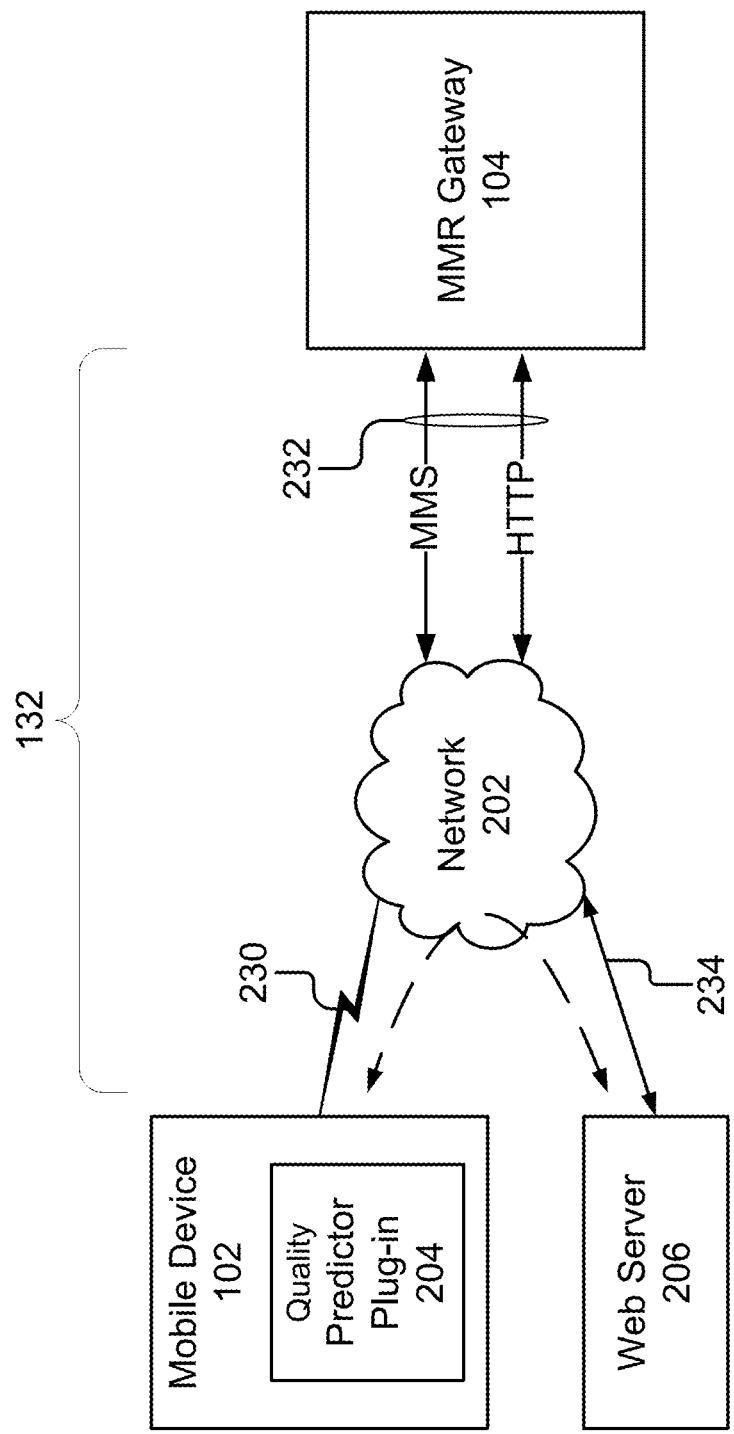
FIG. 2B is a block diagram of a second embodiment of a mobile device, network and MMR gateway configured in accordance with the present invention.

Referring now to FIGS. 2A and 2B, the first and second embodiment for the mobile device 102 will be described.

FIG. 2A shows a first embodiment of the coupling 132 between the mobile device 102 and the MMR gateway 104. In this embodiment, the mobile device 102 is any mobile phone (or other portable computing device with communication capability) that includes a camera. For example, the mobile device 102 may be a smart phone such as the Blackberry® manufactured and sold by Research In Motion. The mobile device 102 is adapted for wireless communication with the network 202 by a communication channel 230. The network 202 is a conventional type such as a cellular network maintained by wireless carrier and may include a server. In this embodiment, the mobile device 102 captures an image and sends the image to the network 202 over communications channel 230 such as by using a multimedia messaging service (MMS). The network 202 can also use the communication channel 230 to return results such as using MMS or using a short message service (SMS). As illustrated, the network 202 is in turn coupled to the MMR gateway 104 by signal lines 232. Signal lines 232 represent a channel for sending MMS or SMS messages as well as a channel for receiving hypertext transfer protocol (HTTP) requests and sending HTTP responses. Those skilled in the art will recognize that this is just one example of the coupling between the mobile device 102 and the MMR gateway 104. In an alternate embodiment for example, Bluetooth®, WiFi or any other wireless communication protocol may be used as part of communication coupling between the mobile device 102 and the MMR gateway 104. The mobile device 102 and the MMR gateway 104 could be coupled in any other ways understood by those skilled in the art (e.g., direct data connection, SMS, WAP, email) so long as the mobile device 102 is able to transmit images to the MMR gateway 104 and the MMR gateway 104 is able to respond by sending document identification, page number and location information.

Referring now to FIG. 2B, a second embodiment of the mobile device 102 is shown. In this second embodiment, the mobile device 102 is a smart phone such as the iPhone™ manufactured and sold by Apple Computer Inc. of Cupertino Calif. The second embodiment has a number of components similar to those of the first embodiment, and therefore, like reference numbers are used to reference like components with the same or similar functionality. Notable differences between the first embodiment and the second embodiment include a quality predictor plug-in 204 that is installed on the mobile device 102, and a Web server 206 coupled by signal line 234 to the network 202. The quality predictor plug-in 204 analyzes the images captured by the mobile device 102. The quality predictor plug-in 204 provides additional information produced by its analysis and includes that information as part of the retrieval request sent to the MMR gateway 104 to improve the accuracy of recognition. In an alternate embodiment, the output of the quality predictor plug-in 204 is used to select which images are transmitted from the mobile device 102 to the MMR gateway 104. For example, only those images that have a predicted quality above a predetermined threshold (e.g., images capable of being recognized) are transmitted from the mobile device 102 to the MMR gateway 104. Since transmission of images requires significant bandwidth and the communication channel 230 between the mobile device 102 and the network 202 may have limited bandwidth, using the quality predictor plug-in 204 to select which images to transmit is particularly advantageous. The second embodiment shown in FIG. 2B also illustrates how the results returned from the MMR gateway 104 or other information provided by the quality predictor plug-in 204 can be used by the mobile device 102 to access hotspot or augmented information available on a web server 206. In such a case, the results from the MMR gateway 104 or output of the quality predictor plug-in 204 would include information that can be used to access Web server 206 such as with a conventional HTTP request and using web access capabilities of the mobile device 102.

It should be noted that regardless of whether the first embodiment or the second embodiment of the mobile device 102 is used, the mobile device 102 generates the retrieval request that includes: a query image, a user or device ID, a command and other contact information such as device type, software, plug-ins, location (for example if the mobile device includes a GPS capability), device and status information (e.g., device model, macro lens on/off status, autofocus on/off, vibration on/off, tilt angle, etc), context-related information (weather at the phone's location, time, date, applications currently running on the phone), user-related information (e.g., id number, preferences, user subscriptions, user groups and social structures, action and action-related meta data such as email actions and emails waiting to be sent), etc.

Referring now to FIGS. 2C-2H, various embodiments are shown of a plug-in (client 250) for the mobile device 102, the MMR gateway 104 and MMR matching unit 106 represented generally as including a server 252 that has various possible configurations in accordance with the present invention. More particularly, FIGS. 2C-2H illustrate how the components of the plug-in or client 250 can have varying levels of functionality and the server 252 can also have varying levels of functionality that parallel or match with the functionality of the client 250. In the various embodiments of FIGS. 2C-2H, either the client 250 or the server 252 includes: an MMR database 254; a capture module 260 for capturing an image or video; a preprocessing module 262 for processing the image before feature extraction for improved recognition such as quality prediction; a feature extraction module 264 for extracting image features; a retrieval module 266 for using features to retrieve information from the MMR database 254; a send message module 268 for sending messages from the server 252 to the client 250; an action module 270 for performing an action; a preprocessing and prediction module 272 for processing the image prior to feature extraction; a feedback module 274 for presenting information to the user and receiving input; a sending module 276 for sending information from the client 250 to the server 252; and a streaming module 278 for streaming video from the client 250 to the server 252.

Figure 2C:
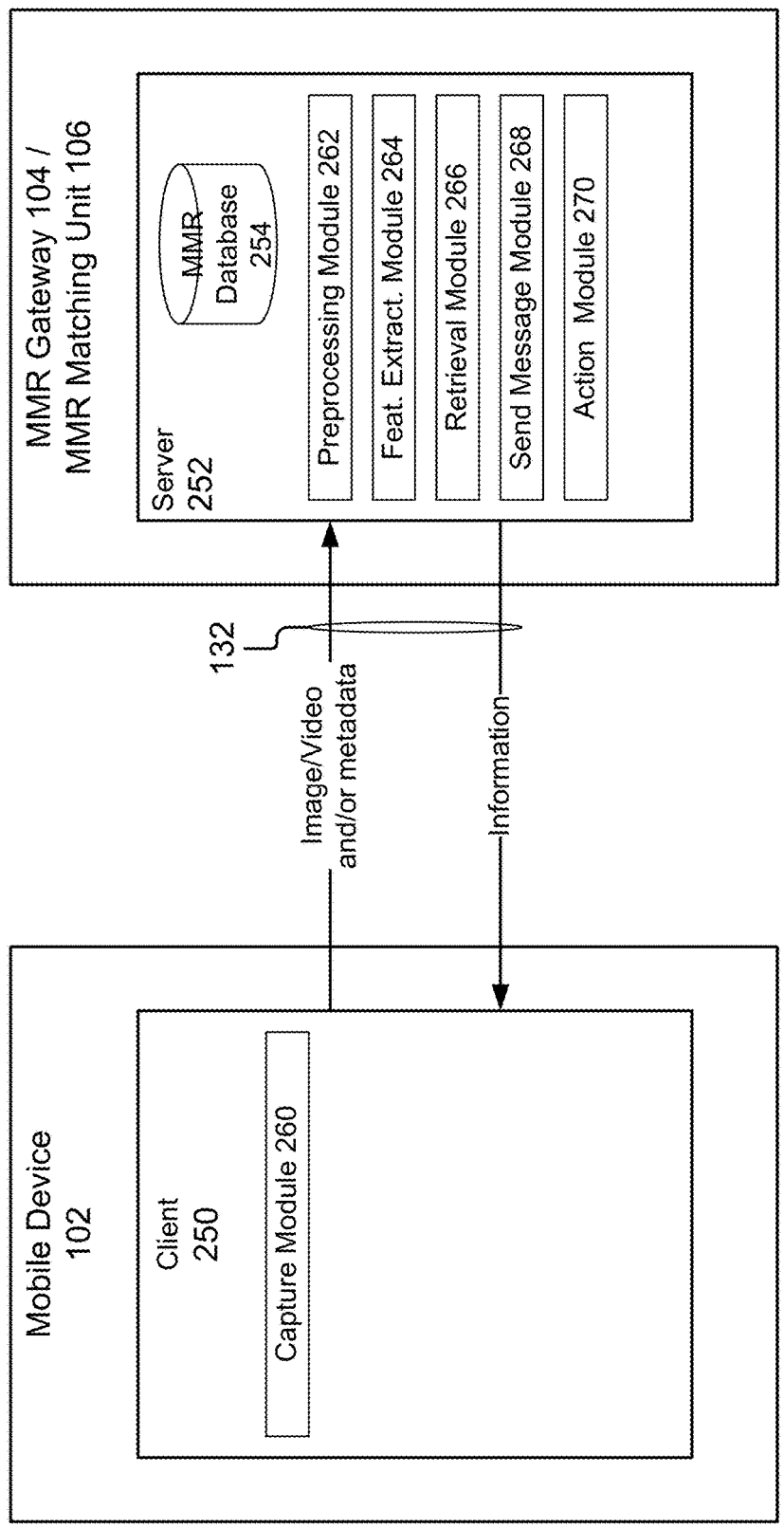
FIGS. 2C-2H are block diagrams of various embodiments of a mobile device plug-in, MMR gateway and MMR matching unit showing various possible configurations in accordance with the present invention.

FIG. 2C illustrates one embodiment for the client 250 and the server 252 in which the client 250 sends an image or video and/or metadata to the server 252 for processing. In this embodiment, the client 250 includes the capture module 260. The server 252 includes: the MMR database 254, the preprocessing module 262, the feature extraction module 264, the retrieval module 266, the send message module 268 and the action module 270.

Figure 2D:
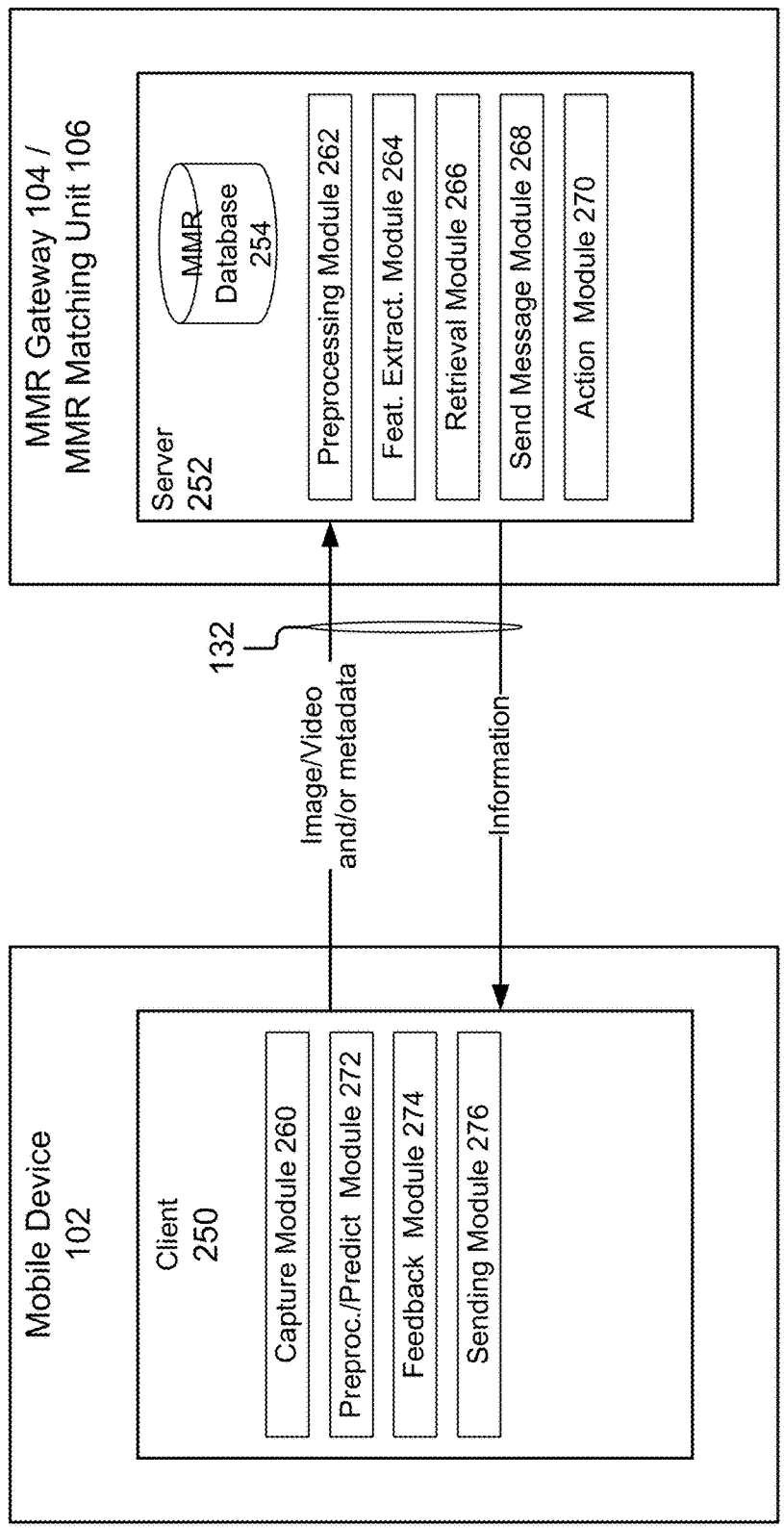

FIG. 2D illustrates another embodiment for the client 250 and the server 252 in which the client 250 captures an image or video, runs quality prediction, and sends an image or video and/or metadata to the server 252 for processing. In this embodiment, the client 250 includes: the capture module 260, the preprocessing and prediction module 272, the feedback module 274 and the sending module 276. The server 252 includes: the MMR database 254, the preprocessing module 262, the feature extraction module 264, the retrieval module 266, the send message module 268 and the action module 270. It should be noted that in this embodiment the image sent to the server 252 may be different than the captured image. For example, the image sent may be digitally enhanced, sharpened, or may be just binary data.

Figure 2E:
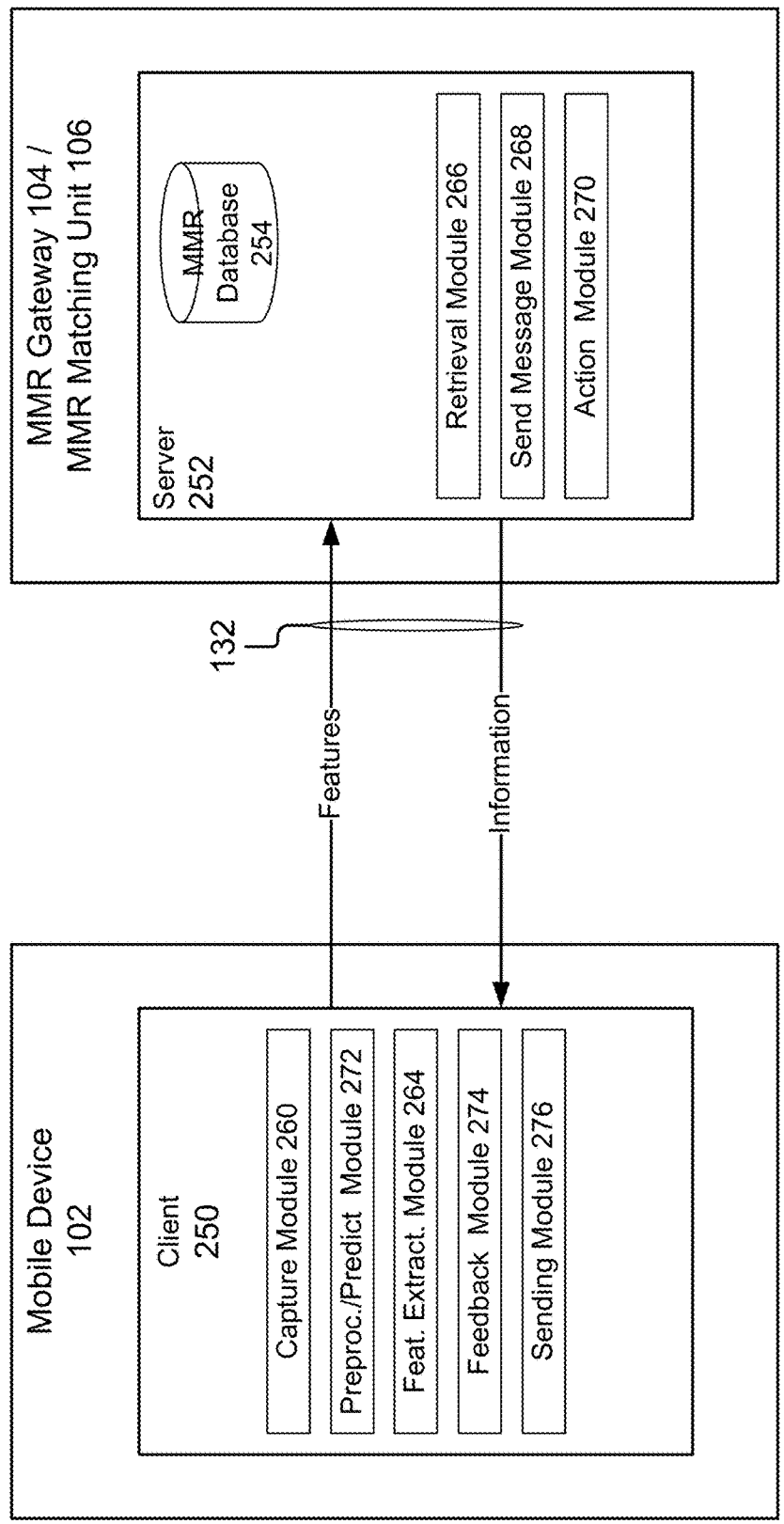

FIG. 2E illustrates another embodiment for the client 250 and the server 252 in which the client 250 captures an image or video, performs feature extraction and sends image features to the server 252 for processing. In this embodiment, the client 250 includes: the capture module 260, the feature extraction module 264, the preprocessing and prediction module 272, the feedback module 274 and the sending module 276. The server 252 includes: the MMR database 254, the retrieval module 266, the send message module 268 and the action module 270. It should be noted that in this embodiment feature extraction may include preprocessing. After features are extracted, the preprocessing and prediction module 272 may run on these features and if the quality of the features is not satisfactory, the user may be asked to capture another image.

Figure 2F:
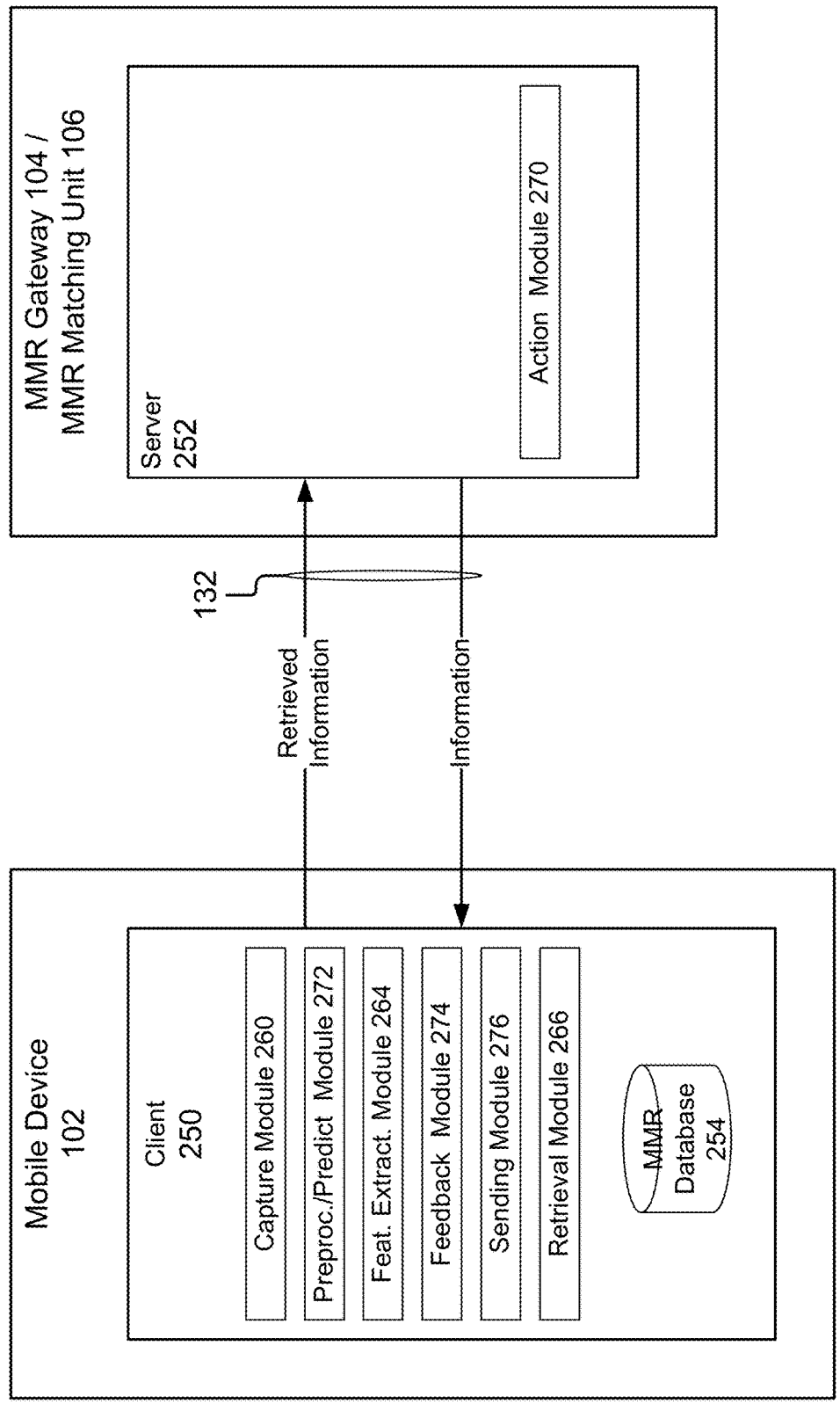

FIG. 2F illustrates another embodiment for the client 250 and the server 252 in which the entire retrieval process is performed at the client 250. In this embodiment, the client 250 includes: the capture module 260, the feature extraction module 264, the preprocessing and prediction module 272, the feedback module 274 and the sending module 276, the MMR database 254, and the retrieval module 266. The server 252 need only have the action module 270. In a modification to this embodiment, the entire retrieval for one recognition algorithm is run on the client 250 of the mobile device 102, and if the query fails, the captured image is sent to the server 252 as described above with reference to FIG. 2C to that the server 252 process the captured image with more complex retrieval algorithms.

Figure 2G:
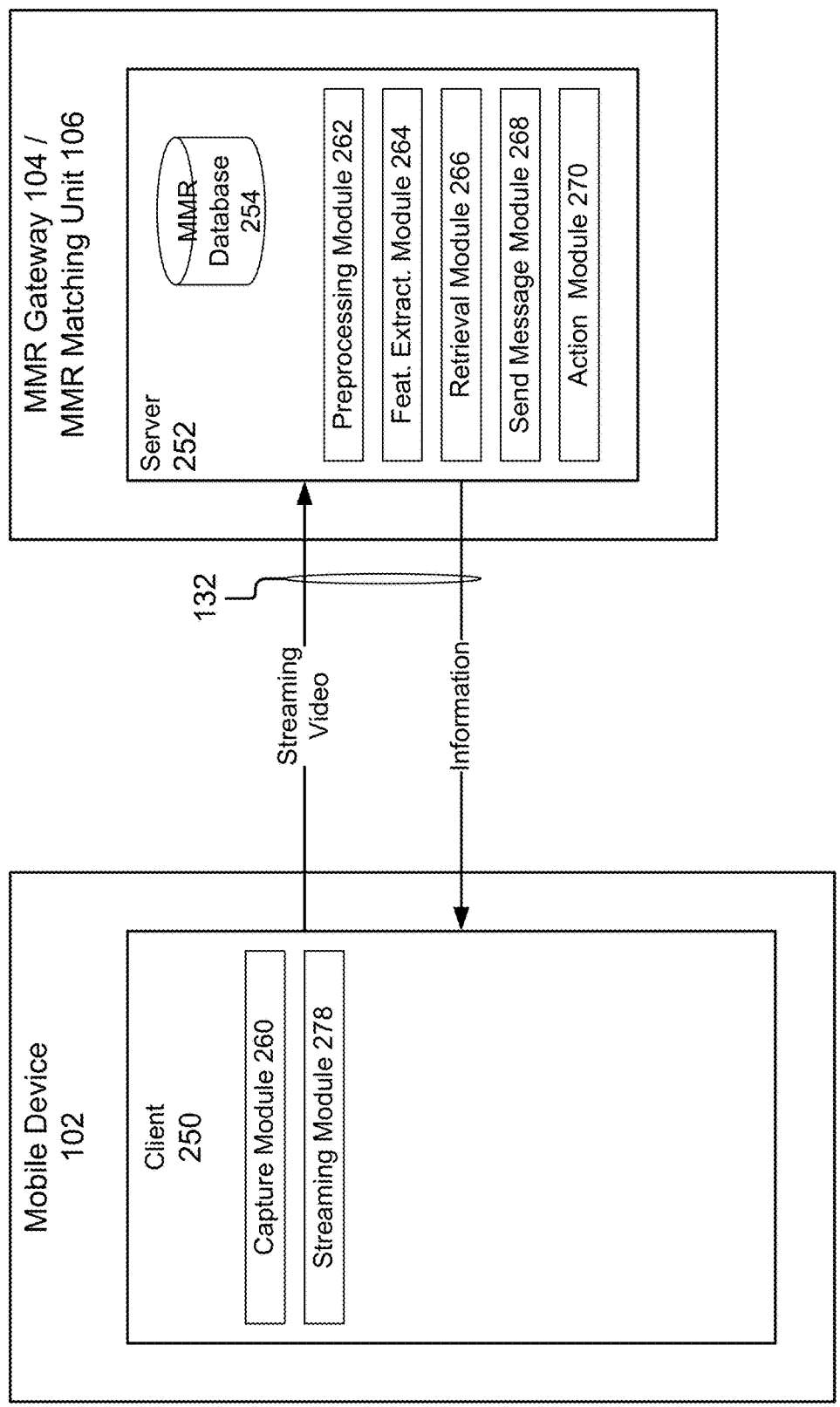

FIG. 2G illustrates another embodiment for the client 250 and the server 252 in which the client 250 streams video to the server 252. In this embodiment, the client 250 includes the capture module 260 and a streaming module 278. The server 252 includes the MMR database 254, the preprocessing module 262, the feature extraction module 264, the retrieval module 266, the send message module 268 and the action module 270. Although not shown, the client 250 can run a predictor in the captured video stream and provide user feedback on where to point the camera or how to capture better video for retrieval. In a modification of this embodiment, the server 252 streams back information related to the captured video and the client 250 can overlay that information on a video preview screen.

Figure 2H:
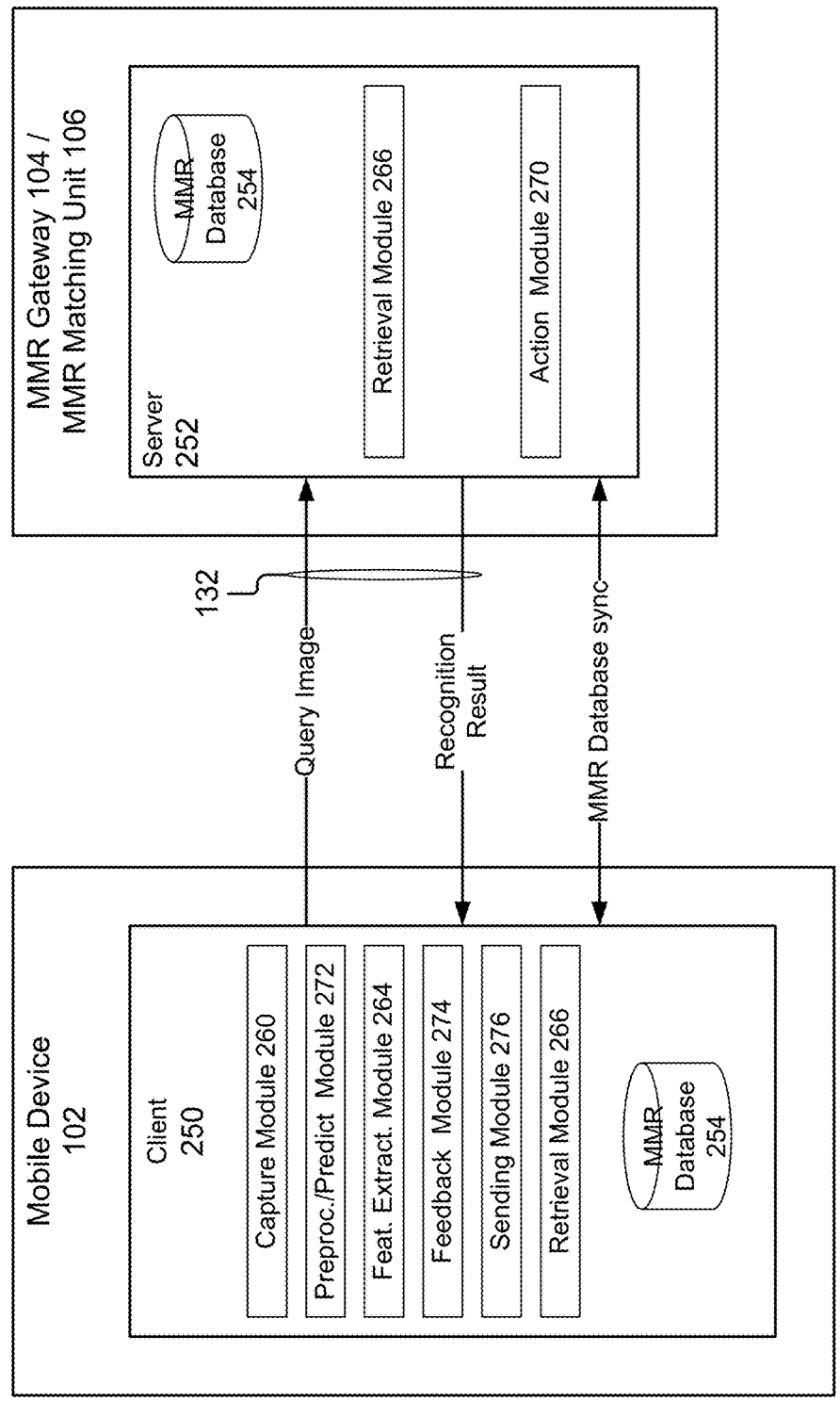

FIG. 2H illustrates another embodiment for the client 250 and the server 252 in which the client 250 runs a recognizer and the server 252 streams MMR database information to a local database operable with the client 250 based upon a first recognition result. This embodiment is similar to that described above with reference to FIG. 2F. For example, the entire retrieval process for one recognition algorithm is run at the client 250. If the recognition algorithm fails, the query is handed to the server 252 for running more complex retrieval algorithm. In this embodiment, the client 250 includes: the capture module 260, the feature extraction module 264, the preprocessing and prediction module 272, the feedback module 274, the sending module 276, the MMR database 254 (a local version) and the retrieval module 266. The server 252 includes another retrieval module 266, the action module 270 and the MMR database 254 (a complete and more complex version). In one embodiment, if the query image cannot be recognized with the local MMR database 254, the client 250 sends an image for retrieval to the server 252 and that initiates an update of the local MMR database 254. Alternatively, the client 250 may contain an updated version of a database for one recognizer, but if the query image cannot be retrieved from the local MMR database 254, then a database for another retrieval algorithm may be streamed to the local MMR database 254.

MMR Gateway 104

Figure 3:
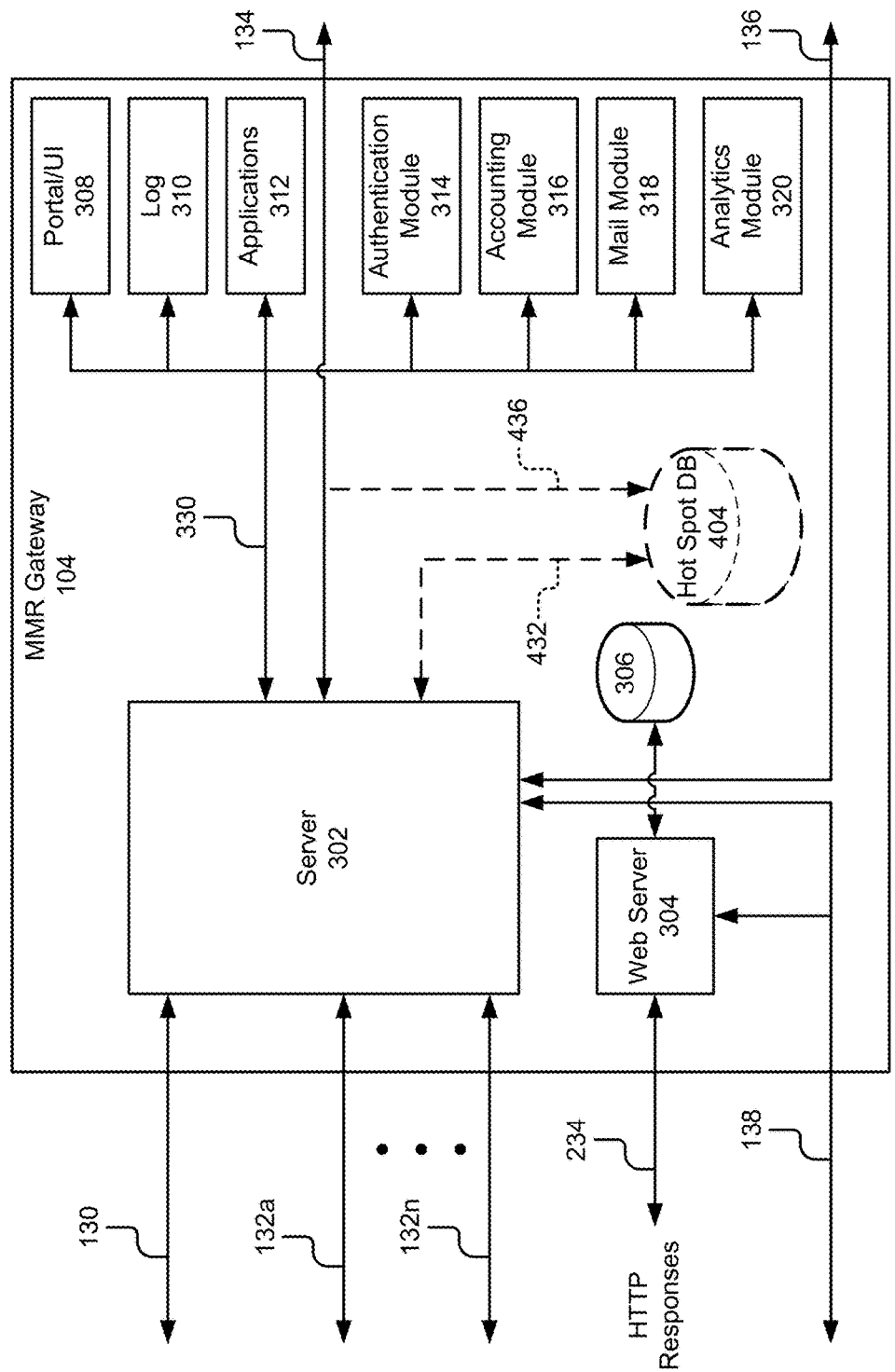
FIG. 3 is a block diagram of an embodiment of an MMR gateway in accordance with the present invention.

Referring now to FIG. 3, one embodiment of the MMR gateway 104 is shown. This embodiment of the MMR gateway 104 comprises a server 302, a Web server 304, a data store 306, a portal module 308, a log 310, one or more applications 312, an authentication module 314, an accounting module 316, a mail module 318 and an analytics module 320.

As noted above, one of the primary functions of the MMR gateway 104 is to communicate with many mobile devices 102 to receive retrieval requests and send responses including a status indicator (true=recognized/false=not recognized), a page identification number, a location on the page and other information such as hotspot data. A single MMR gateway 104 can respond to hundreds or millions of retrieval requests. For convenience and ease of understanding only a single MMR gateway 104 is shown in FIGS. 1 and 3, however, those skilled in the art will recognize that in other embodiments any number of MMR gateways 104 may be utilized to service the needs of a multitude of mobile devices 102. More particularly, the server 302 of the MMR gateway 104 is coupled to signal lines 132*a*-132*n* for communication with various mobile devices 102. The server 302 receives retrieval requests from the mobile devices 102 via signal lines 132*a*-132*n* and sends responses back to the mobile devices 102 using the same signal lines 132*a*-132*n*. In one embodiment, the retrieval request includes: a command, a user identification number, an image and other context information. For example, other context information may include: device information such as the make, model or manufacture of the mobile device 102; location information such as provided by a GPS system that is part of the mobile device or by triangulation; environmental information such as time of day, temperature, weather conditions, lighting, shadows, object information; and placement information such as distance, location, tilt and jitter.

The server 302 is also coupled to signal line 130 for communication with the computer 110. Again, for convenience and ease of understanding only a single computer 110 and signal line 130 are shown in FIGS. 1 and 3, but any number of computing devices may be adapted for communication with the server 302. The server 302 facilitates communication between the computer 110 and the portal module 308, the log module 310 and the applications 312. The server 302 is coupled to the portal module 308, the log module 310 and the applications 312 by signal line 330. As will be described in more detail below, the modules cooperate with the server 302 to present a web portal that provides a user experience for exchanging information. The Web portal 308 can also be used for system monitoring, maintenance and administration.

The server 302 processes the retrieval request and generates an image query and recognition parameters that are sent via signal line 134 to the MMR matching unit 106 for recognition. The server 302 also receives recognition responses from the MMR matching unit 106 via signal line 134. The server 302 also processes the retrieval request and sends information via signal line 330 to the other components of the MMR gateway 104 as will be described below. The server 302 is also adapted for communication with the MMR publisher 108 by signal line 138 and the MMR matching unit 106 via signal line 136. The signal line 138 provides a path for the MMR publisher 108 to send Web content for hotspots to the Web server 304 and to provide other information to the server 302. In one embodiment, the server 302 receives information from the MMR publisher 108 and sends that information via signal line 136 for registration with the MMR matching unit 106.

The web server 304 is a conventional type and is responsible for accepting requests from clients and sending responses along with data contents, such as web pages, documents and linked objects (images, etc.) The Web server 304 is coupled to data store 306 such as a conventional database. The Web server 304 is adapted for communication via signal line 234 to receive HTTP requests from any communication device across a network such as the Internet. The Web server 304 is also coupled to signal line 138 as described above to receive Web content associated with hotspots for storage in the data store 306 and then for later retrieval and transmission in response to HTTP requests. Those skilled in the art will understand that inclusion of the Web server 304 and data store 306 as part of the MMR gateway 104 is merely one embodiment and that the Web server 304 and the data store 306 may be operational in any number of alternate locations or configuration so long as the Web server 304 is accessible to mobile devices 102 and computers 110 via the Internet.

In one embodiment, the portal module 308 is software or routines operational on the server 302 for creation and presentation of the Web portal. The portal module 308 is coupled to signal line 330 for communication with the server 302. In one embodiment, the web portal provides an access point for functionality including administration and maintenance of other components of the MMR gateway 104. In another embodiment, the web portal provides an area where users can share experiences related to MMR documents. In yet another embodiment, the web portal is an area where users can access business applications and the log 310 of usage.

The log 310 is a memory or storage area for storing a list of the retrieval requests received by the server 302 from mobile devices 102 and all corresponding responses sent by the server 302 to the mobile devices. In another embodiment, the log 310 also stores a list of the image queries generated and sent to the MMR matching unit 106 and the recognition responses received from the MMR matching unit 106. The log 310 is coupled to signal line 330 for access by the server 302.

The one or more business applications 312 are software and routines for providing functionality related to the processing of MMR documents. In one embodiment the one or more business applications 312 are executable on the server 302. The business applications 312 can be any one of a variety of types of business applications adapted to utilize information related to the processing of retrieval quests and delivery of recognition responses such as but not limited to accounting, groupware, customer relationship management, human resources, outsourcing, loan origination, customer care, service relationships, etc.

The authentication module 314 is software and routines for maintaining a list of authorized users and granting access to the MMR system 110. In one embodiment, the authentication module 314 maintains a list of user IDs and passwords corresponding to individuals who have created an account in the system 100, and therefore, are authorized to use MMR gateway 104 and the MMR matching unit 106 to process retrieval requests. The authentication module 314 is communicatively coupled by signal line 330 to the server 302. But as the server 302 receives retrieval requests they can be processed and compared against information in the authentication module 314 before generating and sending the corresponding image query on signal line 134. In one embodiment, the authentication module 314 also generates messages for the server 302 to return to the mobile device 102 instances when the mobile device is not authorized, the mobile device has not established an account, or the account for the mobile device 102 is locked such as due to abuse or lack of payment.

The accounting module 316 is software and routines for performing accounting related to user accounts and use of the MMR system 100. In one embodiment, the retrieval services are provided under a variety of different economic models such as but not limited to use of the MMR system 100 under a subscription model, a charge per retrieval request model or various other pricing models. In one embodiment, the MMR system 100 provides a variety of different pricing models and is similar to those currently offered for cell phones and data networks. The accounting module 316 is coupled to the server 302 by signal line 330 to receive an indication of any retrieval request received by the server 302. In one embodiment, the accounting module 316 maintains a record of transactions (retrieval request/recognition responses) processed by the server 302 for each mobile device 102. Although not shown, the accounting module 316 can be coupled to a traditional billing system for the generation of an electronic or paper bill.

The mail module 318 is software and routines for generating e-mail and other types of communication. The mail module 318 is coupled by signal at 330 to the server 302. In one embodiment, the mobile device 102 can issue retrieval requests that include a command to deliver a document or a portion of a document or other information via e-mail, facsimile or other traditional electronic communication means. The mail module 318 is adapted to generate and send such information from the MMR gateway 104 to an addressee as prescribed by the user. In one embodiment, each user profile has associated addressees which are potential recipients of information retrieved.

The analytics module 320 is software and routines for measuring the behavior of users of the MMR system 100. The analytics module 320 is also software and routines for measuring the effectiveness and accuracy of feature extractors and recognition performed by the MMR matching unit 106. The analytics module 320 measures use of the MMR system 100 including which images are most frequently included as part of retrieval requests, which hotspot data is most often accessed, the order in which images are retrieved, the first image in the retrieval process, and other key performance indicators used to improve the MMR experience and/or a marketing campaign's audience response. In one embodiment, the analytics module 320 measures metrics of the MMR system 100 and analyzes the metrics used to measure the effectiveness of hotspots and hotspot data. The analytics module 320 is coupled to the server 302, the authentication module 314 and the accounting module 316 by signal line 330. The analytics module 320 is also coupled by the server 302 to signal line 134 and thus can access the components of the MMR matching unit 106 to retrieve recognition parameters, images features, quality recognition scores and any other information generated or used by the MMR matching unit 106. The analytics module 320 can also perform a variety of data retrieval and segmentation based upon parameters or criteria of users, mobile devices 102, page IDs, locations, etc.

In one embodiment, the MMR gateway 104 also includes a hotspot database 404. The hotspot database 404 is shown in FIG. 3 with dashed lines to reflect that inclusion in the MMR gateway 104 is an alternate embodiment. The hotspot database 404 is coupled by signal line 436 to receive the recognition responses via line 134. The hotspot database 404 uses these recognition responses to query the database and output via line 432 the hotspot content corresponding to the recognition responses. This hotspot content is sent to the server 302 so that it can be included with the recognition responses and sent to the requesting mobile device 102.

MMR Matching Unit 106

Figure 4A:
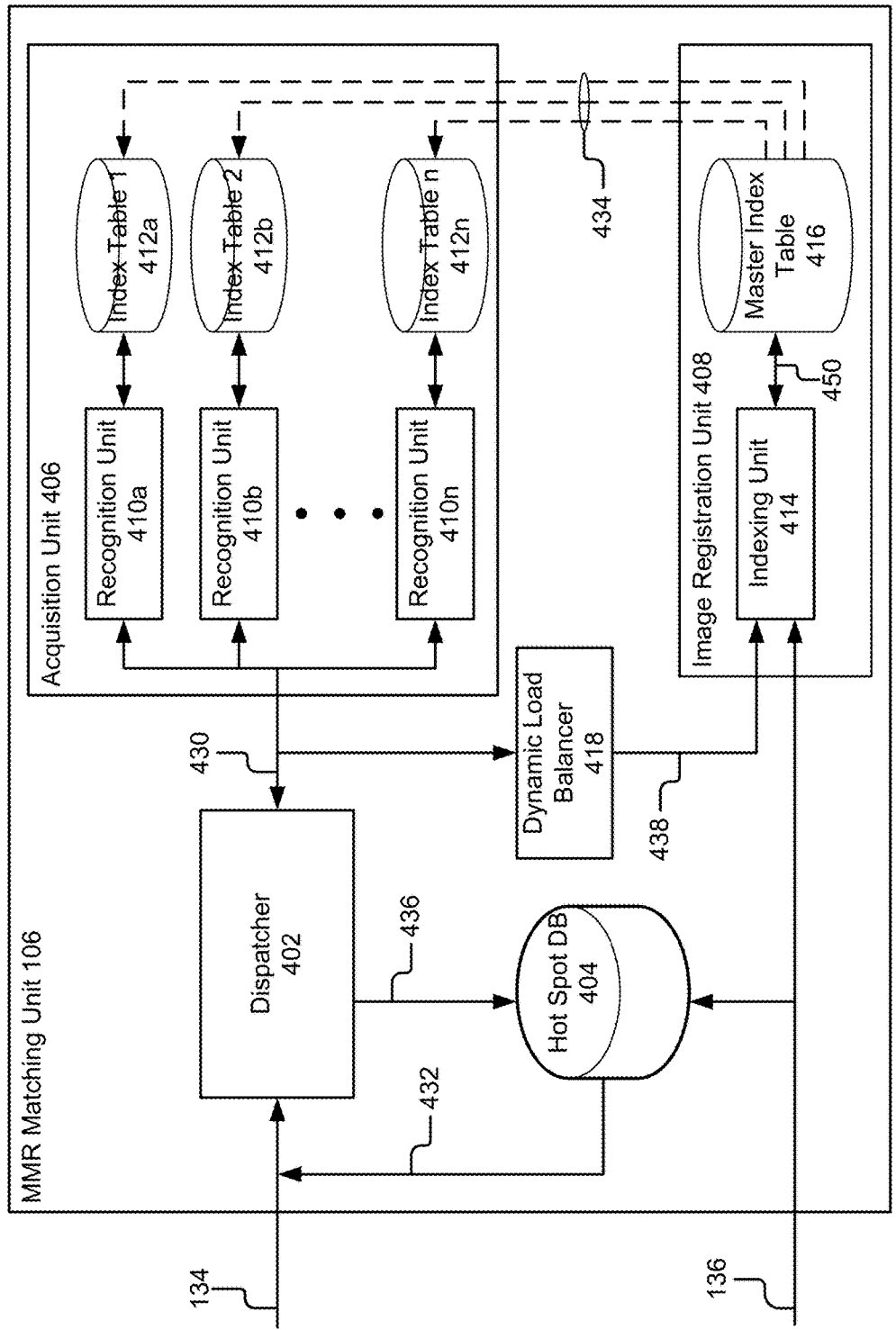
FIG. 4A is a block diagram of a first embodiment of a MMR matching unit in accordance with the present invention.
Figure 4B:
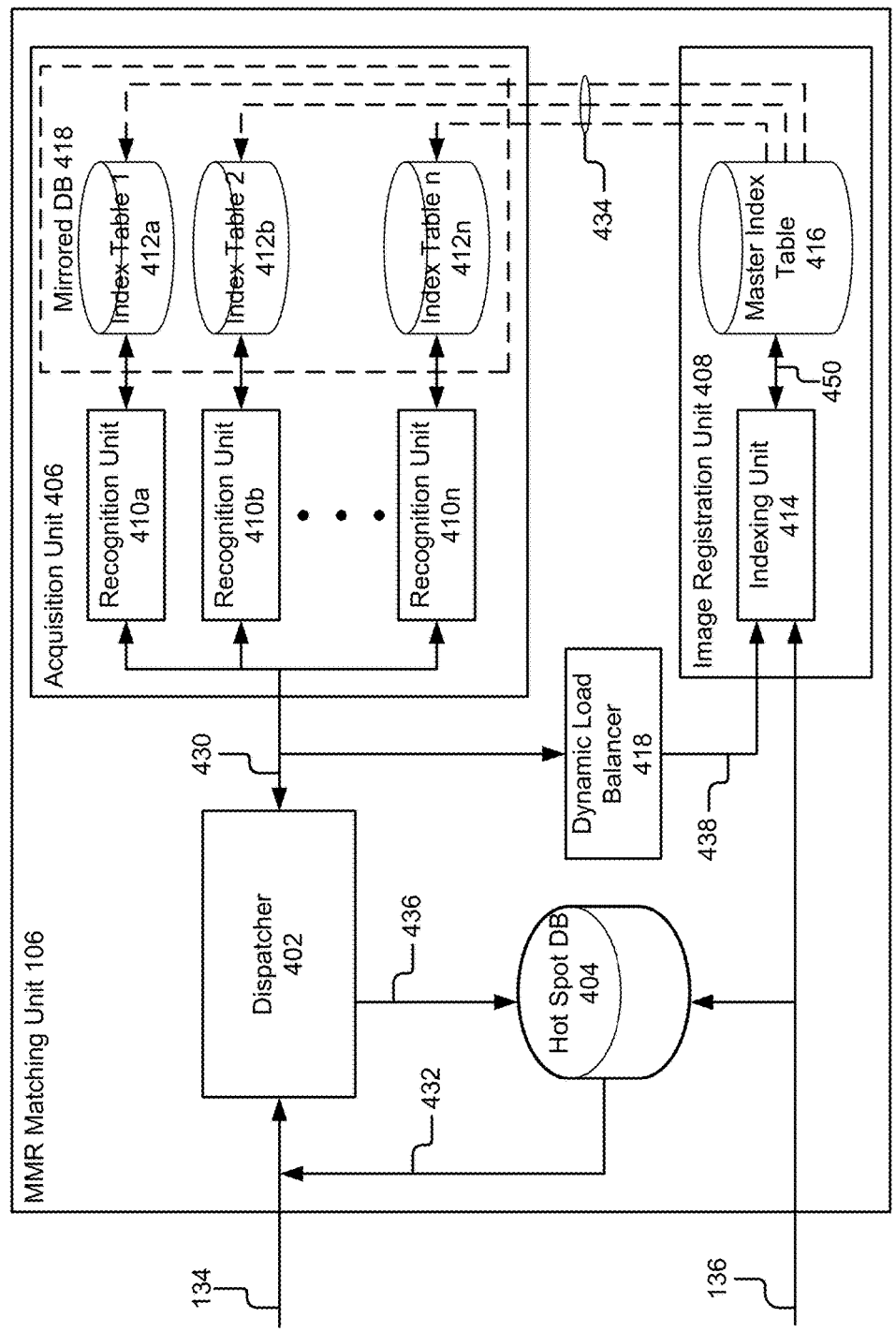
FIG. 4B is a block diagram of a second embodiment of the MMR matching unit in accordance with the present invention.

Referring now to FIGS. 4A and 4B, two embodiments for the MMR matching unit 106 will be described. The basic function of the MMR matching unit 106 is to receive an image query, send the image query for recognition, perform recognition on the images in the image query, retrieve hotspot information, combine the recognition result with hotspot information and send it back to the MMR gateway 104.

FIG. 4A illustrates a first embodiment of the MMR matching unit 106. The first embodiment of the MMR matching unit 106 comprises a dispatcher 402, a hotspot database 404, an acquisition unit 406, an image registration unit 408 and a dynamic load balancer 418. The acquisition unit 406 further comprises a plurality of the recognition units 410a-410n and a plurality of index tables 412a-412n. The image registration unit 408 further comprises an indexing unit 414 and a master index table 416.

The dispatcher 402 is coupled to signal line 134 for receiving an image query from and sending recognition results to the MMR gateway 104. The dispatcher 402 is responsible for assigning and sending an image query to respective recognition units 410a-410n. In one embodiment, the dispatcher 402 receives an image query, generates a recognition unit identification number and sends the recognition unit identification number and the image query to the acquisition unit 406 for further processing. The dispatcher 402 is coupled to signal line 430 to send the recognition unit identification number and the image query to the recognition units 410a-410n. The dispatcher 402 also receives the recognition results from the acquisition unit 406 via signal line 430. One embodiment for the dispatcher 402 will be described in more detail below with reference to FIG. 5.

An alternate embodiment for the hotspot database 404 has been described above with reference to FIG. 3 where the hotspot database is part of the MMR gateway 104. However, the preferred embodiment for the hotspot database 404 is part of the MMR matching unit 106 as shown in FIG. 4A. Regardless of the embodiment, the hotspot database 404 has a similar functionality. The hotspot database 404 is used to store hotspot information. Once an image query has been recognized and recognition results are produced, these recognition results are used as part of a query of the hotspot database 404 to retrieve hotspot information associated with the recognition results. The retrieved hotspot information is then output on signal line 134 to the MMR gateway 104 for packaging and delivery to the mobile device 102. As shown in FIG. 4A, the hotspot database 404 is coupled to the dispatcher 402 by signal line 436 to receive queries including recognition results. The hotspot database 404 is also coupled by signal line 432 and signal line 134 to the MMR gateway 104 for delivery of query results. The hotspot database 404 is also coupled to signal line 136 to receive new hotspot information for storage from the MMR publisher 108.

The acquisition unit 406 comprises the plurality of the recognition units 410a-410n and a plurality of index tables 412a-412n. Each of the recognition units 410a-410n has and is coupled to a corresponding index table 412a-412n. In one embodiment, each recognition unit 410/index table 412 pair is on the same server. The dispatcher 402 sends the image query to one or more recognition units 410a-410n. In one embodiment that includes redundancy, the image query is sent from the dispatcher 402 to a plurality of recognition units 410 for recognition and retrieval and the index tables 412a-n index the same data. In the serial embodiment, the image query is sent from the dispatcher 402 to a first recognition unit 410a. If recognition is not successful on the first recognition unit 410a, the image query is passed on to a second recognition unit 410b, and so on. In yet another embodiment, the dispatcher 402 performs some preliminary analysis of the image query and then selects a recognition unit 410a-410n best adapted and most likely to be successful at recognizing the image query. Those skilled in the art will understand that there are a variety of configurations for the plurality of recognition units 410a-410n and the plurality of index tables 412a-412n. Example embodiments for the acquisition unit 406 will be described in more detail below with reference to FIGS. 6A and 6B. It should be understood that the index tables 412a-412n can be updated at various times as depicted by the dashed lines 434 from the master index table 416.

The image registration unit 408 comprises the indexing unit 414 and the master index table 416. The image registration unit 408 has an input coupled to signal on 136 to receive updated information from the MMR publisher 108 and an input coupled to signal line 438 to receive updated information from the dynamic load balancer 418. The image registration unit 408 is responsible for maintaining the master index table 416 and migrating all or portions of the master index table 416 to the index tables 412a-412n (slave tables) of the acquisition unit 406. In one embodiment, the indexing unit 414 receives images, unique page IDs and other information; and converts it into index table information that is stored in the master index table. The indexing unit 414 also cooperates with the MMR publisher 108 to maintain a unique page identification numbering system that is consistent across image pages generated by the MMR publisher 108, the image pages stored in the master index table 416 and the page numbers used in referencing data in the hotspot database 404.

One embodiment for the image registration unit 408 is shown and described in more detail below with reference to FIG. 7.

The dynamic load balancer 418 has an input coupled to signal line 430 to receive the query image from the dispatcher 402 and the corresponding recognition results from the acquisition unit 406. The output of the dynamic load balancer 418 is coupled by signal line 438 to an input of the image registration unit 408. The dynamic load balancer 418 provides input to the image registration unit 408 that is used to dynamically adjust the index tables 412a-412n of the acquisition unit 406. In particular, the dynamic load balancer 418 monitors and evaluates the image queries that are sent from the dispatcher 402 to the acquisition unit 406 for a given period of time. Based on the usage, the dynamic load balancer 418 provides input to adjust the index tables 412a-412n. For example, the dynamic load balancer 418 may measure the image queries for a day. Based on the measured usage for that day, the index tables are modified and configured in the acquisition unit 406 to match the usage measured by the dynamic load balancer 418. The dynamic load balancer 418 implements the method described below with reference to FIG. 11.

FIG. 4B illustrates a second embodiment of the MMR matching unit 106. In the second embodiment, many of the components of the MMR matching unit 106 have the same or a similar function to corresponding elements of the first embodiment. Thus, like reference numbers have been used to refer to like components with the same or similar functionality. The second embodiment of the MMR matching unit 106 includes the dispatcher 402, the hotspot database 404, and the dynamic load balancer 418 similar to the first embodiment of the MMR matching unit 106. However, the acquisition unit 406 and the image registration unit 408 are different than that described above with reference to FIG. 4A. In particular, the acquisition unit 406 and the image registration unit 408 utilize a shared SQL database for the index tables and the master table. More specifically, there is the master index table 416 and a mirrored database 418 that includes the local index tables 412a-n. Moreover, a conventional functionality of SQL database replication is used to generate the mirror images of the master index table 416 stored in the index tables 412a-n for use in recognition. The image registration unit 408 is configured so that when new images are added to the master index table 416 they are immediately available to all the recognition units 410. This is done by mirroring the master index table 416 across all the local index tables 412a-n using large RAM (not shown) and database mirroring technology.

Dispatcher 402

Figure 5:
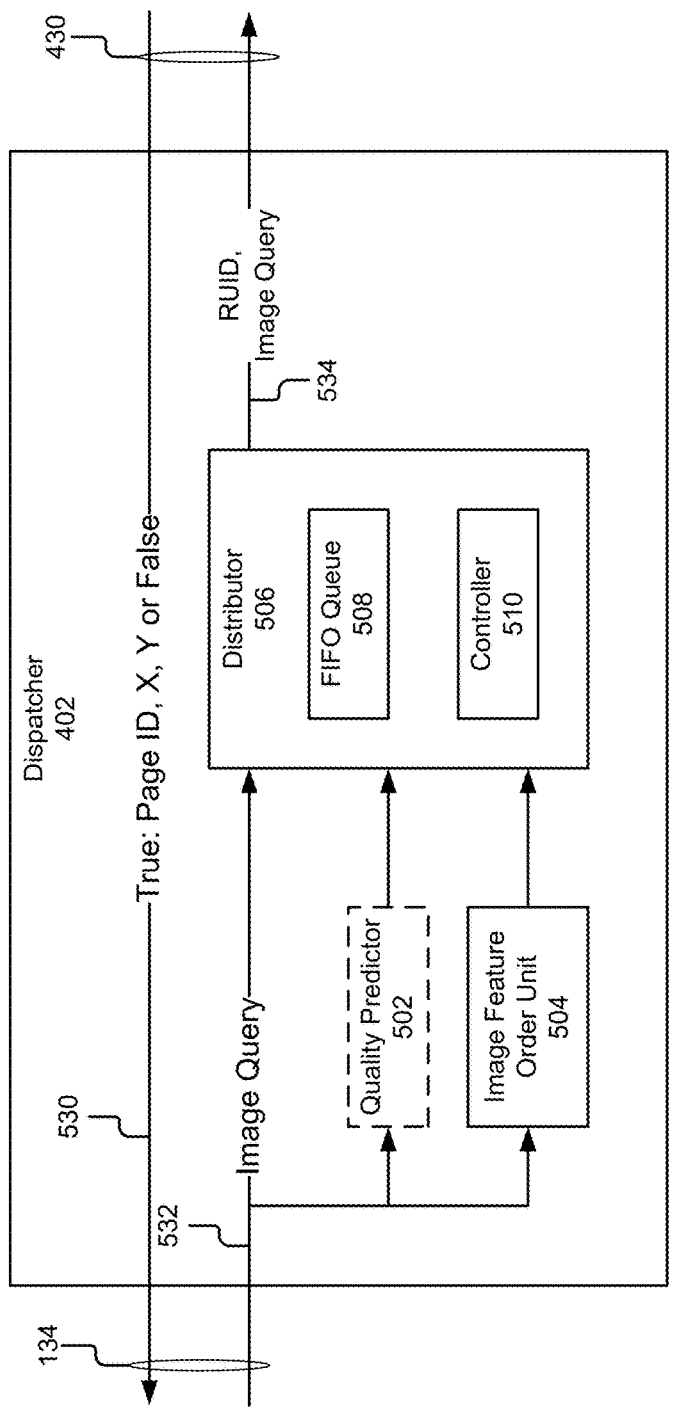
FIG. 5 is a block diagram of an embodiment of a dispatcher in accordance with the present invention.

Referring now to FIG. 5, an embodiment of the dispatcher 402 shown. The dispatcher 402 comprises a quality predictor 502, an image feature order unit 504 and a distributor 506. The quality predictor 502, the image feature order unit 504 and the distributor 506 are coupled to signal line 532 to receive image queries from the MMR gateway 104. The distributor 506 is also coupled to receive the output of the quality predictor 502 and the image feature order unit 504. The distributor 506 includes a FIFO queue 508 and a controller 510. The distributor 506 generates an output on signal line 534 that includes the image query and a recognition unit identification number (RUID). Those skilled in the art will understand that in other embodiments the image query may be directed to any particular recognition unit using a variety of means other than the RUID. As image queries are received on the signal line 532, the distributor 506 receives the image queries and places them in the order in which they are received into the FIFO queue 508. The controller 510 receives a recognizability score for each image query from the quality predictor 502 and also receives an ordering signal from the image feature order unit 504. Using this information from the quality predictor 502 and the image feature order unit 504, the controller 510 selects image queries from the FIFO queue 508, assigns them to particular recognition units 410 and sends the image query to the assigned recognition unit 410 for processing. The controller 510 maintains a list of image queries assigned to each recognition unit 410 and the expected time to completion for each image (as predicted by the image feature order unit 504). The total expected time to empty the queue for each recognition unit 410 is the sum of the expected times for the images assigned to it. The controller 510 can execute several queue management strategies. In a simple assignment strategy, image queries are removed from the FIFO queue 508 in the order they arrived and assigned to the first available recognition unit 410. In a balanced response strategy, the total expected response time to each query is maintained at a uniform level and query images are removed from the FIFO queue 508 in the order they arrived, and assigned to the FIFO queue 508 for a recognition unit so that its total expected response time is as close as possible to the other recognition units. In an easy-first strategy, images are removed from the FIFO queue 508 in an order determined by their expected completion times—images with the smallest expected completion times are assigned to the first available recognition unit. In this way, users are rewarded with faster response time when they submit an image that's easy to recognize. This could incentivize users to carefully select the images they submit. Other queue management strategies are possible. The dispatcher 402 also receives the recognition results from the recognition units 410 on signal line 530. The recognition results include a Boolean value (true/false) and if true, a page ID and a location on the page. In one embodiment, the dispatcher 402 merely receives and retransmits the data to the MMR gateway 104.

The quality predictor 502 receives image queries and generates a recognizability score used by the dispatcher 402 to route the image query to one of the plurality of recognition units 410. In one embodiment, the quality predictor 502 also receives as inputs context information and device parameters. The operation of the quality predictor 502 is described in more detail below with reference to FIGS. 18-21. In one embodiment, the recognizability score includes information specifying the type of recognition algorithm most likely to produce a valid recognition result.

The image feature order unit 504 receives image queries and outputs an ordering signal. The image feature order unit 504 analyzes an input image query and predicts the time required to recognize an image by analyzing the image features it contains. The difference between the actual recognition time and the predicted time is used to adjust future predictions thereby improving accuracy. In the simplest of embodiments, simple images with few features are assigned to lightly loaded recognition units 410 so that they will be recognized quickly and the user will see the answer immediately. In one embodiment, the features used by the image order feature unit 504 to predict the time are different than the features used by recognition units 410 for actual recognition. For example, the number of corners detected in an image is used to predict the time required to analyze the image. The feature set used for prediction need only be correlated with the actual recognition time. In one embodiment, several different features sets are used and the correlations to recognition time measured over some period. Eventually, the feature set that is the best predictor and lowest cost (most efficient) would be determined and the other feature sets could be discarded. The operation of the image feature order unit 504 is described in more detail below and can be better understood with reference to FIG. 12.

Acquisition Unit 406

Figure 6A:
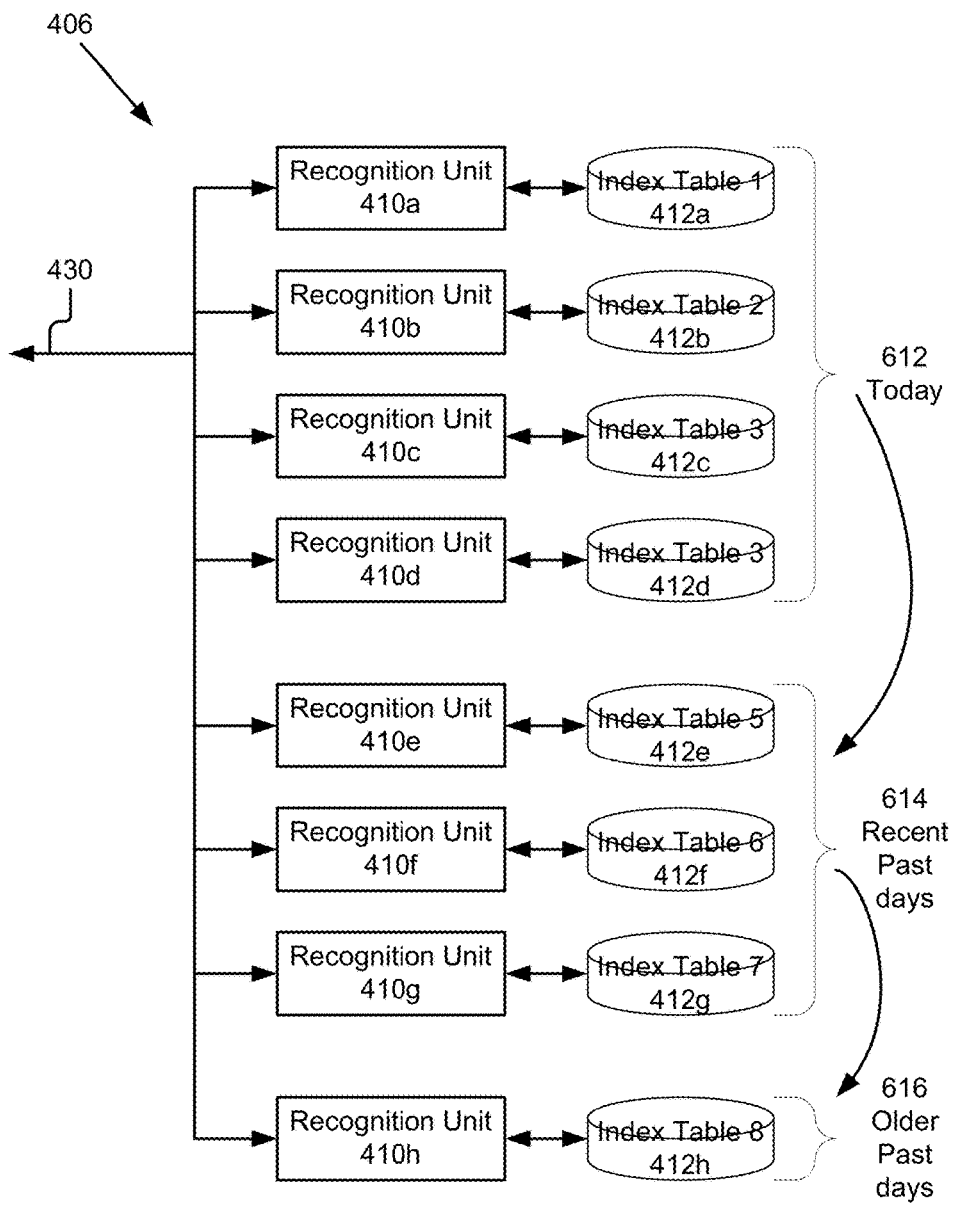
FIG. 6A is a block diagram of a first embodiment of an image retrieval unit in accordance with the present invention.
Figure 6B:
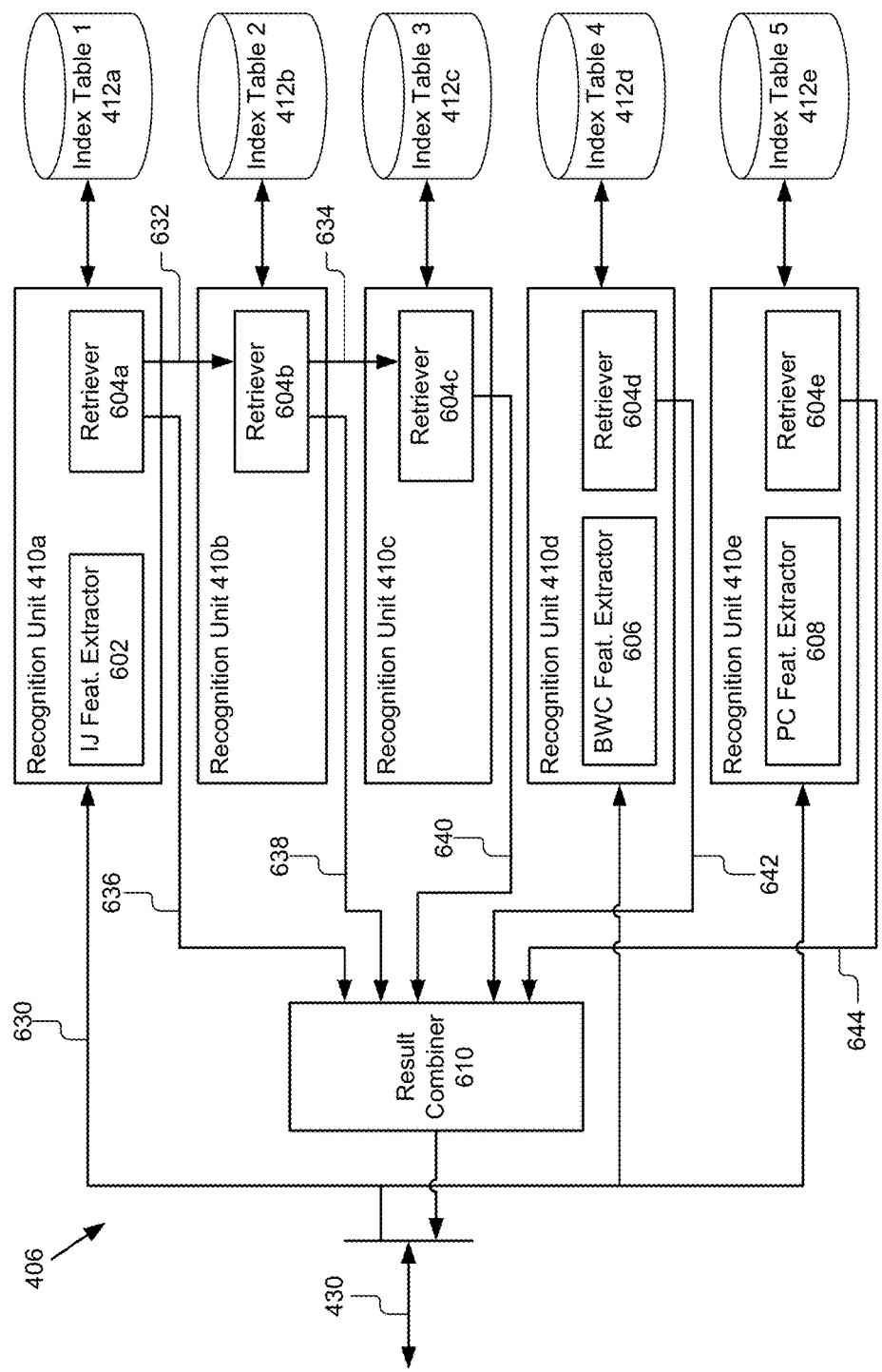
FIG. 6B is a block diagram of a second embodiment of the image retrieval unit in accordance with the present invention.

Referring now to FIGS. 6A and 6B, embodiments of the acquisition unit 406 will be described.

FIG. 6A illustrates one embodiment for the acquisition unit 406 where the recognition unit 410 and index table 412 pairs are partitioned based on the content or images that they index. This configuration is particularly advantageous for mass media publishers that provide content on a periodic basis. The organization of the content in the index tables 412 can be partitioned such that the content most likely to be accessed will be available on the greatest number of recognition unit 410 and index table 412 pairs. Those skilled in the art will recognize that the partition described below is merely one example and that various other partitions based on actual usage statistics measured over time can be employed. As shown in FIG. 6A, the acquisition unit 406 comprises a plurality of recognition units 410a-h and a plurality of index tables 412a-h. The plurality of recognition units 410a-h is coupled to signal line 430 to receive image queries from the dispatcher 402. Each of the plurality of recognition units 410a-h is coupled to a corresponding index table 412a-h. The recognition units 410 extract features from the image query and compare those image features to the features stored in the index table to identify a matching page and location on that page. Example recognition and retrieval systems and methods are disclosed in U.S. Pat. No. 7,702,673, titled "System And Methods For Creation And Use Of A Mixed Media Environment," filed Jul. 31, 2006; U.S. Pat. No. 8,600,989, titled "Method And System For Image Matching In A Mixed Media Environment," filed Jul. 31, 2006; U.S. Pat. No. 8,335,789, titled "Method And System For Document Fingerprinting Matching In A Mixed Media Environment," filed Jul. 31, 2006; U.S. Pat. No. 8,332,401, titled "Method And System For Position-Based Image Matching In A Mixed Media Environment," filed Jul. 31, 2006; U.S. Pat. No. 8,521,737, titled "Method And System For Multi-Tier Image Matching In A Mixed Media Environment," filed Jul. 31, 2006; U.S. Pat. No. 9,171,202, titled "Data Organization and Access for Mixed Media Document System," filed Jul. 31, 2006; U.S. patent application Ser. No. 11/461,164, titled "Database for Mixed Media Document System," filed Jul. 31, 2006; U.S. patent application Ser. No. 11/461,109, titled "Searching Media Content For Objects Specified Using Identifiers," filed Jul. 31, 2006; U.S. patent application Ser. No. 12/059,583, titled "Invisible Junction Feature Recognition For Document Security Or Annotation," filed Mar. 31, 2008; U.S. Pat. No. 8,385,589, titled "Web-Based Content Detection In Images, Extraction And Recognition," filed May 15, 2008; U.S. Pat. No. 8,086,038, titled "Invisible Junction Features For Patch Recognition," filed Jul. 11, 2007; U.S. Pat. No. 8,144,921, titled "Information Retrieval Using Invisible Junctions and Geometric Constraints," filed Jul. 11, 2007; U.S. Pat. No. 8,184,155, titled "Recognition And Tracking Using Invisible Junctions," filed Jul. 11, 2007; and U.S. Pat. No. 8,176,054, titled "Retrieving Documents By Converting Them to Synthetic Text," filed Jul. 12, 2007; and U.S. Pat. No. 7,970,171, titled "Synthetic Image and Video Generation From Ground Truth Data," filed Jan. 18, 2007; which are incorporated by reference in their entirety.

As shown in FIG. 6A, the recognition unit 410/index table 412 pairs are grouped according to the content that in the index tables 412. In particular, the first group 612 of recognition units 410a-d and index tables 412a-d is used to index the pages of a publication such as a newspaper for a current day. For example, four of the eight recognition units 410 are used to index content from the current day's newspaper because most of the retrieval requests are likely to be related to the newspaper that was published in the last 24 hours. A second group 614 of recognition units 410e-g and corresponding index tables 412e-g are used to store pages of the newspaper from recent past days, for example the past week. A third group 616 of recognition unit 410h and index table 412h is used to store pages of the newspaper from older past days, for example for the past year. This allows the organizational structure of the acquisition unit 406 to be optimized to match the profile of retrieval requests received. Moreover, the operation of the acquisition unit 406 can be modified such that a given image query is first sent to the first group 612 for recognition, and if the first group 612 is unable to recognize the image query, it is sent to the second group 614 for recognition and so on.

It should be noted that the use of four recognition units 410 and index tables 412 as the first group 612 is merely be by way example and used demonstrate a relative proportion as compared with the number of recognition units 410 and index tables 412 in the second group 614 and the third group 616. The number of recognition units 410 and index tables 412 in any particular group 612, 614 and 616 may be scaled the modified based on the total number of recognition units 410 and index tables 412. Furthermore, the number of recognition units 410 and index tables 412 in any particular group 612, 614 and 616 may be adapted so that it matches the profile of all users sending retrieval request to the acquisition unit 406 for a given publication.

FIG. 6B illustrates a second embodiment for the acquisition unit 406 where the recognition units 410 and index tables 412 are partitioned based upon the type of recognition algorithm they implement. In the second embodiment, the recognition units 410 are also coupled such that the failure of a particular recognition unit to generate a registration result causes the input image query to be sent to another recognition unit for processing. Furthermore, in the second embodiment, the index tables 412 include feature sets that are varied according to different device and environmental factors of image capture devices (e.g., blur).

The second embodiment of the acquisition unit 406 includes a plurality of recognition units 410a-410e, a plurality of the index tables 412a-412e and a result combiner 610. In this embodiment, the recognition units 410a-410e each utilizes a different type of recognition algorithm. For example, recognition units 410a, 410b and 410c use an invisible junction algorithm; recognition unit 410d uses a brick wall coding algorithm; and recognition unit 410e uses a path coding algorithm for recognition and retrieval of page numbers and locations. Recognition units 410a, 410d and 410e each have an input coupled signal line 430 by signal line 630 for receiving the image query. The recognition results from each of the plurality of recognition units 410*a*-410*e* are sent via signal lines 636, 638, 640, 642 and 644 to the result combiner 610. The output of the result combiner 610 is coupled to signal line 430.

In one embodiment, the recognition units 410*a*, 410*b* and 410*c* cooperate together with index tables 1, 2 and 3, 412*a*-412*c* each storing image features corresponding to the same pages but with differing levels of blur caused by device and environmental factors. For example, index table 1 412*a* may store image features for pristine images of pages such as from a PDF document, while index table 2 412*b* stores images of the same pages but with a first level of blur and index table 3 412*c* stores images of the same pages but with the second level of blur. In one embodiment, the index tables 1, 2 and 3, 412*a*-412*c* are quantization trees. The first recognition unit 410*a* receives the image query via signal line 630. The first recognition unit 410*a* comprises an invisible junction feature extractor 602 and a retriever 604*a*. The invisible junction feature extractor 602 receives the image query, extracts the invisible junction features and provides them to the retriever 604*a*. The retriever 604*a* uses the extracted invisible junction features and compares them to the index table 1 412*a*. If the retriever 604*a* identifies a match, the retriever 604*a* sends the recognition results via signal line 636 to the result combiner 610. If however, the retriever 604*a* was unable to identify a match or identifies a match with low confidence, the retriever 604*a* sends the extracted invisible junction features to the retriever 604*b* of the second recognition unit 410*b* via signal line 632. It should be noted that since the invisible junction features have already been extracted, the second recognition unit 410*b* does not require an invisible junction feature extractor 602. The second recognition unit 410*b* performs retrieval functions similar to the first recognition unit 410*a*, but cooperates with index table 2 412*b* that has invisible junction features for slightly blurry images. If the retriever 604*b* identifies a match, the retriever 604*b* sends the recognition results via signal line 638 to the result combiner 610. If the retriever 604*b* of the second recognition unit 410*b* is unable to identify a match or identifies a match with low confidence, the retriever 604*b* sends the extracted invisible junction features to the retriever 604*c* of the third recognition unit 410*c* via signal line 634. The retriever 604*c* then performs a similar retrieval function but on index table 3 412*c*. Those skilled in the art will understand that while one pristine set of images and two levels of blur are provided, this is only by way of example and that any number of additional levels of blur from 0 to n may be used.

The recognition units 410*d* and 410*e* operate in parallel with the other recognition units 410*a*-*c*. The fourth recognition unit 410*d* comprises a brick wall coding feature extractor 606 and a retriever 604*d*. The brick wall coding feature extractor 606 receives the image query and bounding boxes, parses the bounding boxes and generates brick wall coding features. These brick wall coding features are provided to the retriever 604*d* and the retriever 604*d* compares them to the features stored in index table 4 412*d*. In one embodiment, index table 4 412*d* is a hash table. The retriever 604*d* identifies any matching pages and returns the recognition results to the result combiner 610 via signal line 642. The fifth recognition unit 410*e* operates in a similar manner but for path coding. The fifth recognition unit 410*e* comprises a path coding feature extractor 608 and a retriever 604*e*. The path coding feature extractor 608 receives the image query and bounding boxes, parses the image and generates path coding features that are provided to the retriever 604*e* and the retriever 604*e* compares them to features stored in the index table 5 412*e*. In one embodiment, the index table 5 412*e* is a SQL database of character strings. The retriever 604*e* identifies any matching strings and returns the recognition results to the result combiner 610 via signal line 644.

The result combiner 610 receives recognition results from the plurality of recognition units 410*a*-*e* and produces one or a small list of matching results. In one embodiment, each of the recognition results includes an associated confidence factor. In another embodiment, context information such as date, time, location, personal profile or retrieval history are provided to the result combiner 610. These confidence factors along with other information are used by the result combiner 610 to select the recognition results most likely to match the input image query. The result combiner 610 implements the functionality described below with reference to the methods of FIG. 22-24.

Image Registration Unit 408

Figure 7:
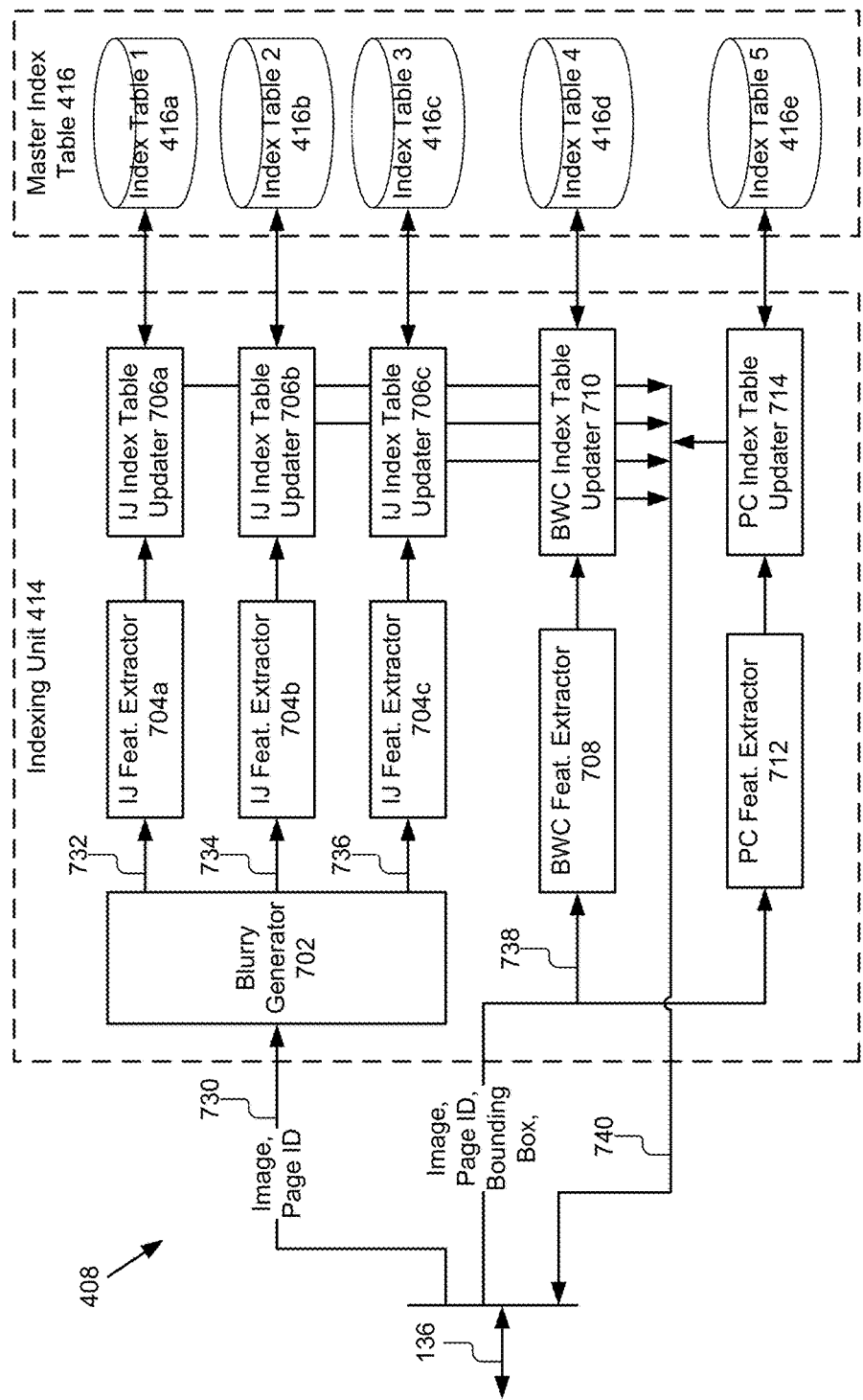
FIG. 7 is a block diagram of an embodiment of a registration unit in accordance with the present invention.

FIG. 7 shows an embodiment of the image registration unit 408. The image registration unit 408 comprises a blurry generator 702, a plurality of invisible junction feature extractors 704*a*-*c*, a plurality of invisible junction index table updaters 706*a*-*c*, a brick wall coding feature extractor 708, a brick wall coding index table updater 710, a path coding feature extractor 712, a path coding index table updater 714 and a plurality of master index tables 416*a*-*e*. The image registration unit 408 also includes other control logic (not shown) that controls the updating of the working index tables 412 from the master index table 416. The image registration unit 408 can update the index tables 412 of the acquisition unit 406 in a variety of different ways based on various criteria such performing updates on a periodic basis, performing updates when new content is added, performing updates based on usage, performing updates for storage efficiency, etc.

The blurry generator 702 has an input coupled in signal line 730 to receive an image and a page identification number. The blurry generator 702 has a plurality of outputs and each output is coupled by signal lines 732, 734 and 736 to invisible junction feature extractors 704*a*-*c*, respectively. The blurry generator 702 passes a pristine image and the page identification number to the output and signal line 732. The blurry generator 702 then generates an image with a first level of blurriness and outputs it and the page identification number on signal line 734 to invisible junction feature extractor 704*b*, and another image with a second level of blurriness and outputs it and page identification number on signal line 736 to invisible junction feature extractor 704*c*. The blurry generator 702 implements functionality described below with reference to FIGS. 13 and 14.

The invisible junction feature extractors 704 receive the image and page ID, extract the invisible junction features from the image and send them along with the page ID to a respective invisible junction index table updater 706. The outputs of the plurality of invisible junction feature extractors 704*a*-*c* are coupled to input of the plurality of invisible junction index table updaters 706*a*-*c*. For example, the output of invisible junction feature extractor 704*a* is coupled to an input of invisible junction index table updater 706*a*. The remaining invisible junction feature extractors 704*b*-*c* are similarly coupled to respective invisible junction index table updaters 706*b*-*c*. The invisible junction index table updaters 706 are responsible for formatting the extracted features and storing them in a corresponding master index table 416. While the master index table 416 is shown as five separate master index tables 416*a*-*e*, those skilled in the art will recognize that all the master index tables could be combined into a single master index table or into a few master index tables. Once the invisible junction index table updaters 706 have stored the extracted features in the index table 416, they issue a confirmation signal that is sent via signal lines 740 and 136 back to the MMR publisher 108.

The brick wall coding feature extractor 708 and the path coding feature extractor 712 operate in a similar fashion and are coupled to signal line 738 to receive the image, a page identification number and bounding box information. The brick wall coding feature extractor 708 extracts information from the input needed to update its associated index table 416*d*. The brick wall coding index table updater 710 receives the extracted information from the brick wall coding feature extractor 708 and stores it in the index table 416*d*. The path coding feature extractor 712 and the path coding index table updater 714 operate in a like manner but for path coding. The path coding feature extractor 712 also receives the image, a page number and bounding box information via signal line 738. The path coding feature extractor 712 extracts path coding information and passes it to the path coding index table updater 714. The path coding index table updater 714 stores the information in index table 5 416*e*. The architecture of the registration unit 408 is particularly advantageous because it provides an environment in which the MMR publisher 108 can automatically update the index tables simply by providing images and page numbers to the image registration unit 408 and the index tables are updated automatically.

MMR Publisher 108

Figure 8:
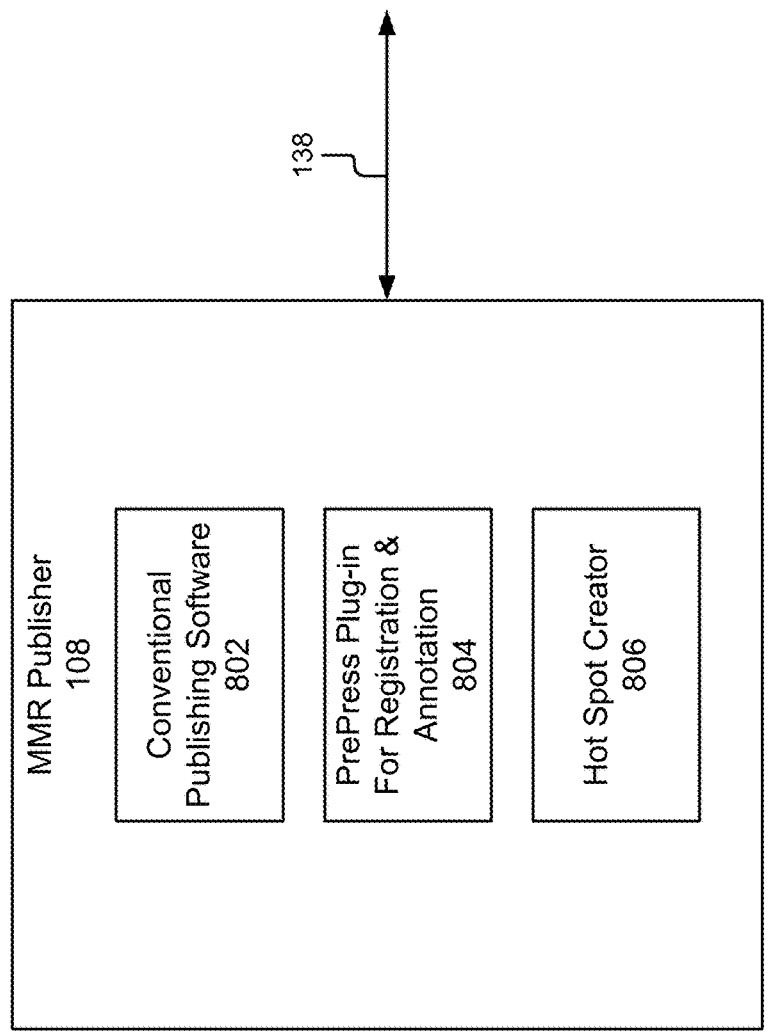
FIG. 8 is a block diagram of an embodiment of an MMR publisher in accordance with the present invention.

An embodiment of the MMR publisher 108 is shown in FIG. 8. The MMR publisher 108 comprises conventional publishing software 802, a pre-press software plug-in for registration and annotation 804 and a hotspot creator 806. The MMR publisher 108 is coupled to signal line 138 to connect with the image registration unit 408 and the hotspot database 404 (such as via the server 302).

The conventional publishing software 802 is software for creating digital content including text, graphics and pictures. Examples of the conventional publishing software used in the production and distribution of newspapers include Adobe Acrobat manufactured and sold by Adobe Inc. of San Jose, Calif. or QuarkXPress manufactured and sold by Quark, Inc. in Denver, Colo. The conventional publishing software 802 may be other types of proprietary software owned by large publishing companies.

The pre-press plug-in for registration and annotation 804 is software and routines for interfacing with the conventional publishing software 802 and generating additional information used by the image registration unit 408 so that the content can be automatically uploaded to the acquisition unit 406. For example, the prepress plug-in for registration and annotation communicates and interfaces with the image registration unit 408 to maintain a unique page identification numbering system that is consistent across image pages generated by the conventional publishing software 802, the image pages stored in the master index table 416 and the page numbers used in referencing data in the hotspot database 404. The prepress plug-in for registration 804 also generates bounding boxes for image pages generated by the conventional publishing software 802; the bounding boxes are subsequently used by the image registration unit 408 for certain types of encoding. The pre-press plug-in for registration and annotation 804 also analyzes the images provided by the conventional publishing software 802 and ensures that the files are of a type usable by the feature extractors 704, 708 712.

The hotspot creator 806 is an authoring tool for creating hotspots. Hotspots identify the (x,y) coordinates of polygons on a document image and links to electronic data such as URL's that are associated with each polygon. In one embodiment, hotspots are annotations in Acrobat PDF files that include the (x,y) coordinates of polygons on a document and links to electronic data such as URL's. The hotspot creator 806 can be used to create a hotspot (a "hotspot" is a polygon on an image), associate the hotspot with a particular page in a document, and a particular location on the page, associate zero or more links with each hotspot, and generate and send the hotspot files to the server 302 for storage in the hotspot database 404. A hotspot file lists each hotspot, the coordinates of its polygon, and any links associated with it. The hotspot file can be saved as a separate file or equivalently the same data can be embedded in the document source file. The hotspot creator 806 can be a stand-alone software application that reads a source document such as Word, PDF, or an image format such as tiff, and provides a user interface that lets the user draw polygons on the document, add links to each of the hotspots, and save the hotspot files. The hotspot creator 806 can also be packaged as a plug-in for existing document authoring applications such as Word, Acrobat, Quark Express, etc. and can be designed so that the user can define polygons on the document, add links, and save the hotspot files (or, equivalently the source file with the hotspot data embedded in it). The hotspot creator 806 can also be packaged as a software application that extracts links from existing documents and saves them in the hotspot file. For example, annotations in PDF files that include polygon coordinates and links to electronic data can be removed from the PDF and saved separately in a hotspot file.

Methods

Figure 9:
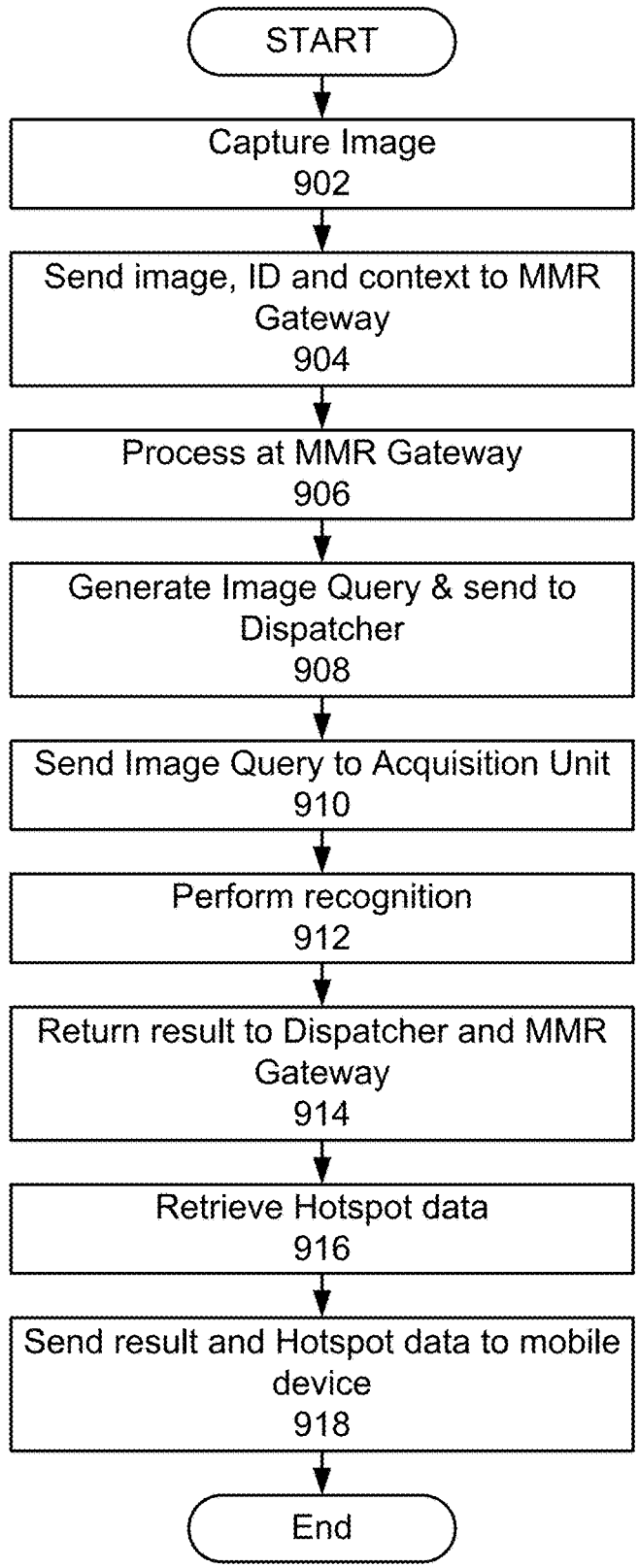
FIG. 9 is a flowchart of an embodiment of a method for retrieving a document and location from an input image in accordance with the present invention.

FIG. 9 is a flowchart of a general method for generating and sending a retrieval request and processing the retrieval request with an MMR system 100. The method begins with the mobile device 102 capturing 902 an image. A retrieval request that includes the image, a user identifier, and other context information is generated by the mobile device 102 and sent 904 to the MMR gateway 104. The MMR gateway 104 processes 906 the retrieval request by extracting the user identifier from the retrieval request and verifying that it is associated with a valid user. The MMR gateway 104 also performs other processing such as recording the retrieval request in the log 310, performing any necessary accounting associated with the retrieval request and analyzing any MMR analytics metrics. Next, the MMR gateway 104 generates 908 an image query and sends it to the dispatcher 402. The dispatcher 402 performs load-balancing and sends the image query to the acquisition unit 406. In one embodiment, the dispatcher 402 specifies the particular recognition unit 410 of the acquisition unit 406 that should process the image query. Then the acquisition unit 406 performs 912 image recognition to produce recognition results. The recognition results are returned 914 to the dispatcher 402 and in turn the MMR gateway 104. The recognition results are also used to retrieve 916 hotspot data corresponding to the page and location identified in the recognition results. Finally, the hotspot data and the recognition results are sent 918 from the MMR gateway 104 to the mobile device 102.

Figure 10:
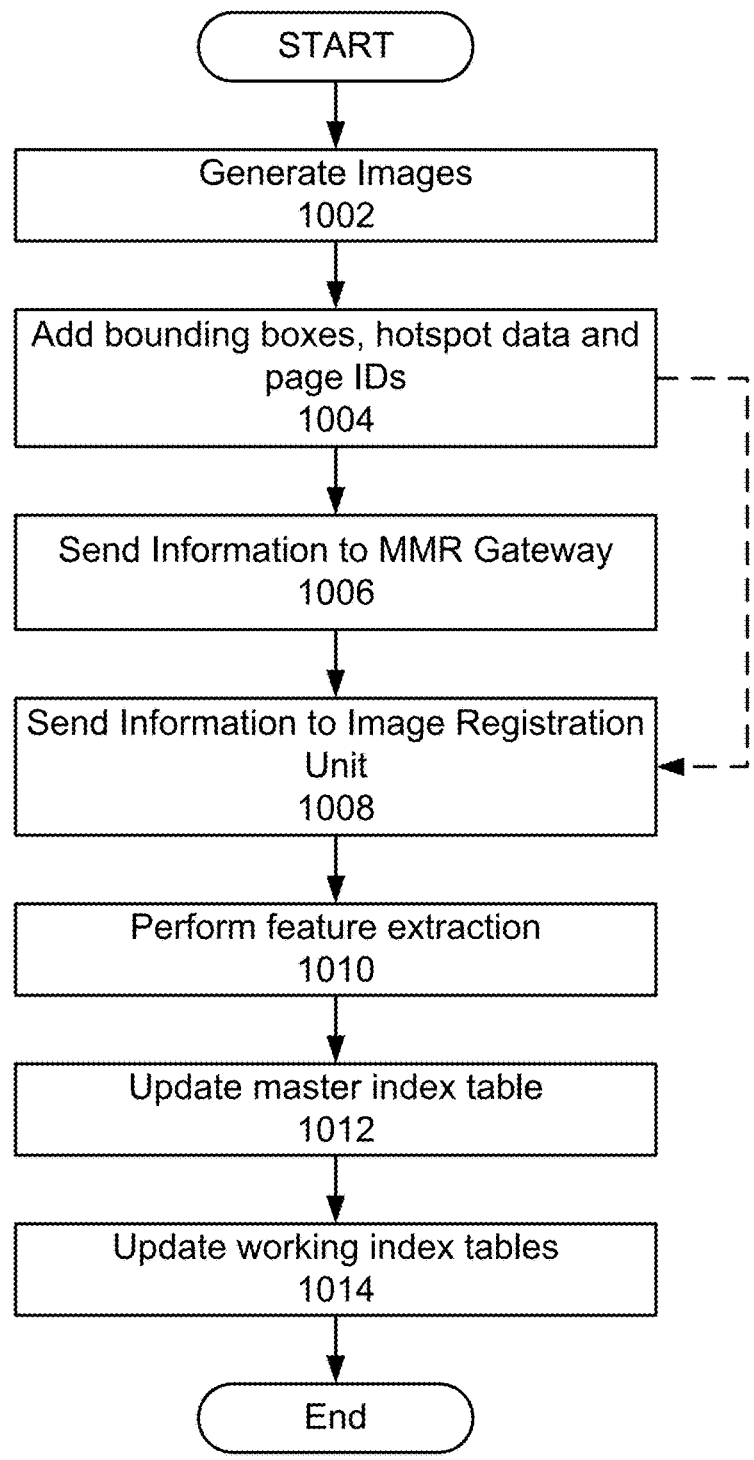
FIG. 10 is a flowchart of a method for registering an image with the MMR matching unit in accordance with embodiments of the present invention.

Referring now to FIG. 10, a method for registration of images will be described. The method begins by generating 1002 images by using conventional publishing software 802. The images are then augmented 1004 with bounding boxes, hotspot data and page identification numbers using the prepress plug-in for registration and annotation 804. The augmented images are then sent 1006 to the MMR gateway 104. The MMR gateway 104 extracts the hotspot data and adds it to the hotspot database 404. The MMR gateway 104 then sends 1008 the image, page number and bounding boxes to the image registration unit 408. In an alternate embodiment as depicted in FIG. 10 by the dashed line, the augmented images can be sent to the image registration unit 408 without going through the MMR gateway 104. The indexing unit 414 and then performs 1010 feature extraction on the images. Depending on the embodiment, feature extraction may be performed for a single recognition algorithm, multiple different recognition algorithms or the same recognition algorithm on different data sets. The features extracted from step 1010 are then used to update 1012 the master index table(s) 416a-e. Finally, the changes that were applied to the master index table(s) 416a-e are migrated 1014 to working index tables 412a-n of the acquisition unit 406. This method is particularly advantageous because images need only be provided to the image registration unit 408 and the image registration unit 408 automatically updates the master index table 416, and automatically migrates the changes to the working index tables 412 of the acquisition unit 406.

Figure 11:
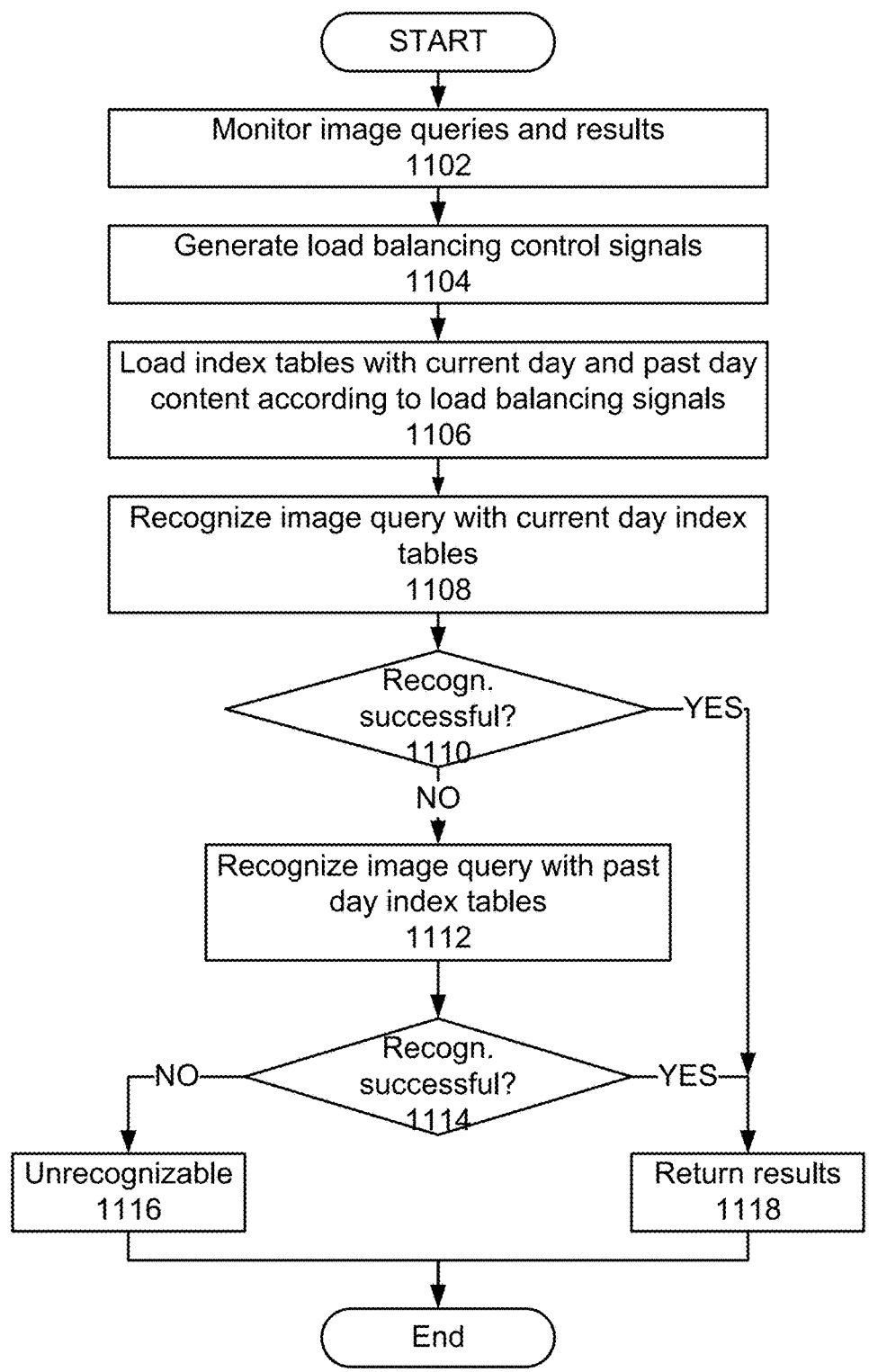
FIG. 11 is a flowchart of a method for dynamic load balancing in accordance with an embodiment of the present invention.

Referring now to FIG. 11, a method for dynamic load balancing will be described. This method relates generally to the operations performed by the dynamic load balancer 418 of FIG. 4A. The method begins by monitoring 1102 image queries and recognition results transferred between the dispatcher 402 and the acquisition unit 406 on signal line 430. The dynamic load balancer 418 monitors the image queries and corresponding recognition results for some pre-defined period such as a day. In particular, the actual distribution of images successfully found and in which index tables 412a-n they were found is monitored. The dynamic load balancer 418 generates 1104 load balancing control signals specifying a configuration for the working index tables 412a-n of the acquisition unit 406. For example, based on usage measured by the dynamic load balancer 418 for the prior day, expected usage can be predicted and the working index tables 412a-n of the acquisition unit 406 loaded with content appropriately. For example, n index tables are loaded with the newspaper content for the current day while m index tables are loaded with the newspaper content of past days. Thus there are a total of n+m servers. Based on past history, the present invention makes it expects n/(n+m) queries will be for the newspaper of the current day. The indexing unit 414 of the image registration unit 408 then receives new images for the current day's newspaper. Based upon the generated load balancing signals generated in step 1104, some (e.g., n) of the working index tables 412a-n are loaded with the new images while the existing information in the working index tables 412a-n are reconfigured such that they can be stored in the remaining (e.g., m=all working index tables−n) working index tables 412a-n that are not utilized to store the new images.

In one embodiment, operation of the acquisition unit 406 is modified or optimized to match the configuration of the working index tables 412a-n. In particular, the acquisition unit 406 upon receiving an image query, first attempts to recognize 1108 the image query with recognition units 410 and index tables 412 configured with the images of the current day's newspaper. Next, the method determines 1110 whether recognition was successful. If so the method returns 1118 the result and a method is complete. If not, the method attempts to recognize 1112 the image query with recognition units 410 and index tables 412 configured with images of past days newspapers. Again the method determines 1114 whether recognition was successful. If so, the method returns 1118 the result and the method is complete. If not, the method returns 1116 a signal indicating that recognition was unsuccessful and the method is complete. While the load balancing method was described above with reference to use of a periodic division of the data for a newspaper, those skilled in the art will understand that the load-balancing method may be applied for dividing the data based on any other usage criteria and that the image data may be any type of images other than newspapers.

Figure 12:
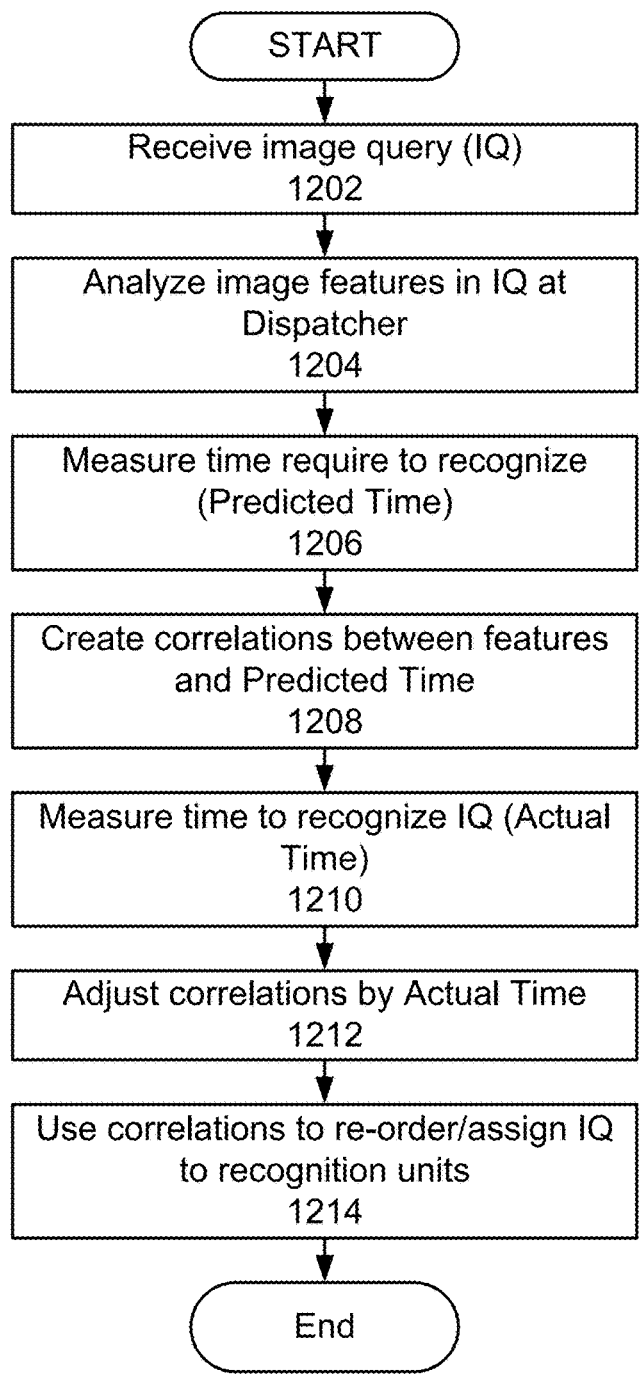
FIG. 12 is a flowchart of a method for image-feature-based ordering in accordance with an embodiment of the present invention.

Referring now to FIG. 12, one embodiment of a method for performing image feature-based ordering will be described. This functionality of this method is generally implemented by the image feature order unit 504 of the dispatcher 402. The method begins by receiving 1202 an image query. Next, the image feature order unit 504 of the dispatcher 402 analyzes 1204 the image features in the image query. It should be noted that the image features used in the analysis of step 1204 need not be the same image features used by the recognition units 410. It is only necessary to correlate the image features to recognition. In yet another embodiment, several different feature sets are used and correlations are measured over time. Eventually, the feature set that provides the best predictor and has the lowest computational cost is determined and the other feature sets are discarded. The image feature order unit 504 measures 1206 the time required to recognize the image features and thereby generates a predicted time. Next, the method creates 1208 correlations between features and predicted times. Next, the method measures 1210 the time actually required by the acquisition unit 406 to recognize the image query. This time required by the acquisition unit 406 is referred to as an actual time. Then the image feature order unit 504 adjusts 1212 the correlations generated in step 1208 by the actual time. The adjusted correlations are then used 1214 to reorder and assign image queries to recognition units. For example, simple images with few features are assigned to lightly loaded servers (recognition units 410 and index table 412 pairs) so that they will be recognized quickly and the user will receive the answer quickly. While the method shown in FIG. 12 illustrates the process for an image or a small set of images, those skilled in the art will recognize that once many images have been processed with the above method, a number of correlations will be created and the image feature order unit 504 essentially learns the distribution of image features against processing time and then the controller 501 of the distributor 506 can use the distribution to load balance and redirect image queries with particular image features accordingly. After the correlations are adjusted 1212, the new image-based feature ordering measurements can be used immediately in the previously described queue management strategies. The simple assignment strategy would simply use the new predictions. The balanced response strategy would re-balance the queues of requests pending for each recognition unit and optionally move requests between queues to maintain a uniform expected response for each recognition unit 410. The easy first strategy would simply use the new predictions when it inspected the incoming FIFO queue 508.

Blurry Images

Referring now to FIGS. 13-17, a method for automatically adapting the MMR system 100 for the characteristics of the image capture devices will be described. Recognition systems are often trained on pristine images of the objects they should recognize. However, handheld image capture devices and the environment in which they are used produce images that are much different. FIGS. 13-17 describe a method for automatically adapting the MMR system 100, originally designed for pristine object images, to images produced by a variety of capture devices as they are commonly used. Basically, the method trains N instances of a recognition algorithm on N different sets of data. The N data sets are chosen based on the ability of the recognition units they produce to successfully recognize a device training (DT) image set that represents the images a that device will produce when used in practice. Then, a query image is recognized with each instance until one of them produces a decision. These adaptations greatly enhance the recognition accuracy of MMR system 100. While the present invention will now be described in the context of adapting the MMR system 100 for blur, blur is only one characteristic that is used by way of example to illustrate the principles of the present invention. Any characteristic of the image capture device could alternatively be modeled to simulate actual variations in that characteristic, a data set created and the system 100 adapted to recognize images with such variations in a characteristic.

Figure 13:
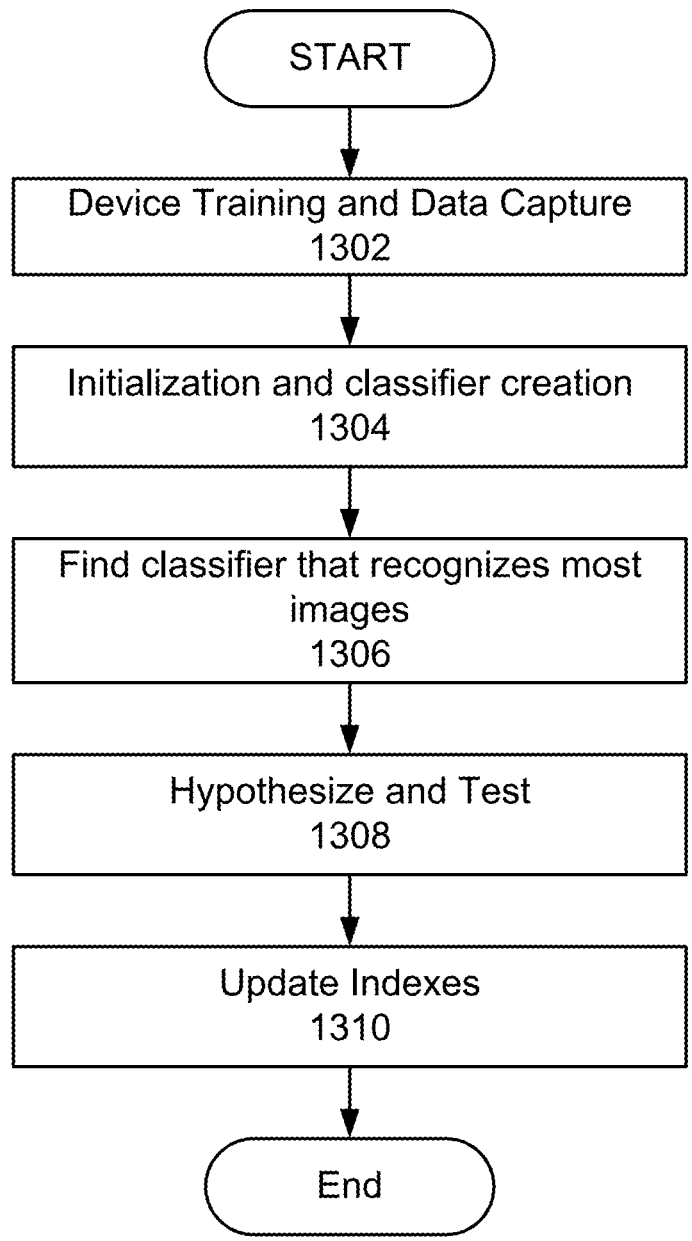
FIG. 13 is a flowchart of a method for generating blurry images and corresponding indices in accordance with an embodiment of the present invention.

FIG. 13 shows one embodiment for a general method of adapting the MMR system 100 for blur introduced by the mobile device 102. The process begins with device training 1302 and data capture. One embodiment for device training is described in more detail below with reference to FIG. 14. Once a set of training data has been created, the method performs initialization 1304 and creates classifiers. Embodiments for initialization and classifier creation 1304 are described below with reference to FIGS. 15A and 15B. Once a set of classifiers has been created, the method identifies 1306 the classifier that recognizes the greatest number of images correctly. In one embodiment this is accomplished by performing a greedy search as described below with reference to FIG. 16. Then the identified classifier is hypothesized 1308 and tested. In other words, the classifier is modified in an attempt to increase the number of images it can recognize and those modifications are validated. One embodiment for this testing is described below with reference to FIG. 17. Finally, the method updates 1310 the index tables 412 and recognition units 410 based on the classifier(s) that has been hypothesized and tested. In another embodiment, the method of FIG. 13 is combined with a method for monitoring the performance of the recognition algorithm as it runs and determines whether a new instance of the recognition algorithm should be added or whether a current instance should be replaced by performing the method of FIG. 13.

Figure 14:
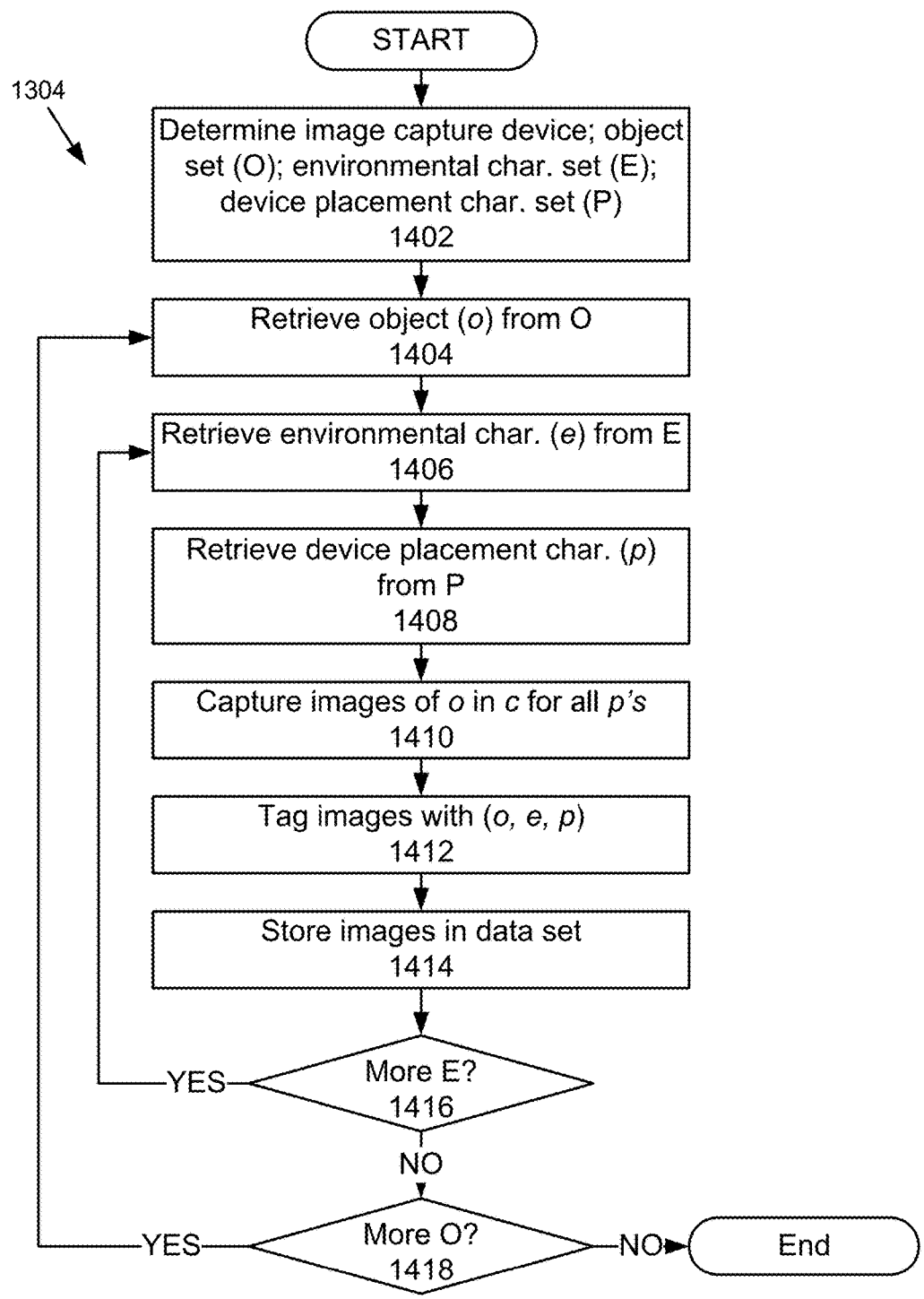
FIG. 14 is a flowchart of a method for generating blurry images for training in accordance with an embodiment of the present invention.

Referring now to FIG. 14, one embodiment of a method for creating a set of training data will be described. In general, creating a set of training data requires generation of a data set that spans the range of placement characteristics and environmental factors with respect to objects. The method collects a device training (DT) data set for the range of placement characteristics and environmental factors with respect to the objects. Each image with the measurement for each placement characteristic and environmental factor and added to the set.

The method begins by determining 1402 an image capture device, an object set (O), an environmental characteristic set (E) and a device placement characteristic set (P). The present invention assumes that the following have been identified: a given capture device, a representative set of objects (paper documents in the case of invisible junctions), a set of environmental factors (e.g., lighting, shadows, object deformation, temperature, etc.), and a set of placement characteristics (e.g., distance, rotation, tilt, jitter, etc.). For example, the given capture device may be a commercially available cell phone that includes a camera such as the iPhone from Apple Computer, Inc. or the Blackberry from Research In Motion. The object set can be paper newspaper pages with different X-Y locations on each page. The environmental characteristics and corresponding values such as light=florescent, sunlight, etc.; shadow=soft, sharp, etc. The placement characteristics can include values such as distance=1", 2", . . . "; tilt=0 degrees, 5 degrees, 7 degrees; . . . .

Next, the method retrieves 1404 an object (o) from the object set (O); retrieves 1406 an environmental characteristic (e) from the environmental characteristic set (E); retrieves 1408 a device placement characteristic (p) from the device placement characteristic set (P). Then the method captures 1410 images of the object (o) in the environmental characteristic (e) for each value of the device placement characteristic (p). The images are tagged 1412 with their values of o, e and p. The tagged images are then stored 1414 in the data set (DT). The method then proceeds to step 1416 determine whether there are any more environmental characteristics in the environmental characteristic set (E). If so, the method returns to step 1406 to retrieve another environmental characteristic and then it captures, tags and stores images with that environmental characteristic in the data set until all the environmental characteristics in the data set have been processed. On the other hand, if there are no more environmental characteristics in step 1416, the method proceeds to step 1418 to determine whether there are any more objects (o) in the object set (O). If so, the method returns to step 1404 to retrieve another object and proceeds to repeat steps 1406 to 1416 for the retrieved object. If not the method is complete and ends having created and stored a data set with all possible combinations of objects, environmental characteristics and device placement characteristics. Those skilled in the art will recognize that this process can be automated to automatically perform the steps of FIG. 14 whenever a new device is added or detected.

Figure 15A:
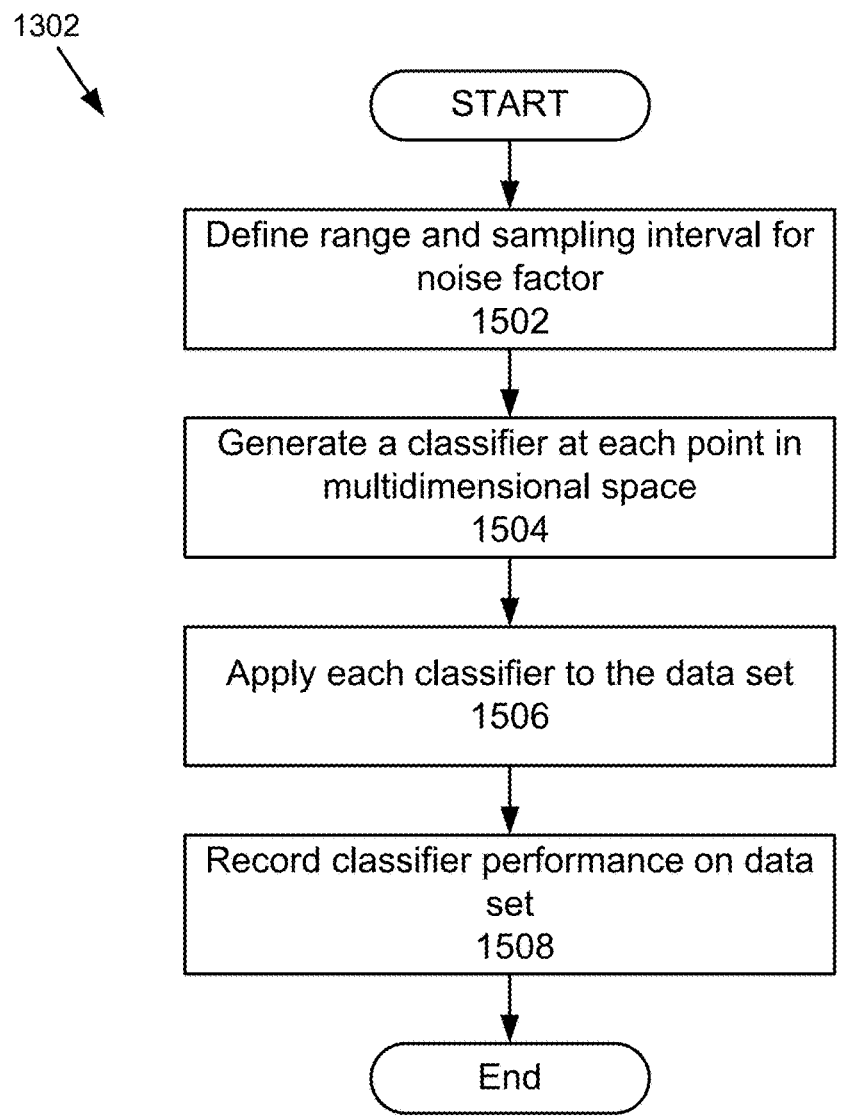
FIG. 15A is a flowchart of a first embodiment of a method for initializing and generating classifiers for blurry images in accordance with the present invention.

Referring now to FIG. 15A, a generalized version of a method for initialization 1302 and generation of the classifier is shown. The method begins by defining 1502 a range and sampling interval for the noise factors (e.g., focus blur, motion blur, dynamic range, etc.). This method generates 1504 a classifier at each point in a multidimensional space. Each classifier is then applied 1506 to the data set (DT). Finally, a performance of the classifier on the data set is recorded 1508.

Figure 15B:
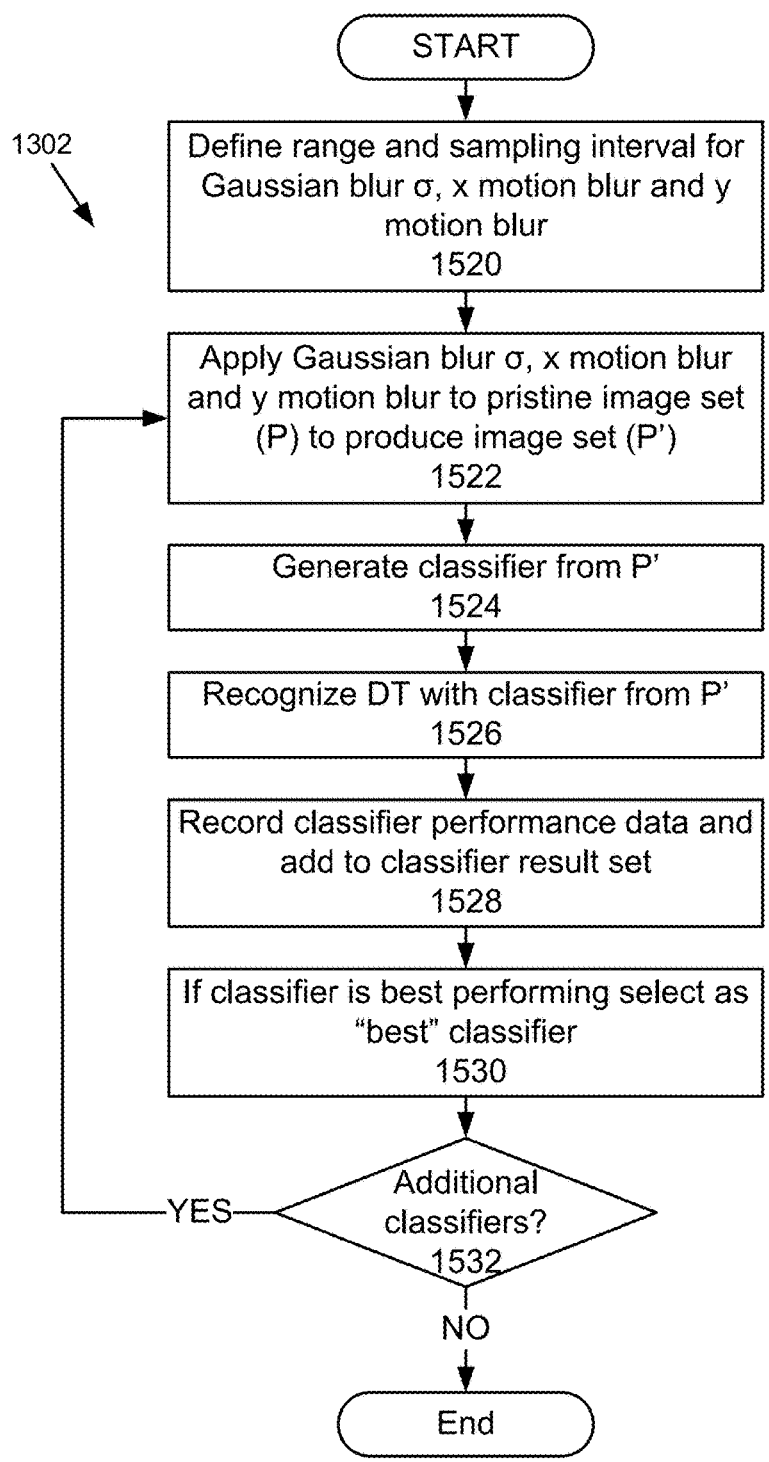
FIG. 15B is a flowchart of a first embodiment of a method for initializing and generating classifiers for blurry images in accordance with the present invention.

Referring now to FIG. 15B another embodiment of the method for initialization 1302 and generation of classifiers is shown. The method FIG. 15B provides an example of classifier generation where the noise is Gaussian blur σ, x motion blur and y motion blur. The method begins by defining 1520 the range and sampling interval for the Gaussian blur σ, x motion blur and y motion blur. For example, the Gaussian blur σ equals $s_0$ to $s_g$ by interval $s_i$; the motion blur in the x direction, $d_x$, equals $d_{x0}$ to $d_{xx}$ by interval $d_{xi}$; and the motion blur in the y direction, $d_y$, equals $d_{y0}$ to $d_{yy}$ by interval $d_{yi}$. Next the method applies 1522 the Gaussian blur σ, x motion blur and y motion blur to a pristine image set (P) to produce image set P'. For example, for each pristine object image p in the pristine image set P, this step applies Gaussian blur σ, $s_0$ to $s_g$ for each interval $s_i$, x motion blur $d_{x0}$ to $d_{xx}$ for each interval $d_{xi}$ and y motion blur $d_{y0}$ to $d_{yy}$ by interval $d_{yi}$, and adds the resulting images to image set P'. Next, the method generates 1524 a classifier from P'. For example, the method generates a classifier C for sigma, $d_x$, $d_y$ for a point in a multidimensional space. The method then applies the classifier C sigma, $d_x$, $d_y$ to recognize 1526 the images in training set DT. The method records 1528 the classifier performance including the number of images recognized, the identity of the images and an average confidence score, for example the average number of inliers for invisible junctions. Then the classifier C is added to a classifier results set (CR). Next, the method determines 1530 whether the classifier is the best performing and if so identifies 1530 the classifier as such (best classifier=(sigma, $d_x$, $d_y$)). For example, the classifier is the best performing if it has the highest number of images recognized and the highest average confidence score among all the classifiers tested up to this point. The method next determines 1532 whether there are any additional classifiers. In other words, the method determines whether there are any points in the multidimensional space of possible values for Gaussian blur, x motion blur and y motion blur for which a classifier has not been generated. If so, the method returns to step 1522 and generates a classifier for one of those points and repeats steps 1524 to step 1532. On the other hand, if there are no additional classifiers to be generated the method is complete and ends.

Figure 16:
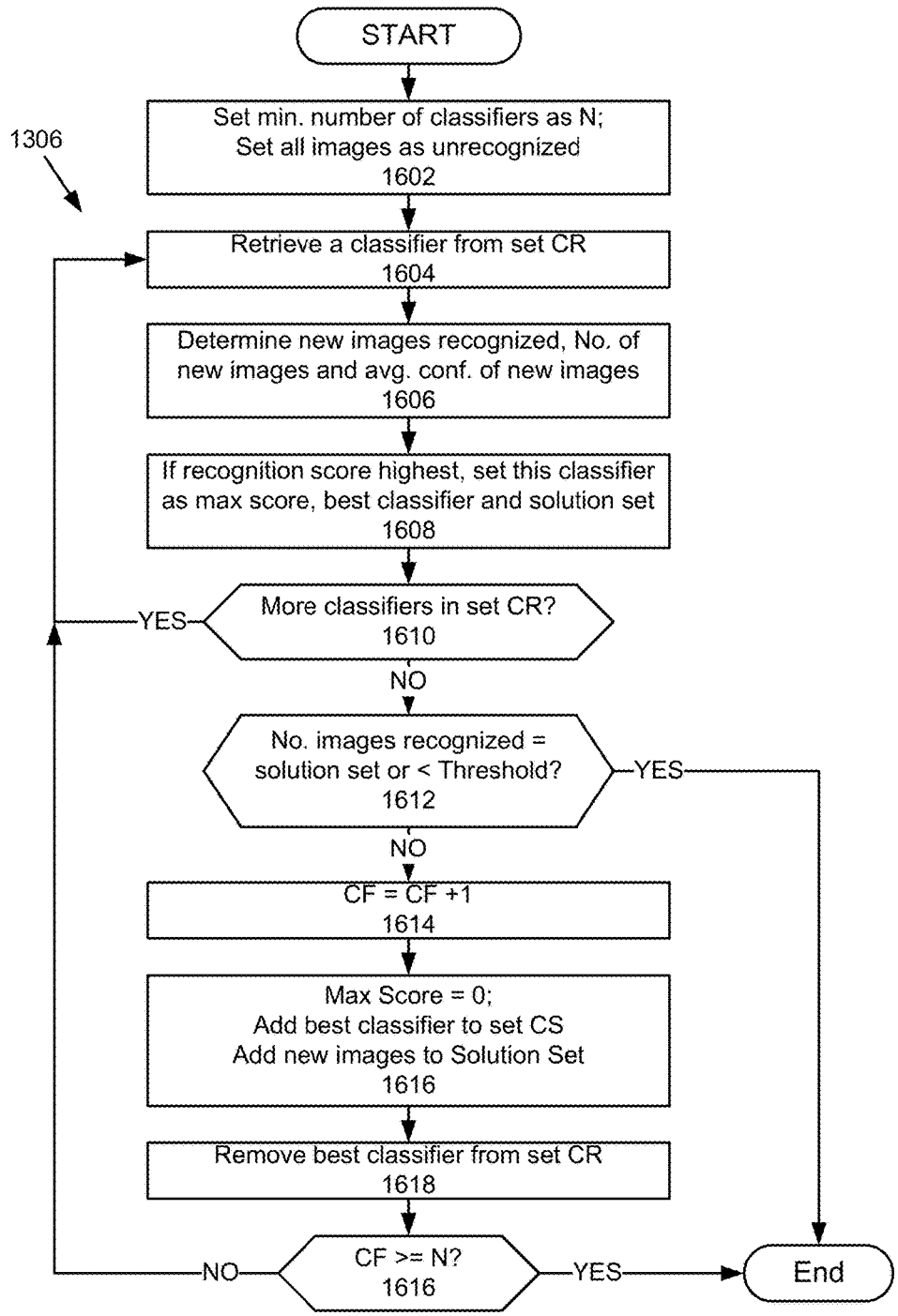
FIG. 16 is a flowchart of an embodiment of a method for finding a classifier that recognizes the most images in accordance with the present invention.

Referring now to FIG. 16 a method for finding a classifier that recognizes the greatest number of images will be described. Basically, the method finds the classifiers that recognize the most "unrecognized" images, adds it to the solution set, and considers those images "recognized." This process is repeated until either N classifiers are determined or the number of newly "recognized" images is less than a threshold.

The method begins by setting 1602 the minimum number of classifiers N required and setting all the device training images as "unrecognized." Next, the method retrieves 1604 a classifier from the classifier set CR. Then the method determines 1606 the images from the device training set that are recognized by the classifier and an average confidence score for the recognized images. A classifier recognition score is then determined using the number of new images recognized and average confidences scores for those new images. If the classifier recognition score is the highest, then a maximum score is set 1608 to this classifier's score, a best classifier is set to have the values of sigma, dx and dy of this classifier, and the solution set is defined as including the images recognized by this classifier. Next, the method determines 1610 whether there are more classifiers in the classifier set CR. If so, the method returns to step 1604 and proceeds to repeat steps 1606 and 1608. If not, the method determines 1612 whether this new "best" classifier significantly improves the expected performance of current solution. It does this by determining whether the number of newly recognized images is less than a threshold or the total number of recognized images is equal to the device training set. If either condition is true, the method is complete. Otherwise, the method proceeds to step 1614 and increments a variable CF representing the number of classifiers found by one. The method adds the new "best" classifier to classifier set CS, adds the new images recognized by the classifier to the solution set and resets the maximum score to zero. Then the method removes 1618 the "best" classifier from the classifier set CR. Finally, the method determines whether the number of classifiers found is greater than or equal to N, the number of classifiers desired for a working classifier set. If not, then method returns to step 1604 to repeat the process for the classifier set CR from which the best classifier has just been removed. If so, the method is complete and ends.

Figure 17:
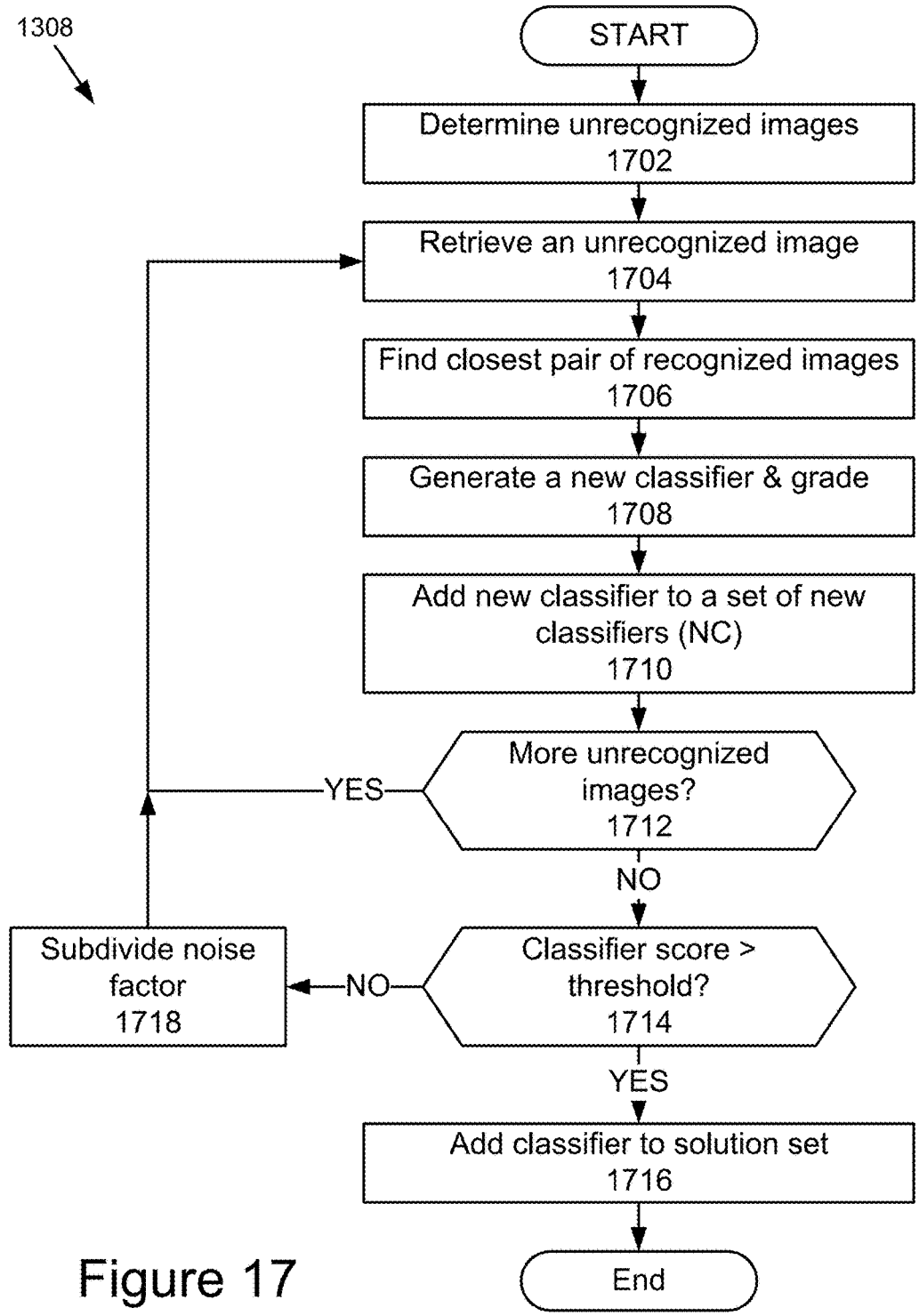
FIG. 17 is a flowchart of an embodiment of a method for modifying and testing a classifier against unrecognized images in accordance with the present invention.

Referring now to FIG. 17 a method for hypothesizing and testing will be described. Once the best classifiers have been determined, the present invention intends to improve recognition by modifying the classifiers. The method begins by determining 1702 the unrecognized images in the device training set. For example, this can be done by removing all the images recognized in the method of FIG. 16 from device training set (unrecognized images=DT−GS), where GS=the Solution Set found in FIG. 16. The method retrieves 1704 a selected unrecognized image. Next, the method finds 1706 the closest pair of recognized images that match different classifiers where distance is determined by comparing placement characteristics and environmental factors. In one embodiment, this step is performed by finding a pair of images (i1, i2) in GS such that: a) i1 and i2 are recognized by different classifiers; b) distance(u,i1) is smallest over all images in GS; c) distance(u,i2) is second smallest over all images in GS subject to condition 1; and d) the distance between the two images is determined by comparing the object, environmental conditions, and placement characteristics for each one. In the simplest case, all objects and environmental conditions are considered to be the same and the distance is determined by the L2 norm on the placement characteristics, normalized for each dimension. Then the method generates 1708 a new classifier from noise characteristics that are half way between those of each member of the pair, and grades the new classifier. In one embodiment, the method generates the new classifier based on the pair of images i1 and i2. For example, the method starts with sigma=(sigma of i1+sigma of i2)/2; dx=(dx of i1+dx of i2)/2; dy=(dy of i1+dy of i2)/2. Then for each pristine object image p in training set P Gaussian blur sigma, motion blurs dx and dy are applied to p and the result added to P'. Then a modified classifier C sigma, dx, dy (P') is generated. Next the modified classifier C sigma, dx, dy(P') is used to recognize the unrecognized images (DT−GS) and the method records the number of images recognized, identity of images, and average confidence score (avg. # inliers for IJ). The new classifier is added 1710 to a set of new classifiers. Next, the method determines 1712 whether there are more unrecognized images. If so, the method returns to 1704 to retrieve another unrecognized image and then repeat steps 1706, 1708, 1710 and 1712 for that unrecognized image. Next, the method determines 1714 whether the classifier recognition score is above a threshold. If so, the method either adds 1716 the classifier to the solution set (if the solution set size is less than N) or adds it to the multidimensional space; and the method is complete. If not, the method continues subdividing 1718 the noise factor space until the difference is below threshold, and then returns to step 1704 to generate a new classifier.

In one example, the method begins with image u (3" from object, tilt=5 degrees, rotation=0 degrees), and finds images image i1 (3" from object, tilt=10 degrees, rotation=0 degrees) recognized by C (sigma=20, dx=0, dy=10) and image i2 (4" from object, tilt=0 degrees, rotation=10 degrees) recognized by C(sigma=10, dx=10, dy=0). The method generates a new classifier nc sigma=(10+20/2)=15, dx=(0+10/2)=5, dy=(10+0/2)=5.

Quality Predictor 502

Referring now to FIGS. 18-21, an embodiment of the quality predictor 502 and its operation will be described in more detail. The quality predictor 502 produces a recognizability score (aka Quality Predictor) that can be used for predicting whether or not an image is a good candidate for a particular available image/recognition algorithm. An image may not be recognizable based on many reasons, such as motion blur, focus blur, poor lighting, and lack of sufficient content. The goal of computing a recognizability score is to label the recognizable images as "poor quality," and label recognizable images as "good quality." Besides this binary classification, the present invention also outputs a "recognizability score" where images are assigned a score based on the probability of their recognition.

The quality predictor 502 will now be described with reference to an embodiment in which the quality predictor 502 is part of the dispatcher 402 as has been described above and is depicted in FIG. 5. In this embodiment, the quality predictor 502 provides a recognizability score as input to the distributor 506 that decides which recognition unit 410 (and thus which recognition algorithm to run). However, those skilled in the art will realize that there are numerous system configurations in which the quality predictor 502 and the recognizability score are useful and advantageous. In a second embodiment, the quality predictor 502 is run on a capture device (mobile device 102 phone, digital camera, computer 110) to determine if the quality of the captured image is sufficient to be recognized by one of recognition units 410 of the MMR matching unit 106. If the quality of the captured image is sufficient, it is sent to the MMR matching unit 106, if not, the user is simply asked to capture another image. Alternatively, the captured image and the quality predictor score are shown to the user and he/she decides whether it should be submitted to the MMR matching unit 106. In a third embodiment, the quality predictor 502 is part of the result combiner 610 where there are multiple recognition units 410 and the recognizability score determines how the recognition results are evaluated. In a fourth embodiment, the quality predictor 502 is part of the indexing unit 414 and computation of a recognizability score precedes the indexing process, and the score is used in deciding which indexer/indexers need to be used for indexing the input document page. For example, if the recognizability score is low for the image to be indexed using the BWC algorithm, then the image may be indexed using only the IJ algorithm. Further, the same quality predictor can be used for both indexing and recognition. In a fifth embodiment, the quality predictor 502 is used before the "image capture" process on a mobile device 102. The recognizability score is computed prior to capturing the image and device captures an image only if the recognizability score is higher than a threshold. The quality predictor 502 can be embedded in a camera chip and can be used to control the camera's hardware or software. For example, camera aperture, exposure time, flash, macro mode, stabilization, etc. can be turned on based on the recognition units 410 requirements and the captured image. For example, BWC can recognize blurry text images and capturing blurry images can be achieved by vibrating the camera phone.

Figure 18:
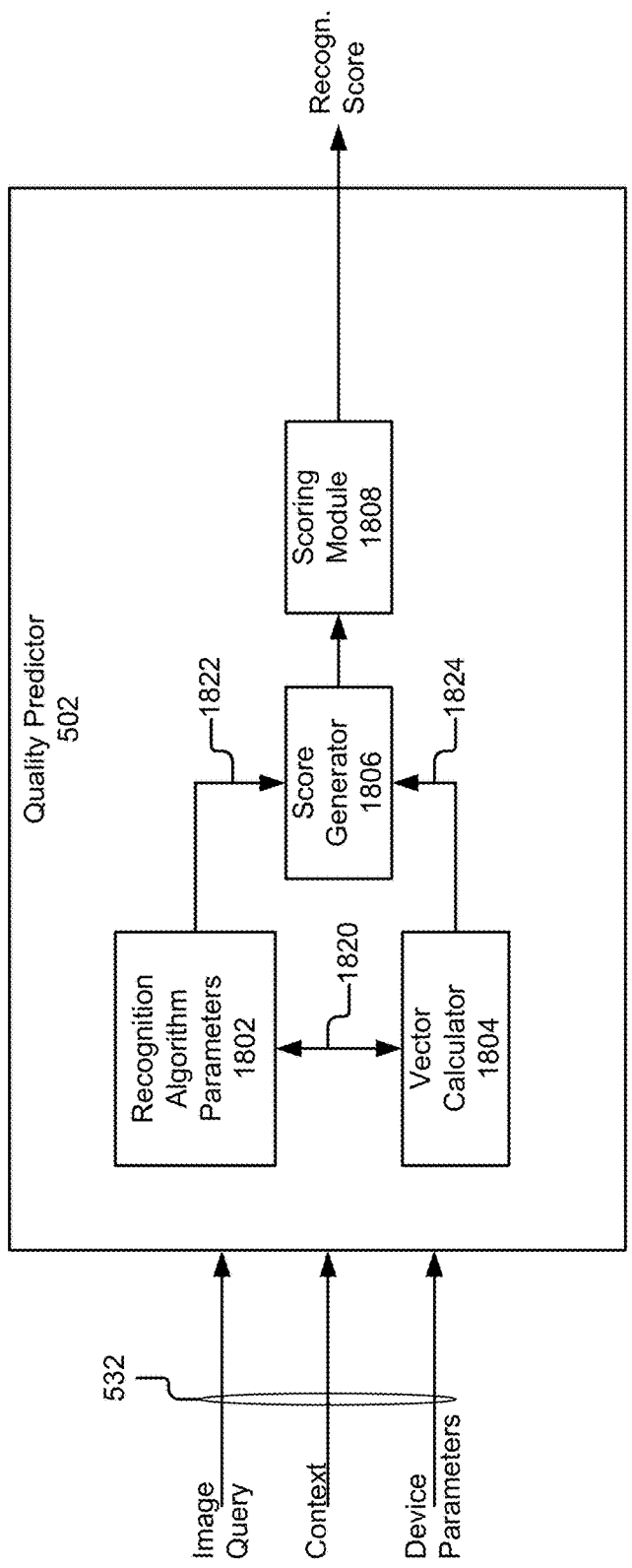
FIG. 18 is a block diagram of an embodiment of a quality predictor in accordance with the present invention.

As shown in FIG. 18, one embodiment of the quality predictor 502 comprises recognition algorithm parameters 1802, a vector calculator 1804, a score generator 1806 and a scoring module 1808. The quality predictor 502 has inputs coupled to signal line 532 to receive an image query, context and metadata, and device parameters. The image query may be video frames, a single frame or image features. The context and metadata includes time, date, location, environmental conditions, etc. The device parameters include brand, type, macro block on/off, gyro or accelerometer reading, aperture, time, exposure, flash, etc. Additionally, the quality predictor 502 uses certain parameters of the recognition algorithm parameters 1802. These parameters of the recognition algorithm parameters 1802 can be provided to the quality predictor 502 from the acquisition unit 406 or the image registration unit 408. The vector calculator 1804 computes quality feature vectors from the image to measure its content and distortion, such as its blurriness, existence and amount of recognizable features, its luminosity, etc. The vector calculator 1804 computes any number of quality feature vectors from one to n. One embodiment of the vector calculator 1804 is described below with reference to FIG. 19. In some cases, the vector calculator 1804 requires knowledge of the recognition algorithm(s) to be used, and the vector calculator 1804 is coupled by signal line 1820 to the recognition algorithm parameters 1802. For example, if an Invisible Junctions algorithm is employed, the vector calculator 1804 computes how many junction points present in the image as a measure of its recognizability. All or some of these computed features are then input to score generator 1806 via signal line 1824. The score generator 1806 is also coupled by signal line 1822 to receive recognition parameters for the recognition algorithm parameters 1802. The output of the score generator 1806 is provided to the scoring module 1808. The scoring module 1808 generates a recognition score using the recognition scores provided by the score generator 1806 and applies weights to those scores. In one embodiment, the result is a single recognizability score. In another embodiment, the result is a plurality of recognizability scores ranked from highest to lowest.

Figure 19:
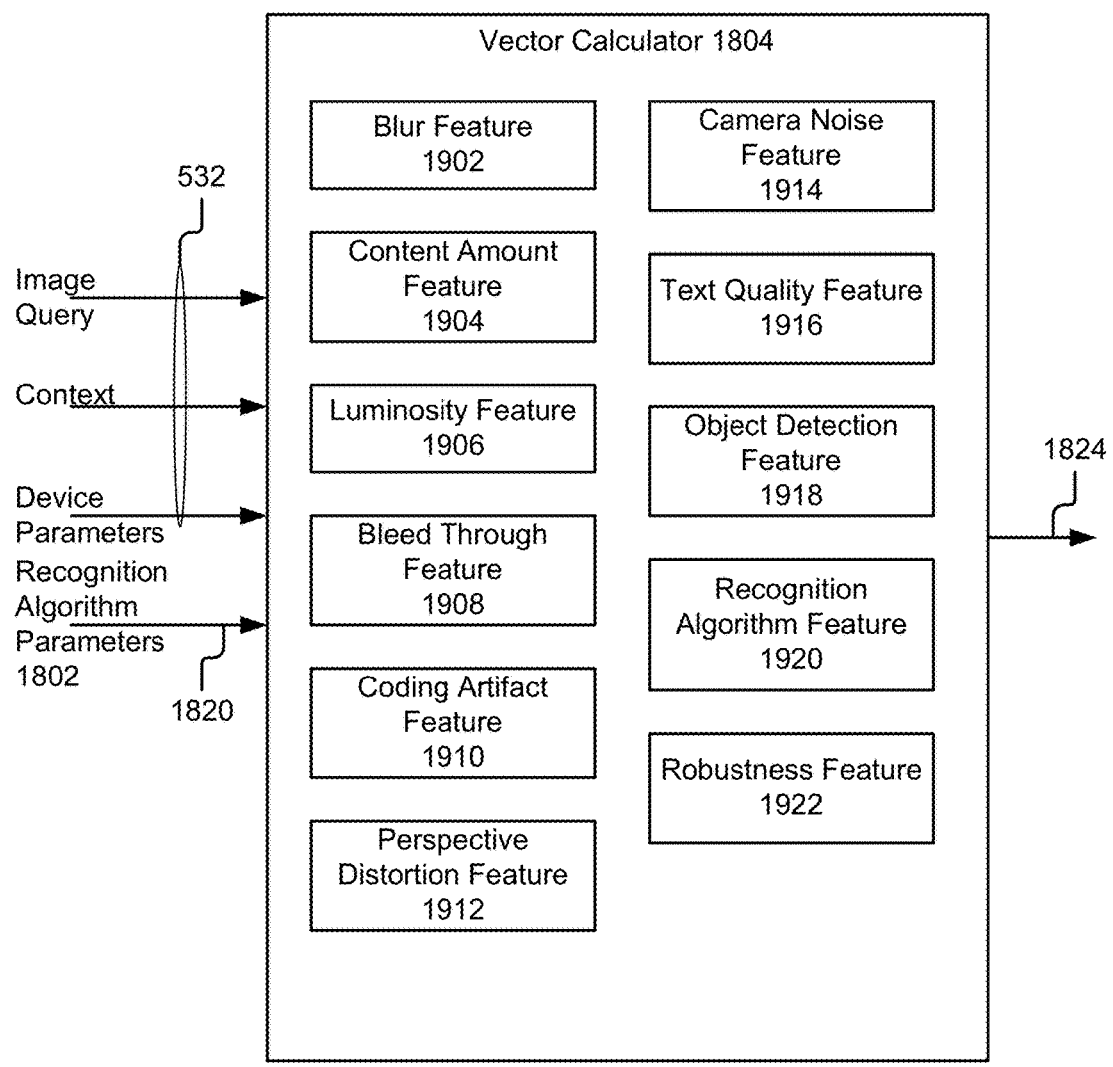
FIG. 19 is a block diagram of an embodiment of a vector calculator in accordance with the present invention.

Referring now to FIG. 19, an embodiment of the vector calculator 1804 in accordance with the present invention is shown. The vector calculator 1804 comprises a blur feature module 1902, a content amount feature module 1904, a luminosity feature module 1906, a bleed through feature module 1908, a coding artifacts feature module 1910, a perspective distortion feature module 1912, a camera noise feature module 1914, a text quality feature module 1916, an object detection feature module 1918, a recognition algorithm feature module 1920 and a robustness feature module 1922. Those skilled in the art will realize that the vector calculator 1804 they include various other feature modules and the embodiment of FIG. 19 is only one example. Other embodiments may have more or fewer modules than those depicted in FIG. 19. The vector calculator 1804 has inputs for receiving the image query, the context and metadata, device parameters, and parameters of the recognition algorithm. In one embodiment, these inputs are coupled to the modules 1902, 1904, 1926, 1908, 1910, 1912, 1914, 1916, 1918, 1920 and 1922 of the vector calculator 1804.

The blur feature module 1902 is software and routines for determining a quality feature based on an amount of blur in a captured image. In one embodiment, motion blur features are computed in one or more of the following ways:

Gradient Based Features. The gradient of the input image is computed (for example with a [−1 0 1] kernel), in both horizontal and vertical dimensions. The magnitudes of gradient values are used to form two n-bin histograms (for example n=3), one for vertical and one for horizontal direction, yielding a 2n dimensional feature vector. The gradient of the input image is computed with 2D kernels and histograms is computed for n gradient directions (for example in n=8 direction). The histogram can be computed for the whole image or the image can be divided into overlapping or non overlapping regions and an n-bin histogram can be computed for each region. For example, if the image is divided into K×L non-overlapping rectangle regions, the resulting feature vector will be size of K×L×n.

Edge detection. Edge detection such as described in "*A Computational Approach To Edge Detection*," Canny, J., IEEE Trans. Pattern Analysis and Machine Intelligence, 8:679-714, 1986, edge direction and edge amount histograms can be employed in a similar way to compute blur features.

Motion Estimation Based Features. If the input is video frames, the motion between two frames can be estimated with one of the motion estimation algorithms know in the art such as "*A Novel Four-Step Search Algorithm For Fast Block Motion Estimation*," and displacement in horizontal direction (dx), displacement in horizontal direction (dy), and the time of displacement (dt) yields to a feature vector [dx, dy, dt].

Frequency Domain Analysis Based Features. The focus blur of the image can be treated as a spatially-invariant low-pass spatial filter, and the frequency cutoff of this filter is inversely proportional to the size of the blur. If the image contains sharp and high-contrast edges then the image will have significant high-frequency content. The blur feature module 1902 takes 2D Discrete Fourier Transforms (DFT) of the image. As with almost all natural images, spectral magnitude decreases rapidly with increasing frequency. To compute the cutoff, the average spectral magnitude at each frequency (in all directions) is computed. In other words, the average magnitude along concentric ellipses, centered at the DC (0 frequency) term is computed. Once we have this average radial magnitude graph, we want to pick out the cutoff. Specifically, this is the first point at which the spectrum flattens into the noise floor. One way of selecting this cutoff is to low-pass filter the graph (to remove spikiness), scale the graph to a fixed height, and then look for the first point below a certain graph value at which the graph reaches a (fixed) very flat slope. Another way is to look for points in the graph with the greatest curvature (change in angle) over a fixed distance. Once these cutoffs are determined, they are converted into an actual scale. This is most easily done by taking a calibration shot of a text block and computing its cutoff, and then having a function return the ratio of your calibrated cutoff to each new, sampled cutoff. As blur features, we can employ cut off frequency Y and some other features we can compute from the frequency domain analysis, such as Eigen vectors $E_i$ and spread S of the spectrum.

The content amount feature module 1904 is software and routines for determining a quality feature based on the amount of content in the image. In one embodiment, the amount of content features are computed in one or more of the following ways:

Connected component features. Image is binarized for example using a technique described in "*Survey Over Image Thresholding Techniques And Quantitative Performance Evaluation*," and connected components are computed such as using a technique described in "*A Simple And Efficient Connected Components Labeling Algorithm*,". Then content amount feature module 1904 computes a number of features from connected components, such as histogram (H=[$h_1$ . . . $h_n$]) of, average (A) of, and variance ($\sigma$) of connected components such as sizes, widths and heights, number of pixels, aspect ratios, spread, Eigen vectors, number of holes, compactness, etc.

Edge features. Corners such as using "*Optimal Corner Detector*," and edges computed in an image and their detection and strength is used to form corner and edge histograms.

Entropy. Entropies of the connected components (Ecc), binarized pixels (Eb), or graylevel/color pixels (Eg/Ec) in the image are an indication of how much information present in the image. Image can also be segmented into overlapping or non overlapping segments and entropies for each of these segments are computed and used to form entropy feature vectors. A low pass filtering or median filtering step may also be used on the image before computing entropy to remove the camera noise.

Frequency Domain Features. Frequency domain analysis, for example transform functions such as 2D fast Fourier transform (FFT) or Discrete Cosine Transforms (DCT) can be applied to the image (the whole image, or overlapping or non overlapping segments). Once frequency domain representation is obtained, this can be represented with histograms.

Compressed Image Size. If two images are compressed with the same compression algorithm, such as JPEG, with same parameters, such as same quantization factor, most of the time the image with higher frequency content results in a compressed image with higher file size. If the file size S is too high, this may be an indication of speckle noise in the image which makes it harder to recognize the image. If the file size is too low then this may be an indication of lack of significant content in the image.

The luminosity feature module 1906 is software and routines for determining a quality feature based on luminosity features. In one embodiment, the luminosity features are computed in one or more of the following ways:

Histogram features. Patterns in the grayscale histogram or color histogram are good indicators of how the image is illuminated. For example, if an image has mostly dark pixels and not any bright pixels that has a value larger than 50 (where pixel values vary from 0 to 255), then the image is likely to yield a lower recognizability score. Besides forming feature vectors from histograms or features extracted from histograms (such as number of peaks), Fisher discriminant analysis can be performed both on luminance and saturation values of the pixels. Discriminant analysis on luminance samples results in 2 classes with the mean values $ml_1$ and $ml_2$ and interclass variances $vl_1$ and $vl_2$. The degree of separation $ml_1-ml_2$, the summation of interclass variation $vl_1+vl_2$, and/or their ratios, $r=ml_1-ml_2/vl_1+vl_2$ can be used to form a feature vector.

Contrast. Contrast of the image can be computed in a number of efficient ways, for example: Contrast=average of X % lightest pixels/average of Y % darkest pixels.

Shadow. In one method, a shadow mask can be computed from the image such as described in "*Image Difference Threshold Strategies And Shadow Detection*,", and luminosity feature module 1906 uses features extracted from shadow histogram. In another method, luminosity feature module 1906 divides the image into overlapping or non overlapping segments, measure histogram in these segments regions, perform histogram equalization and detect if the histograms are similar. The similarity score can be employed as one of the features.

The bleed through feature module 1908 is software and routines for determining a quality feature based on the bleed through feature. If the captured image is an image of a paper document, and it contains some content from a page that is not in the view (i.e. content printed on the other side of the page), then this would degrade the recognition performance. The content from the other page is referred to here as the bleed through features. Bleed through features can be detected using techniques such as described in "*Restoring Ink Bleed-Through Degraded Document Images Using a Recursive Unsupervised Classification Technique*," P. Rosen, et al. Proceedings of the 6th British Machine Vision Conference, 1995.

The coding artifacts feature module 1910 is software and routines for determining a quality feature based on coding artifacts. Coding and compression artifacts may degrade the recognizability of images. Methods such as described in "Detection Of Blocking Artifacts Of Compressed Still Images," Triantafyllidis et al, can be used to form feature vectors from the amount and probability of coding artifacts' presence in the image.

The perspective distortion feature module 1912 is software and routines for determining a quality feature based on perspective distortion. Severe perspective distortion can affect recognizability of the image. There are many methods for detecting and correcting perspective distortion. Correction may be a part of recognition strategy, but detection of such distortions is useful in identifying if an image is recognizable. Perspective distortion can be measured by many methods such as the relative positions of lines and edges in the image, or using the method described in "Perspective Correction Methods For Camera Based Document Analysis, by Jagannathan et al, Proc. First Int. Workshop on Camera-based Document Analysis and Recognition, 2005. Features representing the amount or a histogram of perspective distortion can be used in computing a recognizability score.

The camera noise feature module 1914 is software and routines for determining a quality feature based on camera noise. If the camera charge-coupled device (CCD) size is too small, or there is not enough light in the environment, the captured image or video frame may contain noise, such as speckle noise. There are several ways to measure such noise. One method used by the camera noise feature module 1914 is to apply speckle noise reduction with median filtering, take the difference between noise in the reduced image and the original image, and compute some features based on the difference image. For example, the percentage of pixels that is larger than a threshold.

The text quality feature module 1916 is software and routines for determining a quality feature based on the text in images. The text can be measured as text box features, optical character recognition (OCR) features or text line features.

Text box features. Text boxes can be detected in an image such as using a method described in "Text Detection from Natural Scene Images: Towards A System For Visually Impaired Persons," N. Ezaki et al. Proc. of 17th Int. Conf. on Pattern Recognition (ICPR 2004), IEEE Computer Society, 2004, pp. 683-686, vol. II, 23-26 August, Cambridge, UK, and a text quality feature module 1916 computes a number of features from text box detection such as: Histogram of text box heights; histogram of text box width/height ratios (nubs); and histogram of text box densities, etc. Histogram of text boxes that are considered good for recognition (good height). For example, text boxes that have less than $1/10^{th}$ of the height of the image and more than $1/50^{th}$ height of the image.

OCR features. Images can be OCR'ed (Optical Character Recognition) and the confidence scores of OCR can be used to form feature vectors.

Text line features. In one embodiment, the text quality feature module 1916 computes text line features by computing line spacing histograms. These features maybe useful especially if the text is blurry and gradient based methods do not provide much information. First graphs from the vertical intensity values (only one pixel wide) are computed, and then the local minimums in each graph are found. Then, the distances between local minimums are computed. These distances correspond roughly the distance between lines. Finally, a histogram is formed with these distances. Histograms of non-document images and document images that contain little text are easily distinguishable since they either have many peaks and the histogram is more uniformly distributed. They also have low peak values. Features extracted from these histograms, such as the number of peaks, N, the height of peaks, $P_i$, are used to form text line feature vectors.

The object detection feature module 1918 is software and routines for determining a quality feature based on the image object. Presence of some objects or shapes such as lines, tables, bulleted items, lists, faces, and buildings affect recognizability depending on the image recognition algorithm. For example, if the image contains mostly tables, the IJ algorithm may not work very well. If the image contains many lines, the BWC algorithm may not work well. In one embodiment, the object detection feature module 1918 can use any one of the following techniques to detect objects in an image: "Use Of The Hough Transformation To Detect Lines And Curves In Pictures," R. Duda and P. Hart, Communications of the ACM, Vol. 15, pp 11-15, 1972; "A Survey Of Table Recognition," by R Zanibbi, D Blostein, J R Cordy, International Journal on Document Analysis and Recognition, 2004; or "Face Detection: A Survey," by E Hjelmas, B K Low, Computer Vision and Image Understanding, 2001 as techniques for object detection in images. The probability of an image containing certain objects, $[P(O_1), \ldots, P(O_i)]$, is a feature vector computed by the object detection feature module 1918.

The recognition algorithm feature module 1920 is software and routines for determining a quality feature based on the differences in recognition algorithms. Entire or part of the feature extraction process (that is part of image recognition algorithm) can be run on the image for measuring its recognizability. For example, if there are not many recognition algorithm specific features extracted, the image can be assigned a low recognizability score. For example, the feature extraction process can be different for each recognition algorithm (such as IJ, BWC, or PC) or share some common components (such as bounding box extraction component in BWC and Syntext coding). For IJ, features extracted from properties of the IJ skeleton, such as the number of junction points, number of regions (holes), histogram of size of regions, and distributions of the regions in the image. In addition, after feature vectors of gradient directions are formed in each junction point, the variations in these feature vectors can be used as a measure of content recognizability. For SIFT, features extracted from detected locations of SIFT features (e.g. via corner detector), as well as SIFT features themselves can be employed as a recognizability measure. For BWC and Syntext, besides word bounding box-based features (mentioned in the "Text Quality Features" section), a full feature vector may be computed. Features such as the number of recognition-specific feature vectors and their spatial distribution can be used as a measure of recognizability. Also, the uniqueness of each feature vector for each recognition algorithm can be measured and used as a measure. For example, in BWC a feature vector of [3 22 22] is very common and a feature vector of [10 67 897] is very unique. TF-IDF (term frequency-inverse document frequency) can be applied to measure the uniqueness of feature vectors. The recognition algorithm feature module 1920 uses any one or combinations of these to produce a feature vector.

The robustness feature module 1922 is software and routines for determining a quality feature based on robustness. The extracted features from an image are robust if they are stable and unaffected by camera distortion from placement, environment and device changes. An input image can be further processed to determine if the extracted features are stable and robust against various camera distortions. For example, for IJ an image can be blurred, tilted, warped (or some other noise simulation can be applied) and the skeleton, feature locations, and feature vectors can be computed again. Then the distance between the feature locations of the input image and those of a distorted image is measured with techniques such as the Hausdorff distance, and the distance between the feature vectors can be measured with techniques such as the Euclidian distance. If a combination (such as a weighted sum or multiplication) of these distances is small, then the image is robust to various camera effects and therefore it has a positive effect on the recognizability score. The distance measures and how these are combined would depend on the recognition algorithm.

Figure 20:
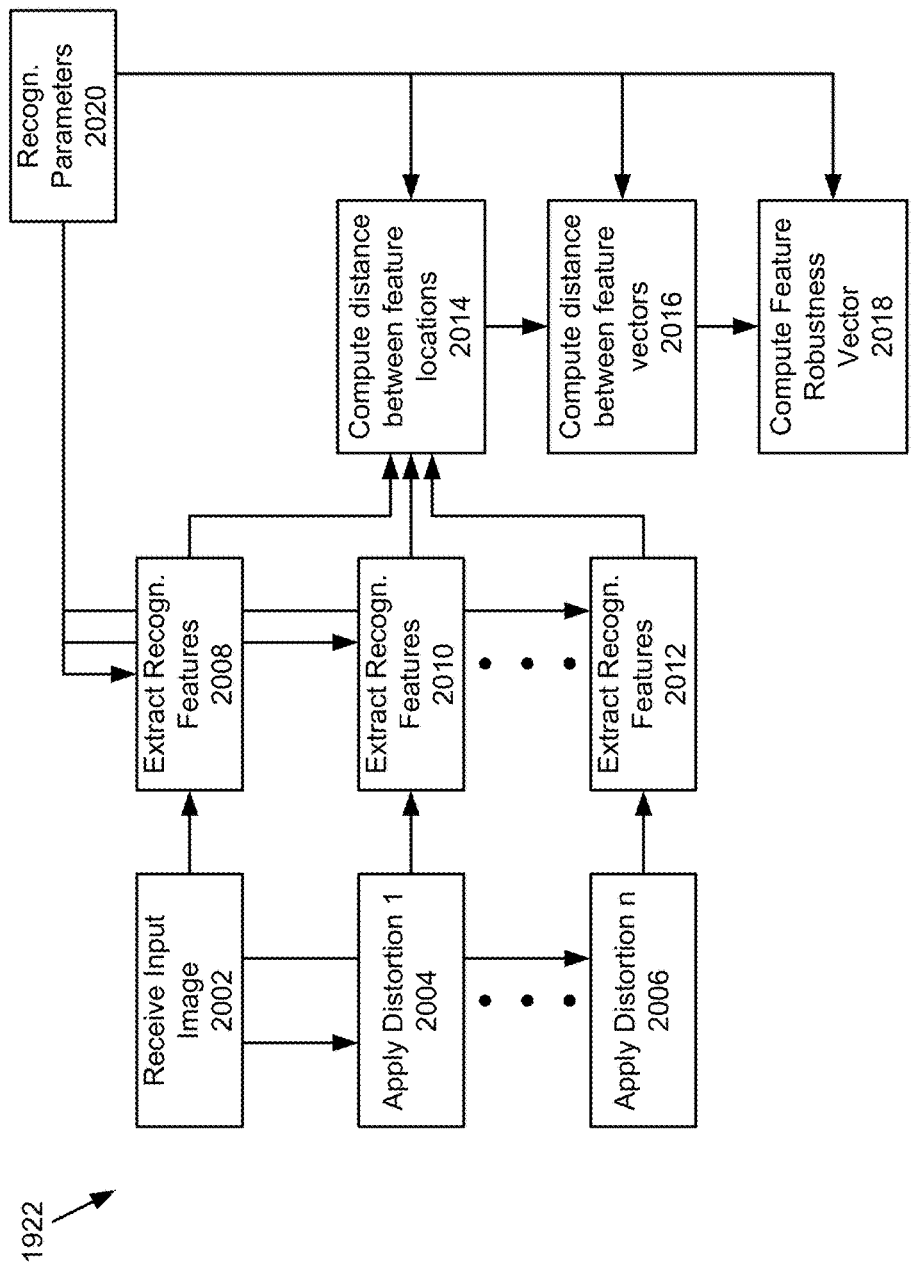
FIG. 20 is a process diagram of a method for generating robustness features in accordance with the present invention.

Referring now also to FIG. 20, a process diagram of a method for generating robustness features such as implemented by the robustness feature module 1922 is shown. The method begins by receiving 2002 an input image. The input image is then processed to extract recognition features 2008 and processed to apply different levels of distortion 2004, 2006. In extracting the recognition features 2008, a set of recognition parameters 2020 such as may be retrieved from the image registration unit 408 or the acquisition unit 406 are used. The recognition parameters 2020 are also provided for the extraction of other features 2010, 2012, computing distances 2014, 2016 and computing the robustness vector 2018. The extracted image features 2008 are provided to model the computed distances between feature locations 2014. Similarly, the received input image 2002 has a first distortion applied 2004, then recognition features are extracted 2010 from the distorted image and the recognition features are provided for the computation of distances between feature locations 2014. This process of receiving the image 2002, applying distortion 2006, extracting features and providing the features is preferably performed for a number of different types of distortion. All the extracted features are then provided to compute 2014 distances between feature locations to produce feature vectors. Then the method computes 2016 the distance between feature vectors. Finally the feature robustness vector 2018 is computed from the distance between the feature vectors.

Figure 21:
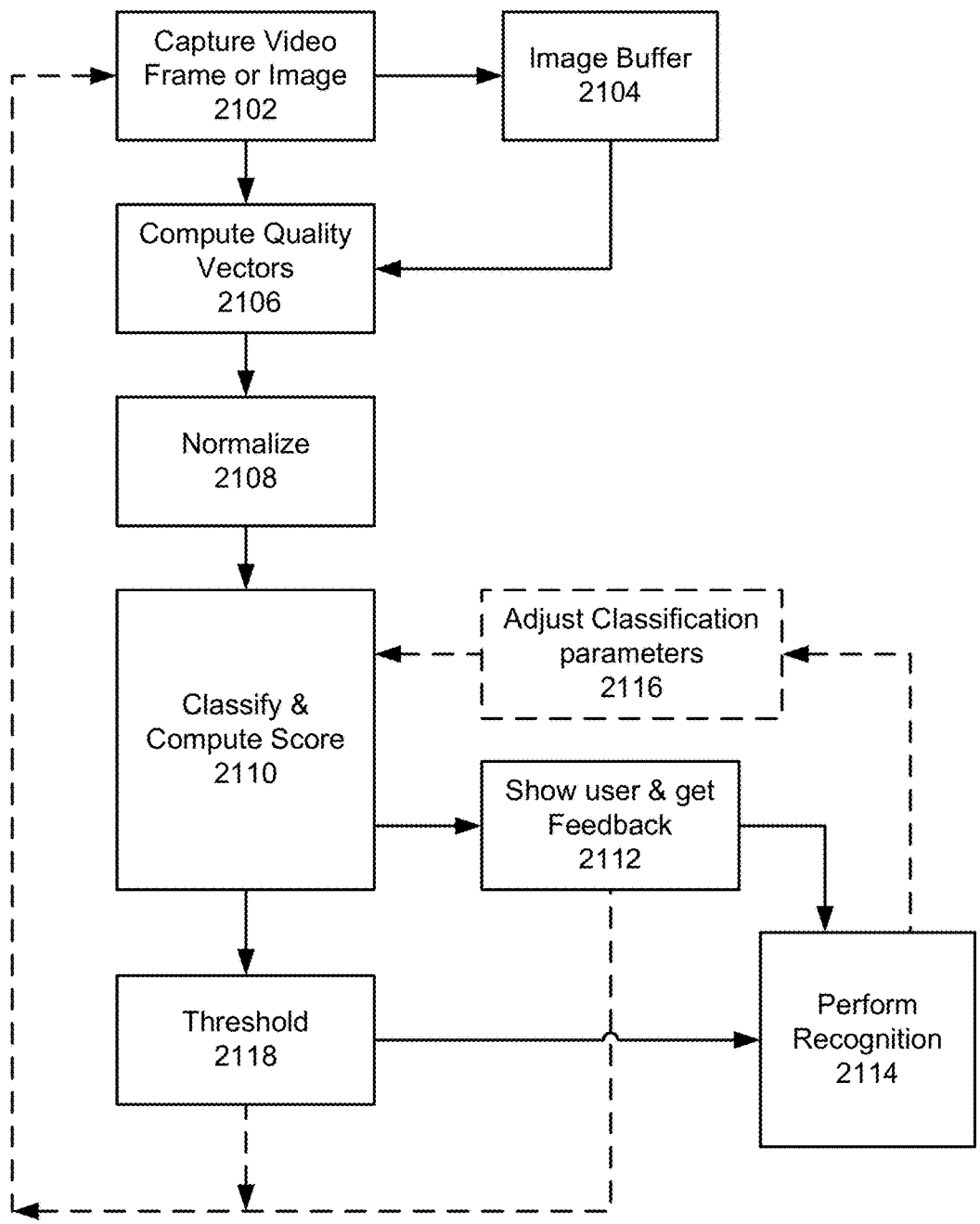
FIG. 21 is a process diagram of a method for generating a recognizability (quality prediction) score in accordance with the present invention.

FIG. 21 is a process diagram of a method for generating a recognizability score in accordance with the present invention. As discussed above, the process begins by capturing 2102 an image or video frame. The captured image can be temporarily stored in an image buffer 2104 or provided directly and immediately for computation 2106 of quality vectors. Some images/video frames can be buffered to be used in quality feature vector computation. As described above for the vector calculator 1804, there are a variety of different features that can be used in calculating the recognizability of the image. Any combination of these features or measurements can be used in predicting recognizability (e.g., generating the recognizability score) of an image using a particular set of recognition algorithms. Each of the modules of the vector calculator 1804 produces feature vectors that represent these measurements. Next, the method normalizes 2108 the feature vectors received from the vector calculator 1804. The normalized vectors are then provided to a module for classifying and computing the recognizability score. The vectors are processed by the classification and scoring module 2110. In one embodiment, the classification and scoring module 2110 is pre-trained with positive and negative image samples and includes a feedback loop 2116 from the recognition unit 410 to adjust the classification parameters. In one embodiment, classification and scoring module 2110 is based on algorithms such as neural networks, naive based classifiers, Bayesian based classifiers, or support vector machine (SVM) based classifiers. These classifiers also output a score, either a probability score or margin of error. In one embodiment, the score is output and used by other components such as the distributor 506 of the dispatcher 402 in determining which recognition unit 410 should be selected to perform 2114 recognition on an input image. In a second embodiment, a threshold is applied 2118 to the score output by the classification of scoring module 2110 and whether a score is above or below the threshold is translated into a Boolean value that can again be used by other components such as distributor 506 of the dispatcher 402 in determining which recognition unit 410 to use for processing.

In another application, such as when the quality predictor 502 is operational as part of a client on the mobile device 102, the score or the score translated into a threshold value can be used to determine whether the received image is of sufficient quality to transmit the captured image from the mobile device 102 on for further processing. In one embodiment, if the recognition score is below a threshold, the recognition score is displayed 2112 to the user along with a request for confirmation that retrieval should be performed on the captured image having the displayed recognition score. In another embodiment, a message is displayed to the user indicating the recognition score and that the score is below a level at which the image can be recognized and therefore the image will not be sent to the MMR Gateway 104. Additionally, the message displayed could request that the user capture another image.

In yet another embodiment, classification (and adjusting classification parameters) is done separately for each algorithm. If quality predictor 502 is used in the dispatcher 402 or prior to indexing, the recognition algorithm that results in the highest recognizability score is selected first in the dispatcher 402 or as indexing algorithm, then the second highest is selected and so on. If quality predictor 502 is used prior to performing retrieval, then the recognizability scores for each algorithm ($R_n$) can be combined in a weighed ($w_n$) sum: Score=$w_1 R_1 + \ldots + w_N R_N$. Weights can be computed based on retrieval time and retrieval accuracy. Weights can also be re-computed on the fly using the retrieval results.

Result Combiner 610

Figure 22:
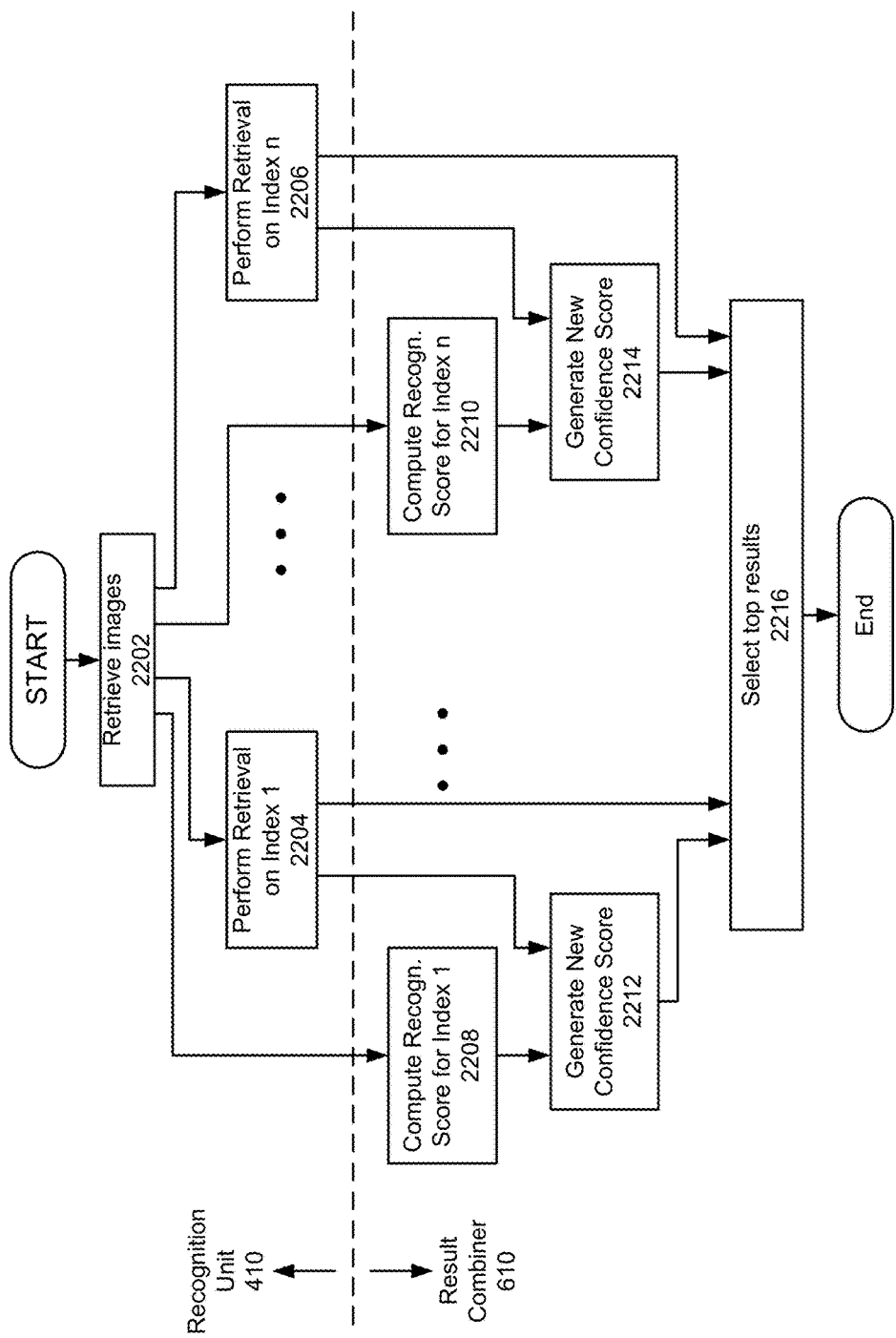
FIG. 22 is a flowchart of a first embodiment of a method for combining a plurality of results using a predictor in accordance with the present invention.
Figure 23:
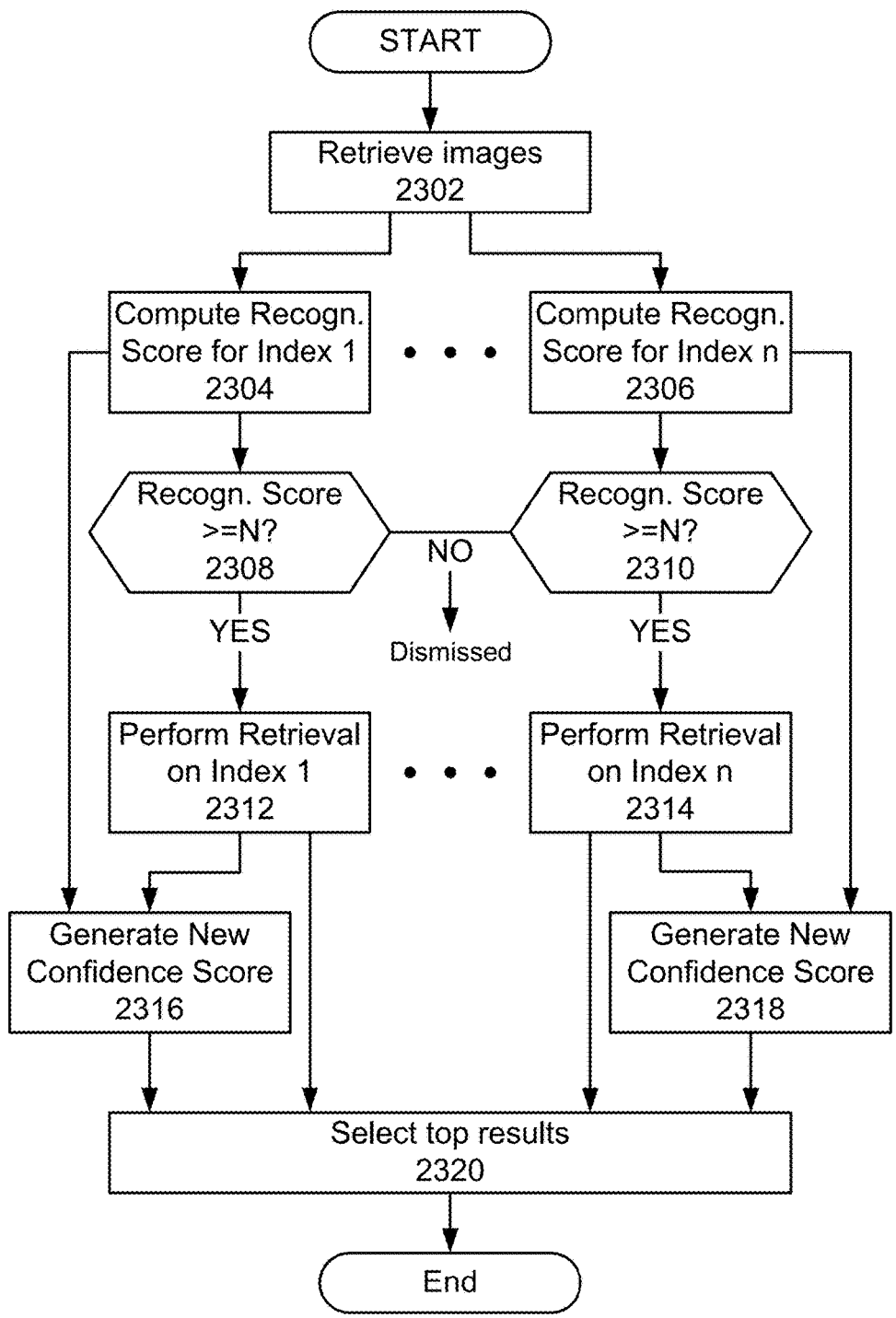
FIG. 23 is a flowchart of a second embodiment of the method for combining a plurality of results using the predictor in accordance with the present invention.
Figure 24:
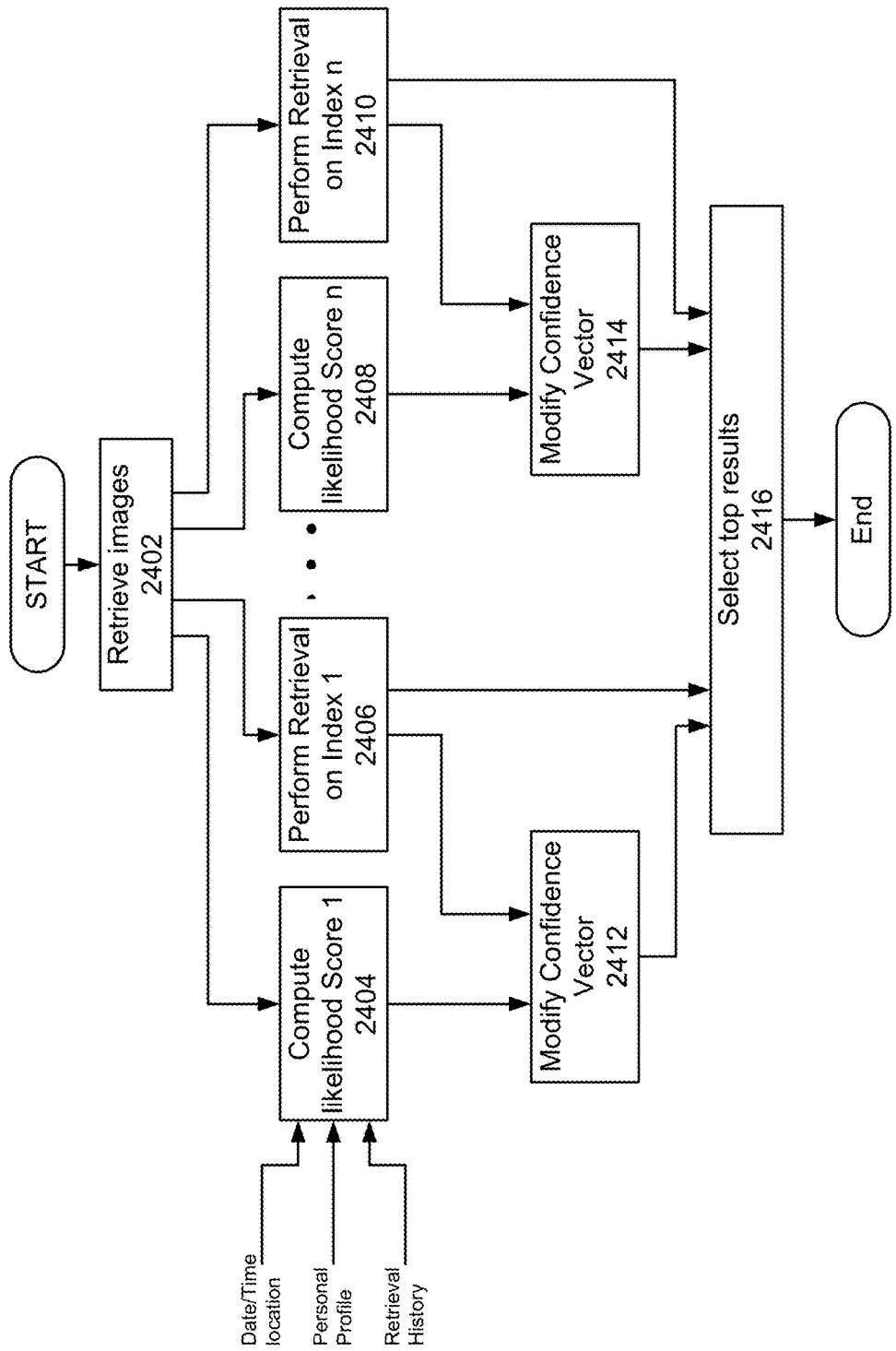
FIG. 24 is a flowchart of an embodiment of a method for combining a plurality of results in accordance with the present invention.

Referring now to FIGS. 22-24 various embodiments of methods for combining results of image-based text retrieval from different image retrieval algorithms is described. FIG. 22 illustrates a first embodiment of a method for combining recognition results using a quality predictor or a recognizability score. FIG. 23 illustrates a second embodiment of a method for combining recognition results using a quality predictor. FIG. 24 illustrates a method for combining a plurality of recognition results (without prediction) in accordance with the present invention.

Referring now to FIG. 22, the first embodiment of a method for combining recognition results using a quality predictor is shown. More particularly, FIG. 22 illustrates processes performed by the result combiner 610 and the recognition unit 410. The processes above the dashed lines are performed by the recognition unit 410 while the processes below the dashed line are performed by the result combiner 610. Given an input image or images (I) and several image recognition algorithms, $A_1 \ldots A_N$, the output of each recognition algorithm is a list of recognition results={$R_{1,n}, \ldots, R_{k,n}$} (for example top K matched document, page, and location on the page) and confidence values associated with each of these results={$C_{1,n}, \ldots, C_{k,n}$}, therefore: [$\vec{C}_n, \vec{R}_n$]=$A_n(I)$. In addition, prediction algorithms, $P_1 \ldots P_N$ (that compute recognizability given an Algorithm $A_n$), compute a recognizability score based on an input image or images (I), and recognition algorithms, $S_n=P_n(I, A_n)$. The method of the first embodiment determines a result R (that contains information about matched document, such as document id, page, and location on the page) or an ordered result list using the following method.

The process begins by retrieving 2202 images. The retrieved images are used to perform recognition/retrieval 2204, 2206 using a plurality of indices 1 to n. In one embodiment, each recognition algorithm $A_n$ is run to obtain result and confidence vectors for the input image, $[\vec{C}_n, \vec{R}_n]=A_n(I)$. Next, the result combiner 610 computes 2208, 2210 a recognizability score using a plurality of indices 1 to n. The prediction algorithm is run to obtain a recognizability score for each input image and each algorithm, $S_n=P_n(I, A_n)$. These two confidence scores are used to compute 2212, 2214 a new confidence score $\vec{C'}_n$. For example, a new confidence score $\vec{C'}_n$ is computed based on $\vec{C}_n$ and $S_n$, $\vec{C'}_n=f(\vec{C}_n, S_n)$ for each algorithm $A_n$. Finally, the top results based on the new confidence scores are selected 2216 and output. In one embodiment, this is performed by merging and sorting $\vec{R}_1, \ldots, \vec{R}_N$, based on their corresponding confidence values $\vec{C'}_1, \ldots, \vec{C'}_N$, resulting $\vec{R}_s$. Then the method outputs the top L results of $\vec{R}_s$. L can be any integer greater that one.

Referring now to FIG. 23, the second embodiment of a method for combining recognition results using a quality predictor is shown. Unlike the first embodiment, different steps of the method of FIG. 23 are performed by components of the MMR matching unit 106. The method begins by receiving 2302 images. These images are then used compute 2304, 2306 recognizability scores for a plurality of indexes one to n. In other words, the prediction algorithm is run to obtain a recognizability score for each input image and each algorithm, $S_n=P_n(I, A_n)$. Next, the method determines 2308, 2310 whether the corresponding recognizability score is greater than a predefined threshold. If not, the received images are dismissed and no additional computations are performed. On the other hand, if the recognizability score is greater than the predefined threshold, the method continues to perform recognition/retrieval 2312, 2314 using indexes one to n. For example, each recognition algorithm $A_n$ is run to obtain result and confidence vectors for the input image, $[\vec{C}_n, \vec{R}_n]=A_n(I)$. Then a new confidence score is generated 2316, 2318 for each index one to n. The new confidence score $\vec{C'}_n$ is computed based on $\vec{C}_n$ and $S_n$, $\vec{C'}_n=f(\vec{C}_n, S_n)$. Finally, the top results are selected 2320 and output. In one embodiment, $\vec{R}_1, \ldots, \vec{R}_n$ are merged and sorted based on their corresponding confidence values $\vec{C'}_1, \ldots, \vec{C'}_n$, resulting in $\vec{R}_s$, and then the top L results of are output.

In an alternate embodiment, the processes described above with reference to FIGS. 22 and 23 are modified slightly as follows. The recognition results, confidence scores and modify or new confidence scores are produced in a similar manner. Specifically, the prediction algorithm is run to obtain recognizability score for input image and each algorithm, $S_n=P_n(I, A_n)$. The recognition algorithm $A_n$ is run to obtain result and confidence vectors for the input image, $[\vec{C}_n, \vec{R}_n]=A_n(I)$, only if the corresponding prediction score $S_n$ is higher than a threshold. (We assume that $\vec{R}_n$ is sorted based on the confidence scores, therefore $R_{1,n}$ is the best guess for the matching result. Note that some algorithms may not output any result because of their internal threshold). However, rather than just merging and sorting the top recognition results as in the method described above, this alternate embodiment uses the top results from each algorithm $(R_{1,1}, \ldots, R_{1,N})$ for voting for the best result. The votes can be counted based on document id, (docid+pageid), or (docid+pageid+patch location). Patch locations (x,y) do not exactly need to be the same, a proximity measure can be used for giving votes to each document patch location. The method then output the result that receives the most votes.

Furthermore, if there is a tie between results, one of the following methods can be used to output a result: a) Sum the confidence values $C_{1,n}$ of the tied groups of results and output the result corresponding to the highest confidence summation; b) Compute modified confidence scores $C'_{1,n}=f(C_{1,n}, S_n)$. Sum the modified confidence values $C'_{1,n}$ of the tied groups of results and output the result corresponding to the highest confidence summation; c) Sum the prediction score $S_n$ of the tied groups of results and output the result corresponding to the highest prediction score summation; d) Output the result $R_{1,n}$ of the algorithm that produced the highest confidence score $C_{1,n}$ or the highest modified confidence score $C'_{1,n}$; e) Output the result $R_{1,n}$ of the algorithm that produced the highest prediction score $S_n$; or f) Predetermine the order of algorithms to output (based on their previously measured accuracy). For example, first IJ, then snake coding, etc.

FIG. 24 illustrates a method for combining a plurality of recognition results (without prediction) in accordance with the present invention. The process begins by retrieving 2402 images. The retrieved images are used to perform recognition/retrieval 2206, 2208 using a plurality of indices 1 to n. In one embodiment, each recognition algorithm $A_n$ is run to obtain result (if any) and confidence vectors for the input image, $[\vec{C}_n, \vec{R}_n]=A_n(I)$. (We assume that $\vec{R}_n$ is sorted based on the confidence scores, therefore $R_{1,n}$ is the best guess for the matching result. Note that some algorithms may not output any result because of their internal threshold). Next, a prediction algorithm is run 2404, 2408 to obtain a likelihood score for input image and each algorithm, $S_n=P_n(I, A_n)$. The likelihood score as receives and uses the date, time location, personal profile, retrieval history and other context and metadata to generate the likelihood score, $O_n$. The confidence score and the likelihood score are used to compute 2412, 2414 a modified confidence score. For example, a modified confidence score $\vec{C'}_n$ is computed based on $\vec{C'}_n=f(O_n, \vec{C}_n)$ for each algorithm $A_n$. Finally, the top results based on the new confidence scores are selected 2216 and output. In one embodiment, this is performed by merging and sorting $\vec{R}_1, \ldots, \vec{R}_n$ based on their corresponding confidence values $\vec{C'}_1, \ldots, \vec{C'}_n$, resulting $\vec{R}_s$ Then the method outputs top L results of. L can be any integer greater that one. In a second embodiment, the top results from each algorithm are determined by voting. The top $L_n$ results from each algorithm $(\{R_{1,1}, \ldots, R_{L_1,1}\}, \ldots, \{R_{1,N}, \ldots, R_{L_N,N}\})$ is used to vote (with weights) for the best result. $L_n$ depends on the algorithm. For example IJ may output only one result, i.e. $L_n=1$, and BWC may output its top 10 results, $L_n=10$. If $L_n$ is set to 1 for all algorithms, only the top result from each algorithm votes for the result. In one embodiment, the voting weights are based on confidence scores corresponding to each result, 1/(rank in retrieval), or some other measure. The voting scheme and weights can also be trained using a boosting algorithm such as "A Short Introduction To Boosting," by Freund, Y. and Schapire, R., J. Japanese Society of Artificial Intelligence, v. 14, no. 5, pp. 771-780, 1999. Further, if there is a tie, one of the following methods can be used to output a result: a) Sum the confidence values of the tied groups of results and output the result corresponding to the highest confidence summation; b) Output the result $R_{1,n}$ of the algorithm that produced the highest confidence score; c) Pre-determine the order of algorithms to output (based on their previously measured accuracy). For example, first IJ, then snake coding etc.

In other embodiments, a classifier (such as neural networks, naive based classifiers, Bayesian based classifiers, SVM based classifiers) can be trained with any combination of the confidence scores of retrieved algorithms, retrieval results, recognizability score or likelihood score $S_n$, and/or any combination of features used for computing recognizability score. At retrieval time, the computed scores and features for the input image/images are input to the trained classifier to obtain the recognition result and a confidence score (which might be based on margin of error, probability of the classification etc).

In addition to the embodiment described above, the location and region of the retrieved page may be reconciled among a plurality of recognition results. Once a document, page, and approximate patch location is identified, the method computes the exact location of the patch. Different algorithms may produce different location results. Algorithms may not produce any "location on the page" information, may produce only x,y coordinates, x,y coordinates and width and height, $(x_1,y_1,x_2,y_2)$ coordinates that are not rectangular, or some arbitrarily shaped region defined by a polygon, a closed curve, etc. A final retrieved region or x,y center can be found by assigning priority to algorithms $A_n$ that is based on their accuracy and output the retrieved region based on this priority. Alternatively, in one embodiment, the method finds the retrieved location (x,y) on the page by averaging the mass centers of the retrieved regions, or an x, y location that minimizes the Hausdorff distance to all the edges of the closed regions. The retrieved region on the page is determined by finding a region defined by a rectangle, a polygon (etc.) that minimizes the total overlap error in the retrieved regions.

Analytics Module 320

Figure 25:
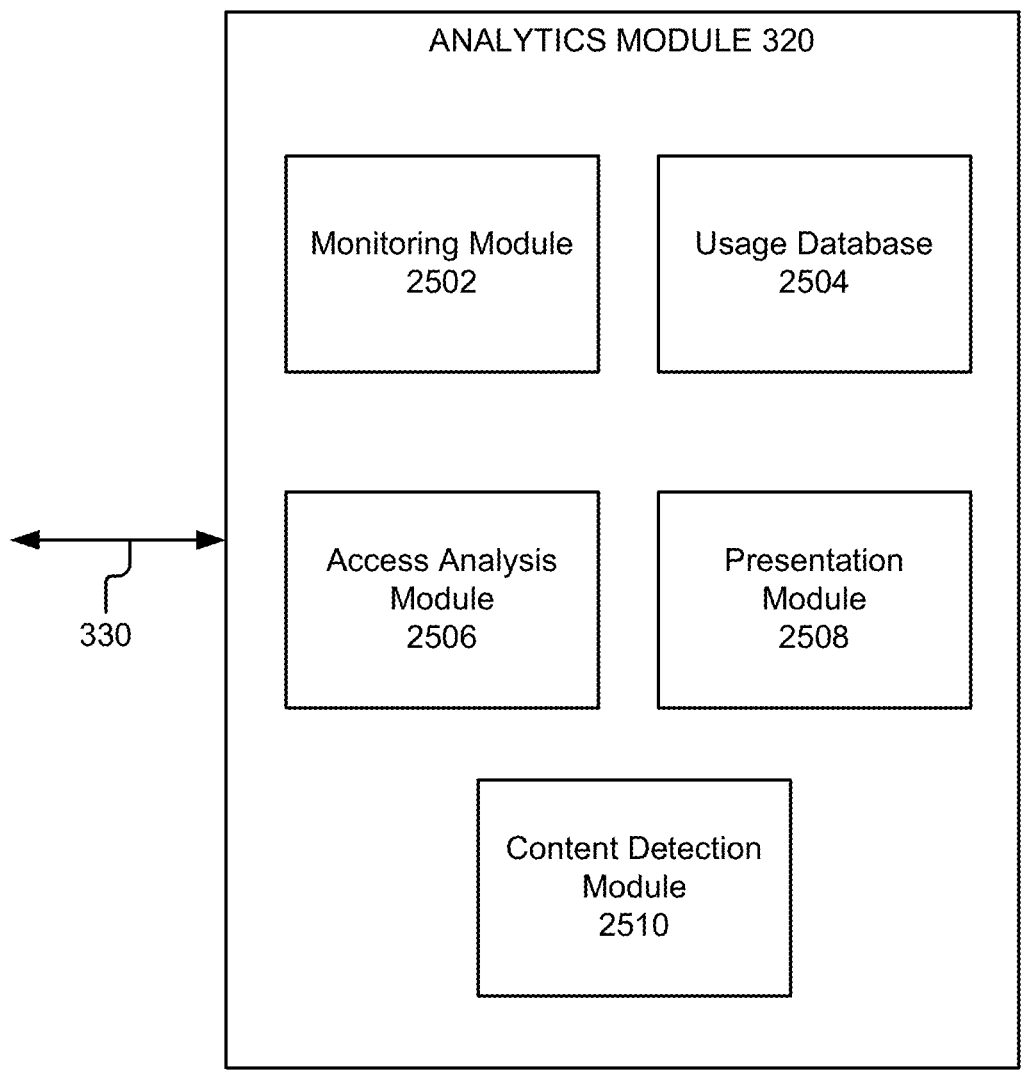
FIG. 25 is a block diagram of an embodiment of an analytics module of FIG. 3 in accordance with the present invention.

While the analytics module 320 will now be described in the context of the MMR system 100, those skilled in the art will recognize that it is only by way of example. The analytics module 320 may be operable in any visual retrieval system or any visual content search system. Referring now to FIG. 25, the analytics module 320 is shown in more detail and is responsible for monitoring the creation (indexing and hotspot creation) and the usage of visual retrieval system, such as MMR system 100, by the mobile devices 102a-n. While the present invention is now described with reference to the mobile devices 102a-n accessing the MMR system 100, those skilled in the art will recognize that the queries of the MMR system 100 may be by any type of computing device including but not limited to desktop computer, personal computers or laptop computers. The analytics module 320 comprises a monitoring module 2502, a usage database (or other storage device) 2504, an access analysis module 2506, a presentation module 2508 and a content detection module 2510. Although not shown, the monitoring module 2502, the usage database 2504, the access analysis module 2506, the presentation module 2508 and the content detection module 2510 are adapted for communication with each other and with signal line 330. The analytics module 320 is coupled by signal line 330 to the server 302 of the MMR Gateway 104. This coupling allows the analytics module 320 to receive any information received, output or processed by the MMR gateway 104 as it receives retrieval requests from the mobile devices 102a-n, generates and sends image queries to the MMR matching unit 106, and receives recognition results from the MMR matching unit 106. In an alternate embodiment not shown, the analytics module 320 is coupled to signal line 134 to monitor and record such information. This coupling of the analytics module 320 to signal line 330 also provides the analytics module 320 with access to information sent by the MMR publisher 108 through the MMR Gateway 104 to the image registration unit 408 of the MMR matching unit 106. In an alternate embodiment not shown, the analytics module 320 is coupled to signal lines 138, 140 or 136 receive such information. In yet another embodiment, the analytics module 320 is coupled to signal line 450 (see FIGS. 4A and 4B) to receive the results of indexing. Those skilled the art will recognize that there are a variety of other couplings for the analytics module 320 to provide other functionality such as feedback to the other components of the MMR system 100.

The analytics module 320 of the present invention is particularly advantageous for a number of reasons. First, the analytics module 320 monitors searching and access to visual content and how this relates to user behavior. Visual content search is more challenging than text search and not being able to identify the source of visual content (thus returning no result) is much more common than in text search. Therefore, the analytics module 320 monitors user query submissions, content of the visual search, and how retrieval performance affects user behavior. For example, the analytics module 320 determines the number of unsuccessful visual retrieval attempts before the average user give up submitting additional query images. When this is monitored real-time, incentives are provided to users to encouraging additional submissions.

Second, the analytics module 320 monitors user actions on the retrieved content. The user submits visual content via his/her mobile device 102 to retrieve recognition results or perform an action. In some applications, the user inputs secondary actions based on the recognition results, for example connecting to a web page, e-mailing an article, playing a music clip or a video clip, downloading museum opening times, etc. These secondary actions can be set as defaults or selected either prior to retrieval or after the retrieval. If the selection is done after the retrieval, options for user actions are based the recognition results.

Third, the analytics module 320 provides more specific information about the precise location on a document that is present to the user, and thus in which the user is interested. In contrast to browsing on personal computers, browsing on mobile devices 102a-n provides more context information because of the small display area. For example, when users are navigating to show a small area of a large page, it is likely that they are interested in that section even if they do not click on a link. Currently on the screen of a personal computer, determining where users are focusing is difficult to assess without an "eye tracker," which is not a common device. Thus, the analytics module 320 provides more specific context information at no cost.

Fourth, the analytics module 320 provides location and direction of travel of the mobile devices 102a-n. When monitoring access by users from mobile devices 102a-n, unlike access from personal computers, the direction of travel can also be measured and reported by the analytics module 320.

Fifth, the analytics module 320 monitors the indexing of data. Visual data, such as document pages, books, photos and newspapers are indexed for retrieval. The analytics module 320 analyzes the type of indexed content (images, text, tables, headlines, etc); the number of pages, metadata about indexed documents such as date, publisher, author, etc.; and provides information about the indexed database.

Finally, the analytics module 320 monitors the addition and association of hotspot data. The indexed visual data is associated with additional digital information, such as URL links, video and audio clips, and actions such as e-mail and purchase. This association can be automatic or manual and stored as hotspot data. Information about hotspot data, such as the size of the area associated with hotspot data (half page, one column, full page etc.), type of hotspot data, are monitored by the analytics module 320 and reported or used as the basis for secondary actions.

Referring back to FIG. 25, the monitoring module 2502 is software and routines for monitoring information associated with retrieval requests, image indexing and hotspot creation; and storing that data in the usage database 2504. The functionality of the monitoring module 2502 will be shown and described in more detail below with regard to FIGS. 26-29. In particular, the operation of the monitoring module 2502 to capture information associated with processing retrieval requests and returning recognition results is described below with reference to FIGS. 26 and 28. The operation of the monitoring module 2502 to capture and store information associated with the indexing of new image data or the creation of hotspots is described below in more detail with reference to FIGS. 27 and 29.

The usage database 2504 is a conventional relational database and stores information received from the monitoring module 2502. The usage database 2504 is coupled to receive information from the monitoring module 2502 and store the information. The usage database 2504 includes variety of different tables and records for storing any types of information processed by the MMR gateway 104. In another embodiment, the usage database 2504 can be an storage device such a flash memory, a hard disk, etc. The usage database 2504 is also coupled to the access analysis module 2506 and the presentation module 2508. The usage database 2504 receives and responds to queries for particular information from the access analysis module 2506. The usage database 2504 also receives a response to queries from the presentation module 2508 for information to output or information used for performing secondary actions.

The access analysis module 2506 is software and routines for retrieving and analyzing the information monitored and stored in the usage database 2504. In addition, the access analysis module 2506 also computes correlations between users based on a variety of different factors. In one embodiment, the access analysis module 2506 performs its calculations in real time so that its results can be used to provide additional content and guidance to the user of the mobile device 102. Those skilled in the art will recognize that there are numerous types of analyses and correlations that can be generated by the access analysis module 2506, a few examples of which are detail below. It should be understood that the access analysis module 2506 also performs similar analysis and correlation for the indexing images and the creation and association of hotspot data.

The presentation module 2508 is software and routines for the presentation of usage information or the output of an action based on usage information. The presentation module 2508 is coupled to the usage database 2504 to present queries and receive results. The presentation module 2508 is also coupled to the access analysis module 2506 to receive its analyses and correlations. In one embodiment, the presentation module 2508 uses the retrieved information to generate reports that show retrieval statistics. In another embodiment, the presentation module 2508 uses retrieved information and information from the access analysis module 2506 to send enhanced or additional content to specific mobile devices 102 to which the information pertains. In yet another embodiment, the presentation module 2508 initiates a secondary action based upon information from the access analysis module 2506 and/or information from the usage database 2504. Those skilled in the art will recognize that the presentation module 2508 can perform its actions based on retrieval requests, creation or indexing of images, association of hotspots with the indices, or one or more of these. Example outputs generated by the presentation module 2508 are shown and described below with reference to FIGS. 31 and 32.

The content detection module 2510 is software and routines for the detection of specific content within a query image or an image to be indexed. In certain embodiments, the content detection module 2510 processes the images from the MMR gateway 104 or the MMR publisher 108. In one embodiment, the content detection module 2501 extracts metadata from the query image; for example determines the type (text versus picture versus headlines) and content (face, building, table detection etc). In an alternate embodiment, the content detection module 2510 post processes metadata received along with the query image. The content detection module 2510 is coupled to signal line 330 to receive raw image data and has an output coupled to the monitoring module 2502 so that the metadata may be stored in the usage database 2504.

Figure 26:
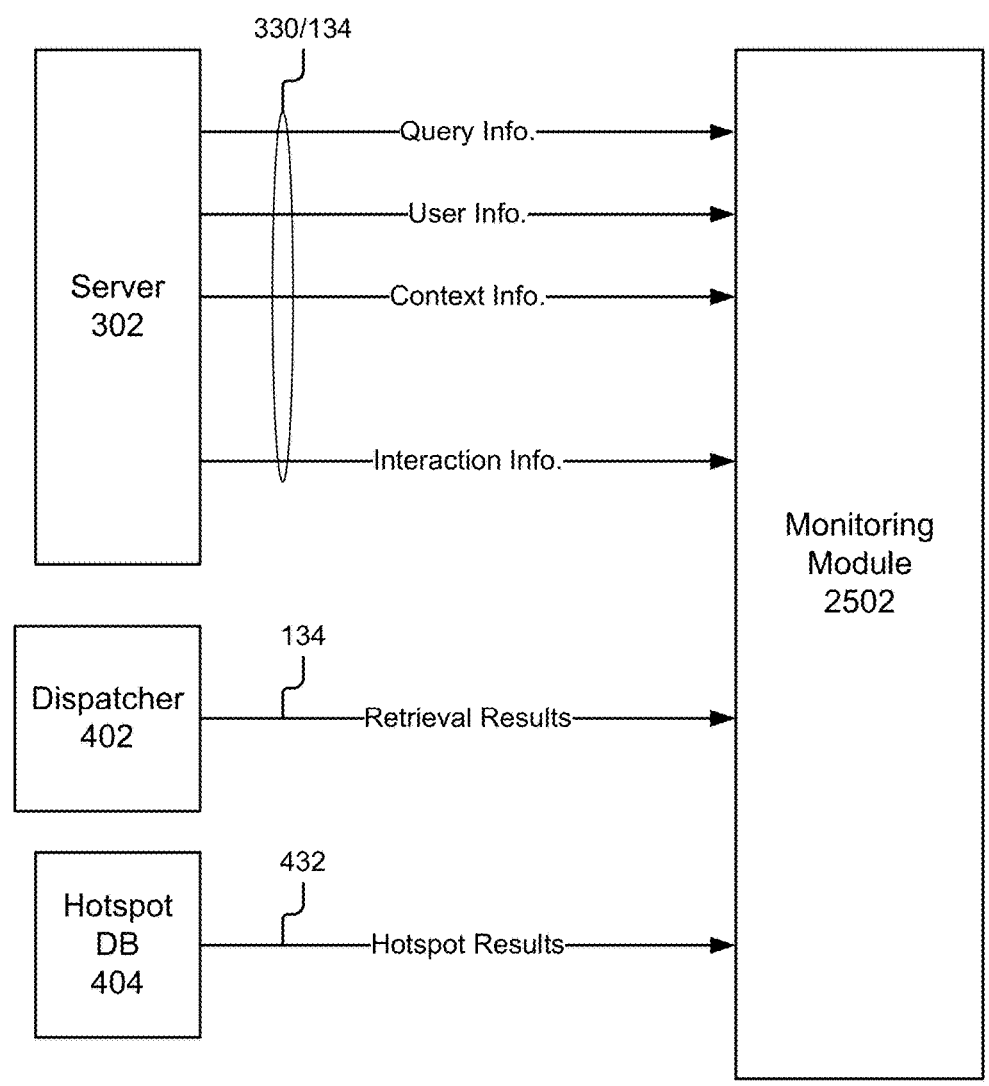
FIG. 26 is a block diagram of an embodiment of a monitoring module showing sources of data related to retrieval in accordance with the present invention.

Referring now to FIG. 26, the operation of the monitoring module 2502 during the image retrieval process of the MMR system 100 will be described in more detail. More specifically, for a particular retrieval request from a mobile device 102, the monitoring module 2502 captures and stores a variety of information related to that retrieval request as well as recognition results. Again, FIG. 26 illustrates the operation of the monitoring module 2502 in the context of the MMR system 100. However, those skilled in art will recognize how the principles disclosed here are applicable to operation of the monitoring module 2502 in any other visual content retrieval system.

As shown in FIG. 26, the monitoring module 2502 is coupled to the server 302 of the MMR Gateway 104 by signal lines 330,134. This coupling to the server 302 allows the monitoring module 2502 to capture query information, user information, context information and/or interaction information. The query information includes the information captured by the mobile device 102 such as the picture/video frame or some extracted information from this content (such as feature vectors or id) and device information. More specifically, the query information includes one or more of query date, query time, image size, phone type, phone settings (macro on/off, autofocus on/off etc), any phone sensors (accelerometer reading, etc.), metadata generated by content detection module 2510 (e.g., how many faces in the image, does image contain a table, building, text, etc.), the way query was submitted (e.g., mms versus plug-in), phone connection speed, phone processor speed or wireless carrier. The user information includes one or more of user id, user subscription information, user settings (e.g., privacy settings, default actions, etc.), user preferences, usage profile, other user information, such as occupation, etc. The context information includes one or more of location (e.g., via GPS, AGPS, cell tower location), direction of travel (i.e. towards the city center, towards north, etc.), weather, date, time, etc. The interaction information is any information about user's interaction and actions using recognition results. Examples of interaction information include a) purchase transactions: what is purchased, how many purchases, how much spent, etc.; b) advertisement viewing: what advisement is viewed, how long, was it followed by a request for more information (such as click); and c) enrollment/login: user enrolled. The monitoring module 2502 is also coupled to the dispatcher 402 of the MMR matching unit 106 by signal line 134. This allows the monitoring module 2502 to capture retrieval results. Retrieval results including one or more of retrieval successful/not successful; retrieval confidence; retrieved document id, page, location on the page; retrieved document image; retrieved document date; retrieval algorithm (and its parameters) that resulted in recognition; retrieval duration or usage of retrieval processors, modules. The monitoring module 2502 is also coupled to the hotspot database 404 by signal line 432 to capture any other data such as hotspot results send back the mobile device. The hotspot results include one or more of retrieval results, confirmation; actions presented to user (such as send e-mail, make a purchase); or advertisement related or not related to query.

In one embodiment, the information captured by the monitoring module 2502 is represented with XML representation but it is possible to represent this information using other ways such as plain text, sms, sql database etc. An example of representing some of the above information in XML format is as follows:

```
<user_id> User1 </user_id>
<Query_information>
    <query_id> Query1 </query_id>
    <image_width> 400 </ image_width>
    <image_height> 500 </ image_height>
</Query_information>
<User_information>
    <subscription> Time Magazine </subscription>
    <subscription> Business Week Magazine </subscription>
</User_information>
<Context_information>
    <city> Seattle </city >
    <country> USA </country>
    <time> 5/10/2008, 10:02pm </time>
</Context_information>
<Retrieval_results>
    <success> 1 </success >
    <type> advertisement </type>
    <publication_info>
    <title> Time magazine </title>
    <date> 5/10/2008</date>
    <id>5211</id>
     5
    </ publication_info>
</ Retrieval_results >
<Action id=1244411 >
    <time> 5/10/2008, 10:03pm </time>
    <origin>Server</origin>
    <type> MMS </type>
    <option id=1>
    <text >Purchase item</text>
    <action>Follow_URL</action>
    <url> http://www.amazon.com/item=4252525</url >
    <option>
    <option id=2>
    <text >Watch video</text>
    <action>Watch_Video</action>
    <url> http://www.youtube.com/id=2346767</url >
```

```
    <option>
    <option id=3>
    <text >Get more information</text>
    <action>Follow_URL </action>
    <url> http://www.time.com </url >
    <option>
</ Action>
<Action id=124442 >
    <time> 5/10/2008, 10:05pm </time>
    <origin>User</origin>
    <type>Complete_Purchase</type>
    <amount>$50</amount>
</ Action>
<Action id=1244456 >
    <time> 5/10/2008, 10:07pm </time>
    <origin>User</origin>
    <type>Follow_URL </type>
    <url> http://www.time.com </url >
</ Action>
<Action id=1244467 >
    <time> 5/10/2008, 10:07pm </time>
    <origin>User</origin>
    <type>Browse_URL </type>
    <area> 100,200,50,150</area>
</ Action>
```

Figure 27:
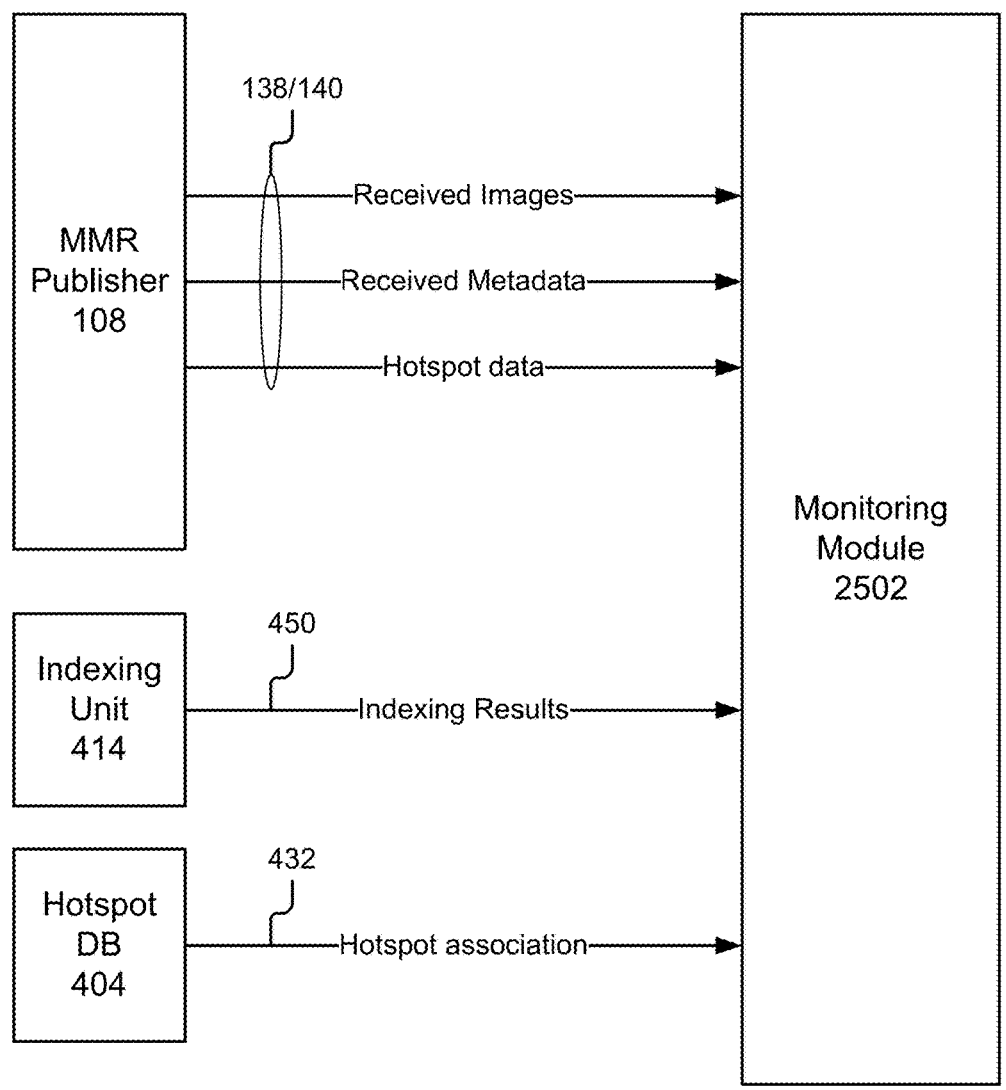
FIG. 27 is a block diagram of an embodiment of the monitoring module showing sources of data related to creation in accordance with the present invention.

Referring now to FIG. 27, the operation of the monitoring module 2502 during the index creation or hotspot association process of the MMR system 100 will be described in more detail. More specifically, in response to the indexing of image content from the MMR publisher 108 or association of hotspot information with an index image, the monitoring module 2502 captures and stores a variety of information related to index creation or hotspot association. As shown in FIG. 27, the monitoring module 2502 is coupled to the MMR publisher 108 by signal lines 138, 140. This coupling to the server 302 allows the monitoring module 2502 to capture received images, received metadata and hotspot data. The received images includes one or more of the image data itself, index date, index time, image size (e.g., A4, newspaper, 2000×1400), or image resolution (e.g., 400 dpi). The received metadata includes one or more of document id, document date, submitter id, location of where indexing request was submitted from, metadata generated by content analysis (e.g., how many faces detected in this content, etc.), or submission method (e.g., via web interface, via publisher interface). The hotspot data includes one or more of type of hotspot data (e.g., text, video, audio link, etc.) or type of action taken with hotspot data. The monitoring module 2502 is also coupled by signal line 450 to the indexing unit 414 of the image registration unit 408. This allows the monitoring module 2502 to capture the indexing results. The indexing results include one or more of indexing method, indexing duration, indexing servers (which ones are accessed), how similar is indexed document to what is already indexed. The monitoring module 2502 is also coupled to the hotspot database 404 by signal line 432 to capture any hotspot association information. In one embodiment, the hotspot association information includes one or more of how many actions are associated with a document or image region, what type of content is associated with what type of action and hotspot data. For example, "picture associated with purchase merchandise," "table associated with automatically enter to an excel file," or "text associated with e-mail article."

Figure 28:
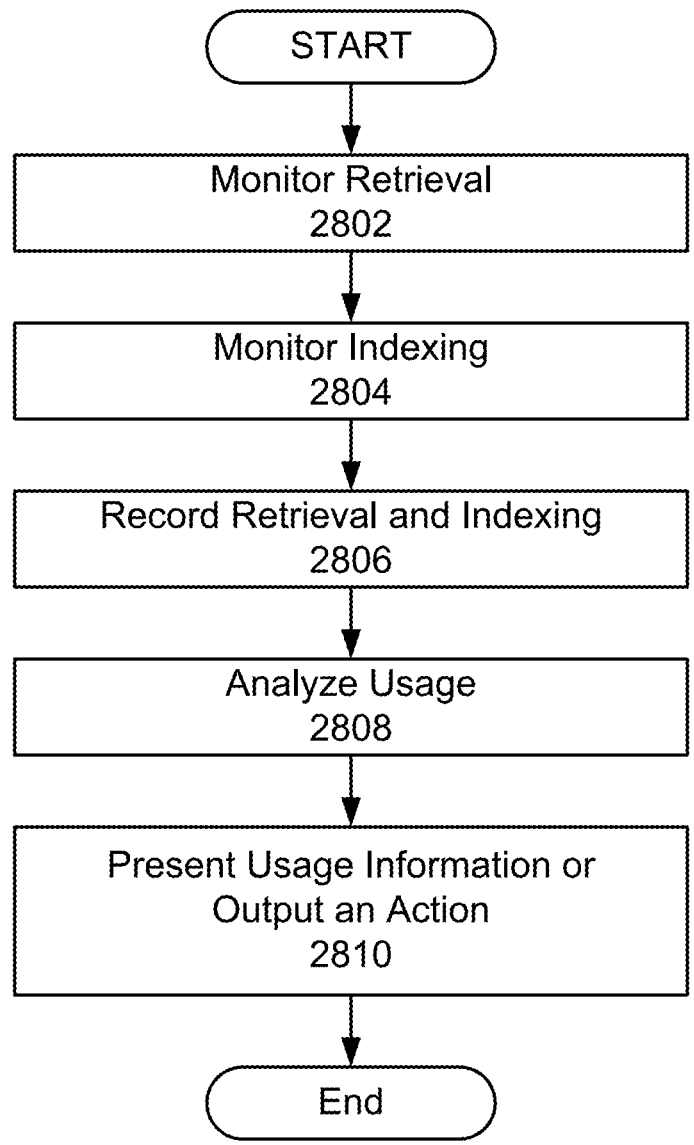
FIG. 28 is a flowchart of an embodiment of a method for monitoring and analyzing usage of the MMR system in accordance with the present invention.

Referring now to FIG. 28, an embodiment of a method for monitoring and analyzing usage of the MMR system 100 in accordance with the present invention will be described. The method begins by monitoring 2802 retrieval requests received and processed by the MMR Gateway 104. The method also monitors 2804 requests to index new images and/or associate hotspots with the indexed images. Those skilled in the art will recognize that monitoring steps 2802 and 2804 can be performed in any order or even maybe performed concurrently. Further in other embodiments, the method performs only step 2802 or 2804. Next, the method records 2806 the information from step 2802 and step 2804 in the usage database 2504. This recording step 2806 can be performed independently for each monitoring step 2002, 2804. The information that has been stored in the usage database 2504 is then analyzed 2808, queried and/or correlated. Examples of the analysis will be described in more detail below. Finally, the method uses the data stored in the usage database 2504 or the results of the analysis in step 2808 to create a report that presents 2810 the usage information or initiator output 2810 in action using the information. FIG. 28 illustrates the general process of monitoring and utilizing the usage information from the usual content searching.

Figure 29:
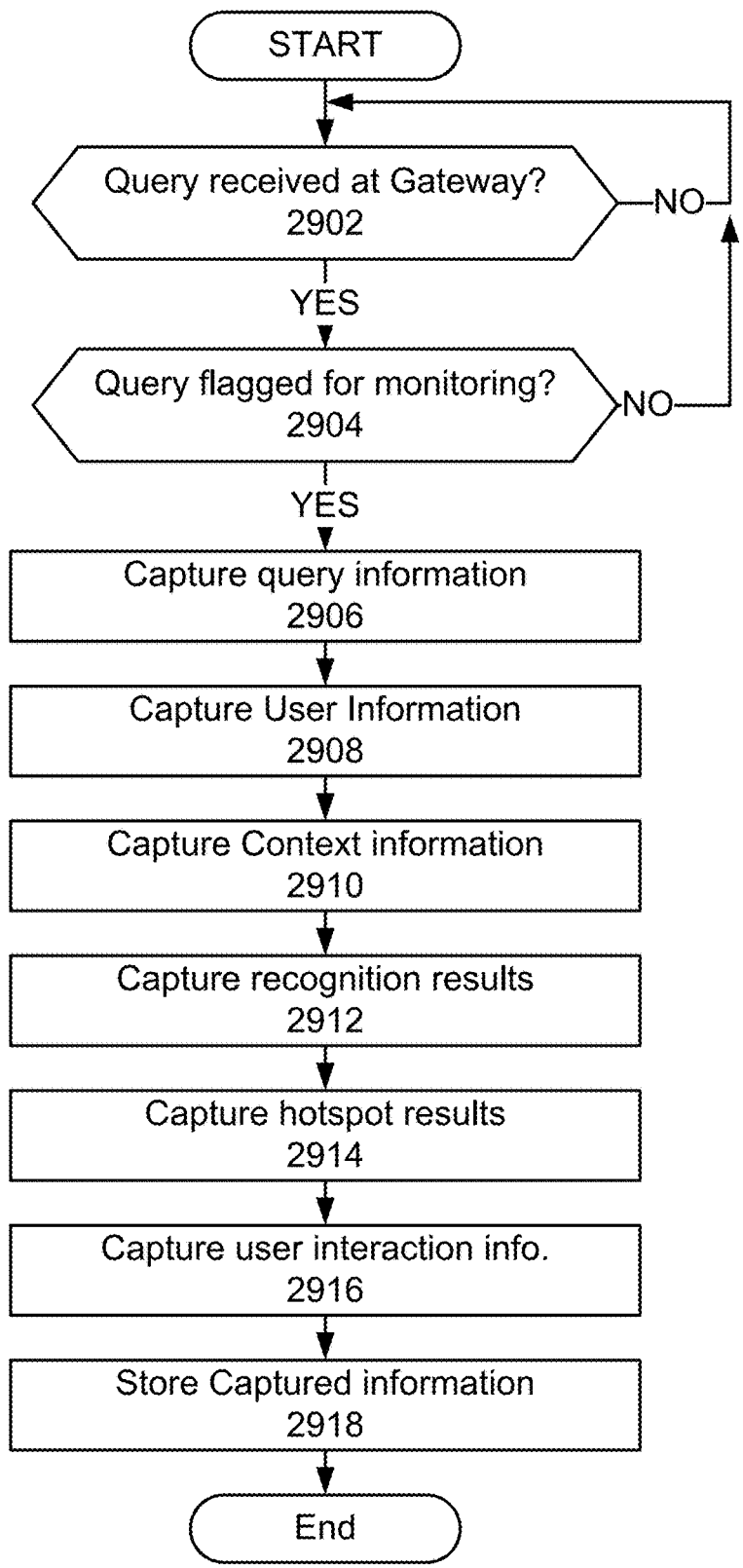
FIG. 29 is a flowchart of an embodiment of a method for monitoring retrieval requests in accordance with the present invention.

Referring now to FIG. 29, an embodiment of a method for monitoring retrieval requests in accordance with the present invention will be described. The method begins by determining 2902 whether a retrieval request (query) was received at the MMR gateway 104. If not the method loops to repeatedly determine whether a retrieval request has been received. If a retrieval request was received at the MMR gateway 104, the method proceeds to determine 2904 whether the retrieval request was flagged for monitoring. In one embodiment, all retrieval requests are flagged for monitoring and the method collects data over a broad range of retrieval requests. In another embodiment, only a particular subset of users that have subscribed to an enhanced service have their retrieval requests monitored. In yet another embodiment, only particular individual subscribers are monitored for their usage of the service. Thus, depending on whether a particular user, or a particular type of retrieval requests has been flagged for monitoring will determine whether additional data be collected. If the request has not been flagged for monitoring, the method returns to step 2902 to determine whether additional retrieval requests are received. On the other hand, if the retrieval request has been flagged for monitoring, the method continues by capturing 2906 query information with the monitoring module 2502. Then the method captures 2908 user information with the monitoring module 2502. Next, the monitoring module 2502 captures 2910 context information. In one embodiment, the steps 2908, and 2910 are performed by the monitoring module 2502 interrogating the server 302 for the desired information. The monitoring module 2502 then captures the recognition results generated by the MMR matching unit 106. Next, the monitoring module 2502 captures the hotspot results output by the hotspot database 404. Finally, the monitoring module 2502 captures the user interaction information such as that retrieved by the server 302 from mobile device 102. The information captured in steps 2906 to 2916 is then stored in the usage database 2504.

Figure 30:
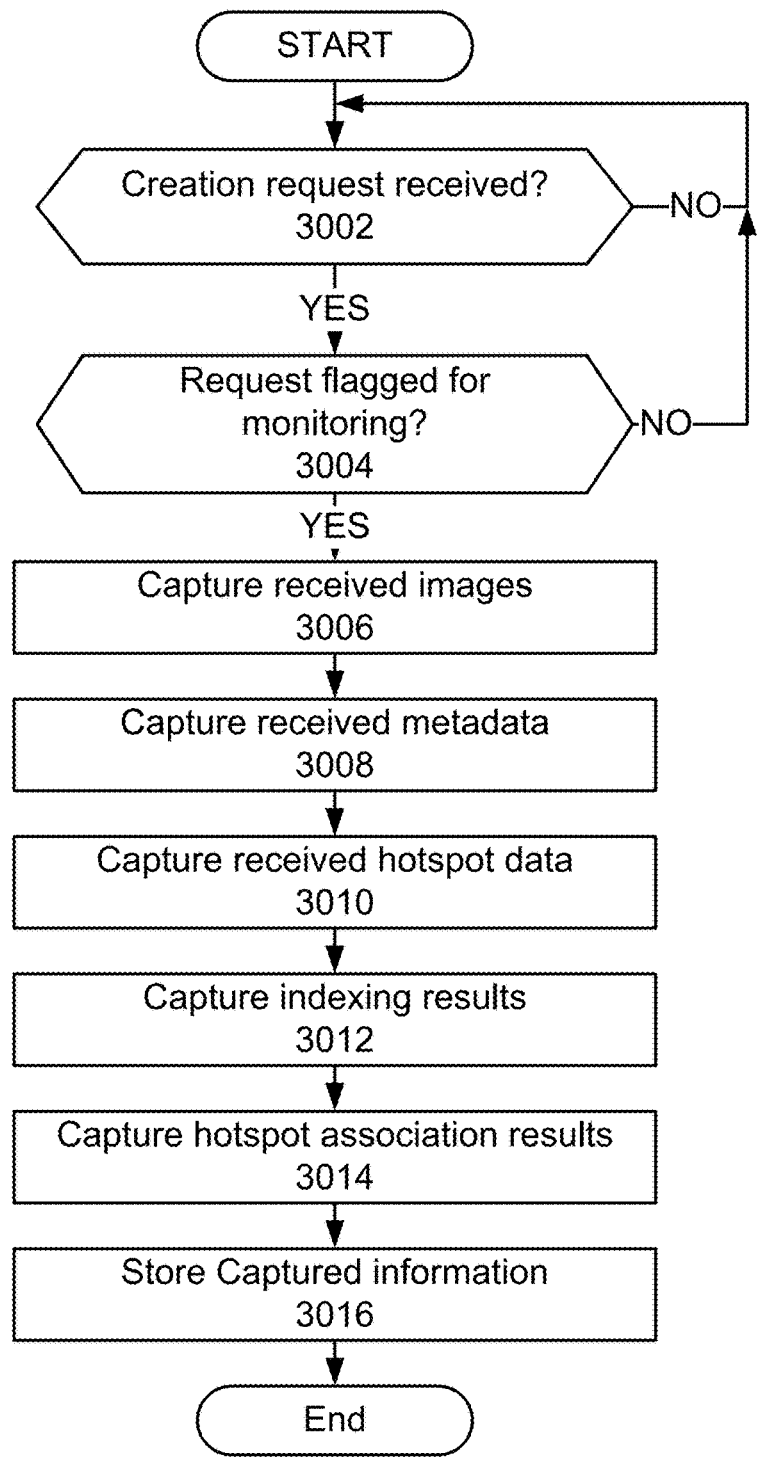
FIG. 30 is a flowchart of an embodiment of a method for monitoring creation requests in accordance with the present invention.

Referring now to FIG. 30, an embodiment of a method for monitoring creation/indexing requests in accordance with the present invention will be described. The method begins determining 3002 whether a creation request was received at the MMR gateway 104 or at the image registration unit 408 of the image matching unit 106. If not the method loops to repeatedly determine whether a creation request has been received. If a creation request was received, the method proceeds to determine 3004 whether the creation request was flagged for monitoring. Similar to retrieval requests, individual creation requests, sets of the creation requests or all creation requests can be flagged for monitoring. Thus, depending on whether a particular publisher or a particular type of creation request has been flagged for monitoring determines whether additional data is collected. If the creation request has not been flagged for monitoring, the method returns to step 3002 to determine whether additional creation requests are received. On the other hand, if the lesion request has been flagged for monitoring, the method continues by capturing 3006 received images with the monitoring module 2502. Then the captures 3008 to receive the metadata with the monitoring module 2502. Next, the monitoring module 2502 captures 3010 receives hotspot data. The monitoring module 2502 then captures 3012 the indexing results generated by the image registration unit 408. Next, the monitoring module 2502 captures the hotspot association results output by the hotspot database 404. Finally, information captured in steps 3006 to 3014 is stored in the usage database 2504.

As noted above with reference to FIG. 27, the method analyzes and correlates in step 2808 the data stored in the usage database 2504. This analysis and correlation is performed by the access analysis module 2506. In one embodiment, the access analysis module 2506 analyzes and correlates the data for one or more users and one or more queries and combines and correlates the recorded retrieval requests. For example, if 2 users made 2 queries each and this data was collected by monitoring module 2502 and stored in the usage database 2504.

User1 subscribes to Times magazine and Business Week magazine, is in Seattle, retrieved an advertisement using an iPhone and submitting 400×500 image, was sent back 3 options (1. Purchase 2. Watch video 3. Follow link), selected purchase, made a $50 purchase, and also followed a URL link and browsed a website (this corresponds to the XML example above). User1 also made another query (in addition to the above actions) where he sent a image of text, the server 302 retrieved the text and identifies that there is one action related to this segment and that is to e-mail user1 the corresponding article. The server 302 also sends an SMS message to user confirming the successful retrieval and action. The server 302 also sends some text advertisement to user 1.

User 2 is located in Oregon, is not subscribed to any magazines, and makes two queries. User 2 uses a Blackberry and submits 300×200 size query images. One query is unsuccessful and no retrieval results were found. The server 302 sends an SMS message back to user indicating that retrieval was unsuccessful. In a second query, User 2 sends an image of advertisement, the server 302 retrieves it successfully and returns options for purchasing and following a URL. User 2 takes no action.

In one embodiment, the access analysis module 2506 automatically finds the correlations between various data that have been collected and stored in the usage database 2504. More specifically, one type of information is correlated to another type of data for a defined set monitored data. The collected data can be correlated with location information, purchase transactions, recognition performance or any number of other items. In one embodiment, these correlations take the form of AB comparison or testing. For example, location data (e.g., cities, countries) is correlated to how many "certain type of actions" made in total, per user etc. For the above example with the two users above each performing two queries, the access analysis module 2506 can generate information such as the following: 1) 100% of the users in Seattle made a purchase; 2) 50% of queries in Seattle resulted in a purchase; 3) 0% of the users in Oregon made a purchase; 4) 0% of queries in Oregon resulted in a purchase; 5) 25% queries in the USA resulted in following a URL link, etc. Similarly, for the same two users each with two queries, purchase transactions are correlated to queries and produces the following 1) $50/4=$12.5 purchases were made per each submitted query; 2) $50/3=$16.6 purchases were made per each successful query; 3) $50/1=$50 purchases were made per iPhone user; and 4) $50/2=$25 purchases were made per queries that come from iPhone, etc. Also, for the same two users each with two queries, recognition performance is correlated to queries and time range to produce the results that 1) 100% successful retrieval rate for iPhone queries from January 2008 to June 2008; and 2) 50% successful retrieval rate for 300×200 images from January 2008 to June 2008. In one embodiment, the access analysis module 2506 compares and correlates any of the following items column X in Table 1 below with any other item from column Y.

TABLE 1

| X | Y |
|---|---|
| Time range | Time range |
| Query time/date | Query time/date |
| Image size | Image size |
| Phone software (e.g., mms vs plug-in) | Phone software (e.g., mms vs plug-in) |
| Phone type | Phone type |
| Phone settings | Phone settings |
| Phone sensor reading | Phone sensor reading |
| Phone connection speed | Phone connection speed |
| Phone processor speed | Phone processor speed |
| Wireless carrier/connection method | Wireless carrier/connection method |
| Content detection results | Content detection results |
| User subscriptions | User subscriptions |
| User default actions | User default actions |
| User privacy setting (e.g., low, medium, high) | User privacy setting |
| User information (e.g. occupation) | User information (e.g. occupation) |
| Location - country | Location - country |
| Location - territory | Location - territory |
| Location - county | Location - county |
| Location - city | Location - city |
| Direction of travel | Direction of travel |
| Weather conditions | Weather conditions |
| Retrieval result | Retrieval result |
| Retrieval confidence | Retrieval confidence |
| Retrieval algorithm | Retrieval algorithm |
| Retrieval duration | Retrieval duration |
| Retrieved document | Retrieved document |
| Retrieved document image (e.g., thumbnail) | Retrieved document image (e.g., thumbnail) |
| Retrieved document page | Retrieved document page |
| Retrieved document location | Retrieved document location |
| Modules used for retrieval | Modules used for retrieval |
| Actions presented to user | Actions presented to user |
| Number of actions presented to user | Number of actions presented to user |
| Advertisement sent to user | Advertisement sent to user |
| Actions performed by user | Actions performed by user |
| Browser type | Browser type |
| Number of queries | Number of queries |
| Number of successful/unsuccessful queries | Number of successful/unsuccessful queries |
| Queries that resulted in action | Queries that resulted in action |
| Amount of money spent by user on action | Amount of money spent by user on action |
| Amount of time spent by user on action | Amount of time spent by user on action |
| Number of unique users | Number of unique users |
| Number of new users | Number of new users |
| Languages of users | Languages of users |

These analysis results are pre-computed by the access analysis module 2506 or computed when user requests them from the access analysis module 2506. In yet another embodiment, a set of the most popular analysis results are pre-computed by the access analysis module 2506 with the remaining results are only computed by the access analysis module 2506 in response to a user request.

In a similar manner, the collected data from the image creation/indexing requests or hotspot association requests stored in the usage database 2504 are correlated in various different ways. For example, the access analysis module 2506 can determine the percentage of hotspots associated with purchase actions, video playback actions, following URL actions, etc. in other example, the access analysis module 2506 determines the percentage of text content that is associated with advertisements versus percentage of picture content associated with advertisements. In one embodiment, the access analysis module 2506 compares and correlates any of the following items column X in Table 2 below with any other item from column Y.

TABLE 2

| X | Y |
|---|---|
| Time range | Time range |
| Index date, time | Index date, time |
| Indexed image resolution | Indexed image resolution |
| Indexed image size | Indexed image size |
| Index submission method | Index submission method |
| Document id | Document id |
| Document title | Document title |
| Document type | Document type |
| Index submission location | Index submission location |
| Submitter id | Submitter id |
| Document content type | Document content type |
| Hotspot type | Hotspot type |
| Action type | Action type |
| Indexing method | Indexing method |
| Indexing duration | Indexing duration |
| Indexing servers | Indexing servers |
| Indexing similarity to already indexed | Indexing similarity to already indexed |
| Number of actions | Number of actions |
| Number of hotspots | Number of hotspots |

Figure 31:
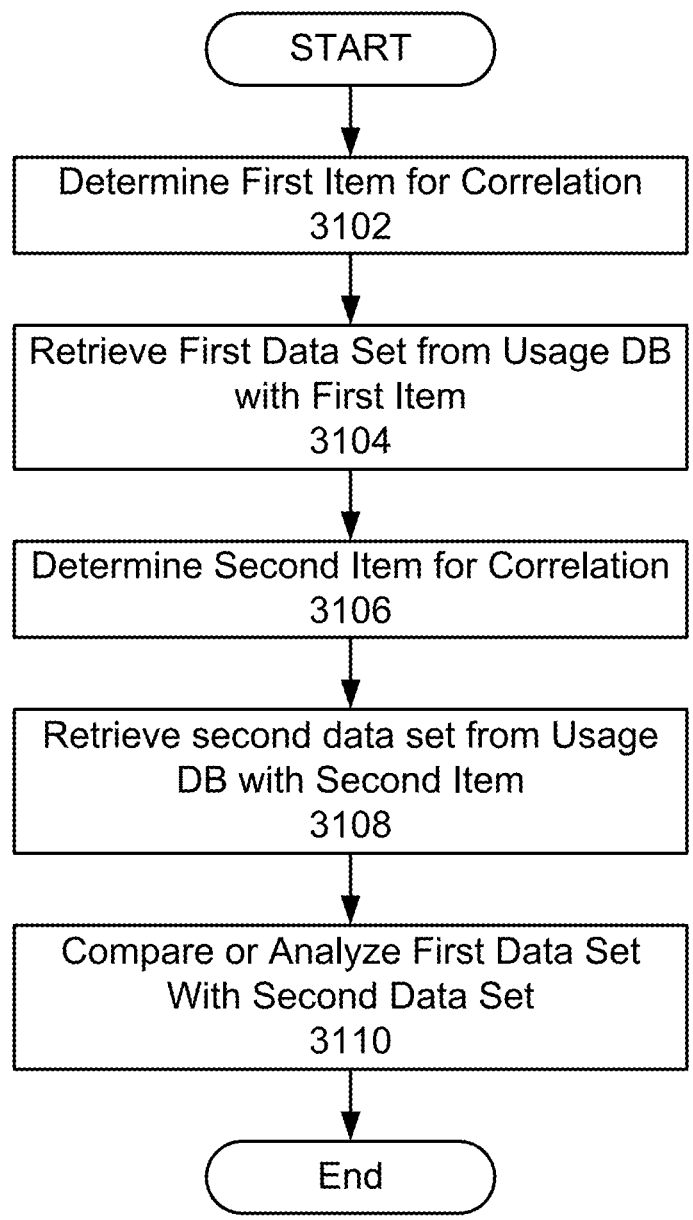
FIG. 31 is a flowchart of an embodiment of a method for analyzing or correlating retrieval or creation data in accordance with the present invention.

Referring now to FIG. 31, one embodiment for a method of analyzing or comparing collected data in accordance with the present invention will be described. In general, this method is performed by the access analysis module 2506. The method begins by determining 3102 a first item for correlation, comparison or analysis. Next, the method retrieves 3104 a first data set from the usage database 2504 using the first item as the search criteria. Then the method determines 3106 a second item for correlation, comparison or analysis. As was noted above, the determination of the first item in the determination of the second item can be based on user input, maybe from the defined report profile or may be predefined selections globally defined for the MMR system 100. Next, the method retrieves 3108 a second data set from the usage database 2504 using the second item as the search criteria. Finally, the method completes by correlating, comparing or analyzing 3110 the first set of data with the second set of data. This step 3110 includes any type of direct comparisons, percentage calculations, or other arithmetic or mathematical calculations that relate to the first item to the second item using the first data set in the second data set.

Once the correlation, comparison or analysis has been completed and analysis results are available, the present invention presents the analysis results to the user, uses the analysis results to improve the operation of the MMR system 100, or uses the analysis results to trigger or as part of an action external to the MMR system 100.

Figure 32:
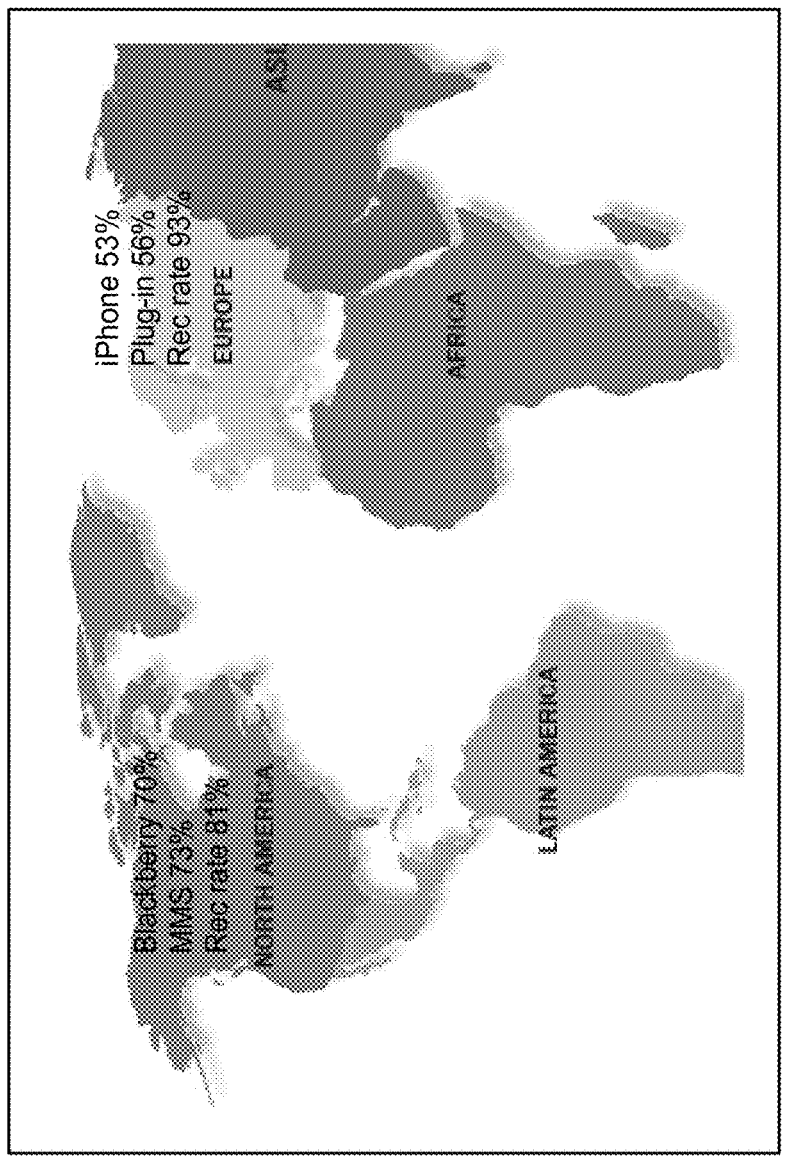
FIG. 32 is a graphical representation of an embodiment of an output of the analytics module.

As noted above and in one embodiment, the analysis results are output to the user such as in the form of a presentation or report produced by the presentation module 2508. In this case, the user may be the user of the mobile device 102, the user of the MMR publisher 108, the system administrator of the MMR system 100, or even a computer or other machine. In one embodiment, the analysis results are converted into graphs or HTML and the user accesses the results via a web browser. In other embodiments, analysis results are converted into Macromedia Flash format, text files, xml format file, images files, etc. In another embodiment, analysis results can be made available via an API and user can use the API to retrieve the analysis results using his/her own software. In still another embodiment user has a private space and settings for accessing the monitoring information and needs to register and login to access the monitoring output. In yet still another embodiment results are visualized on a map such as Google maps. FIG. 32 is a graphical representation of such an embodiment of an output generated by the presentation module 2508 where the analysis results from the access analysis module 2506 have been combined and overlaid on a map of the world. In particular, FIG. 32 shows a map overlay and a list of most popular device for submitting query, most popular way of submission, and percentage of successful queries (recognition rate) made by continent. In an alternate embodiment, similar information may be provided to the user in the form of a report having a tabular form such as the examples shown below in Table 3.

TABLE 3

| Continent | Device | Software | Recognition rate |
|---|---|---|---|
| North America | iPhone 10% | MMS 73% | 81% |
| | BlackBerry 70% | E-mail 10% | |
| | Palm 5% | Plug-in1 5% | |
| | Nokia 10% | Plug-in2 5% | |
| | Other 5% | Other 7% | |
| Europe | iPhone 53% | MMS 20% | 93% |
| | BlackBerry 7% | E-mail 10% | |
| | Palm 5% | Plug-in1 56% | |
| | Nokia 30% | Plug-in2 10% | |
| | Other 5% | Other 4% | |
| Asia | iPhone 20% | MMS 10% | 80% |
| | BlackBerry 10% | E-mail 10% | |
| | Palm 15% | Plug-in1 10% | |
| | Nokia 35% | Plug-in2 10% | |
| | Other 20% | Other 60% | |

Figure 33:
FIG. 33 is a graphical representation of another embodiment of the output of the analytics module.

In yet one more embodiment, the output of the access analysis module 2506 is combined with retrieved image data. FIG. 33 illustrates a graphical representation of an example of such output generated by the presentation module 2508. FIG. 33 shows a retrieved document image with the analysis results overlaid on the image. In particular, regions of the image are shaded by varying degrees relative to either the number of retrieval requests that correspond to the region or the number of dollars that were generated by retrieval requests related to the region. In addition, each region has text information overlaid in the shaded region indicating the number of queries made to document region and average dollar amounts spent as result of retrieval requests (query).

While the above description of the presentation module 2508 has primarily been focused on presentation of information to users, the presentation module 2508 also use the analysis results to improve the operation of the MMR system 100 or to trigger or as part of an action external to the MMR system 100. In one embodiment, the presentation module 2508 feeds back the analysis results to the MMR matching unit 106, in particular, the acquisition unit 406 or the image registration unit 408 to adjust processing parameters, such as selection of recognition algorithms, algorithm parameters, indexing algorithms, prediction module, etc. For example if there are many images submitted to the acquisition unit 406 with a iPhone mobile device and a high percentage of those images are not being recognized, the recognition algorithm parameters may be automatically adjusted to recognize more of those kinds of images. In a like manner, the analysis results can be used to adjust the operating parameters of the dispatcher 402, the recognition parameters of the recognition unit 410, the content and structure of the index tables 412a-n, and the user profiles stored in the MMR gateway 104. Similarly, the presentation module 2508 can use the analysis results to trigger an e-mail message to the system administrator regarding recognition rates or any other characteristics noted in the tables above. Likewise, the presentation module 2508 can use the analysis results as part of an action to be taken on a system external to the MMR system 100. For example, if the analysis results indicate that a particular user is accessing hotspot or image data related to particular product but there is no conversion in terms of the purchase of the product, the presentation module 2508 could generate an action to target that particular user such as through a marketing campaign being operated by the manufacturer of that product on a system external to the MMR system 100. The action generated includes a recommended follow-up sales technique as well as information about the user including the fact that there has been no conversion of a sale despite significant interest in a product, the specific product and type of interest, and information about the user.

In the above description, the monitoring, analysis and presentation has been segregated into a first area for retrieval requests and a second area for creation/indexing and hotspot association. However, those skilled in all will recognize that the present invention can perform combined analysis that utilizes collected data from both the first area and the second area. In one embodiment, the data from creation/indexing and hotspot association monitoring and retrieval monitoring can be analyzed in one analysis module and information from Table 1 and Table 2 can be correlated together. For example, retrieval date/number of queries from Table 1 can be correlated with index submission date from Table 2 to obtain a table such as:

TABLE 4

| Indexing date for Docid = XXX | Retrieval date/number of queries for Docid = XXX | |
|---|---|---|
| May 11, 2008 | May 11, 2008 | 5671 |
| | May 12, 2008 | 526 |
| | May 13, 2008 | 35 |
| | May 14, 2008 | 2 |

Another example is to correlate index submission location to retrieval location:

TABLE 5

| Indexing location for Docid = XXX to YYY | Retrieval location for Docid = XXX to YYY |
|---|---|
| CA, USA | CA, USA 40% |
| | NV, USA 30% |
| | WA, USA 10% |
| | Other 20% |

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A system comprising:
one or more processors;
a monitoring module stored on a memory and executable by the one or more processors, the monitoring module configured to monitor and capture access information related to accessing an electronic database of features, the access information including metadata about user interactions with a hotspot embedded in a recognition result that is retrieved based on features in the electronic database of features that match features of a captured image;
a storage device coupled with the monitoring module, the storage device for storing the access information;
an access analysis module coupled with the storage device, the access analysis module configured to:
retrieve a first plurality of records from the access information, wherein the first plurality of records are records that include a successful retrieval result;
retrieve a second plurality of records from the access information, wherein the second plurality of records are records that include an unsuccessful retrieval result;
identify a relationship between the first plurality of records and the second plurality of records using mathematical calculations; and
generate an analysis result based on the relationship between the first plurality of records and the second plurality of records, the analysis result comprising an indication of a number of unsuccessful visual retrieval attempts, based on capturing images of an object, before an average user ceases to capture additional images of the object; and
a presentation module coupled with the access analysis module, the presentation module configured to initiate an action based on the analysis result.

2. The system of claim 1, wherein the action comprises at least one of outputting the analysis result, connecting to a web page, emailing an article, playing a music clip, playing a video clip, and downloading an operating time for a business.

3. The system of claim 1, wherein the analysis result further comprises a conversion rate of the user purchasing a product related to the features that match features of captured images.

4. The system of claim 1, wherein the access information comprises indexing information, addition of hotspot data, and hotspot association information.

5. The system of claim 1, wherein the analysis result further comprises information relating to how retrieval performance affects user behavior.

6. The system of claim 1, wherein the analysis result further comprises a location and a direction in which a user is traveling.

7. The system of claim 1, wherein the presentation module combines the analysis result with one from a group of a matched feature and a map image.

8. A method comprising:
monitoring and capturing access information by one or more processors, the access information related to access to an electronic database of features, the access information including metadata about user interactions with a hotspot embedded in a recognition result that is retrieved based on features in the electronic database of features that match features of a captured image;
storing the access information in a storage device;
retrieving a first plurality of records from the access information, wherein the first plurality of records are records that include a successful retrieval result;
retrieving a second plurality of records from the access information, wherein the second plurality of records are records that include an unsuccessful retrieval result;
identifying a relationship between the first plurality of records and the second plurality of records using mathematical calculations;
generating an analysis result based on the relationship between the first plurality of records and the second plurality of records, the analysis result comprising an indication of a number of unsuccessful visual retrieval attempts, based on capturing images of an object, before an average user ceases to capture additional images of the object; and
initiating an action based on the analysis result.

9. The method of claim 8, wherein the action comprises at least one of outputting the analysis result, connecting to a web page, emailing an article, playing a music clip, playing a video clip, and downloading an operating time for a business.

10. The method of claim 9, wherein outputting the result comprises combining the analysis result with one from a group of a matched feature and a map image.

11. The method of claim 8, wherein the analysis result further comprises a conversion rate of the user purchasing a product related to the features that match features of captured images.

12. The method of claim 8, wherein the access information comprises indexing information, addition of hotspot data, and hotspot association information.

13. The method of claim 8, wherein the analysis result further comprises information relating to how retrieval performance affects user behavior.

14. The method of claim 8, wherein the analysis result further comprises a location and a direction in which a user is traveling.

15. A computer program product comprising a non-transitory computer useable medium including a computer-readable program, wherein the computer-readable program when executed on a computer causes the computer to:
monitor and capture access information by one or more processors, the access information related to access to an electronic database of features, the access information including metadata about user interactions with a hotspot embedded in a recognition result that is retrieved based on features in the electronic database of features that match features of a captured image;
store the access information in a storage device;
retrieve a first plurality of records from the access information, wherein the first plurality of records are records that include a successful retrieval result;
retrieve a second plurality of records from the access information, wherein the second plurality of records are records that include an unsuccessful retrieval result;
identify a relationship between the first plurality of records and the second plurality of records using mathematical calculations;
generate an analysis result based on the relationship between the first plurality of records and the second plurality of records, the analysis result comprising an indication of a number of unsuccessful visual retrieval attempts, based on capturing images of an object, before an average user ceases to capture additional images of the object; and
initiate an action based on the analysis result.

16. The computer program product of claim 15, wherein the action comprises at least one of outputting the analysis result, connecting to a web page, emailing an article, playing a music clip, playing a video clip, and downloading an operating time for a business.

17. The computer program product of claim 15, wherein the analysis result further comprises a conversion rate of the user purchasing a product related to the features that match features of captured images.

18. The method of claim 15, wherein the access information comprises indexing information, addition of hotspot data, and hotspot association information.

19. The method of claim 15, wherein the analysis result further comprises information relating to how retrieval performance affects user behavior.

20. The method of claim 15, wherein the analysis result further comprises a location and a direction in which a user is traveling.

* * * * *